(12) United States Patent
Elazzouni et al.

(10) Patent No.: US 12,250,740 B2
(45) Date of Patent: Mar. 11, 2025

(54) PATH MANAGEMENT WITH DIRECT DEVICE COMMUNICATION

(71) Applicant: QUALCOMM Incorporated, San Diego, CA (US)

(72) Inventors: Sherif Elazzouni, San Diego, CA (US); Rajat Prakash, San Diego, CA (US); Ozcan Ozturk, San Diego, CA (US); Piyush Gupta, Bridgewater, NJ (US); Fatih Ulupinar, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 300 days.

(21) Appl. No.: 17/303,137

(22) Filed: May 20, 2021

(65) Prior Publication Data

US 2022/0377823 A1    Nov. 24, 2022

(51) Int. Cl.
*H04W 76/15* (2018.01)
*H04W 76/14* (2018.01)
*H04W 76/18* (2018.01)

(52) U.S. Cl.
CPC .......... *H04W 76/15* (2018.02); *H04W 76/14* (2018.02); *H04W 76/18* (2018.02)

(58) Field of Classification Search
CPC ...... H04W 76/15; H04W 76/18; H04W 76/14
See application file for complete search history.

(56) References Cited

U.S. PATENT DOCUMENTS

| | | | |
|---|---|---|---|
| 9,860,774 B2* | 1/2018 | Merkel | H04W 76/14 |
| 11,190,462 B2* | 11/2021 | Levi | H04W 28/04 |
| 11,432,358 B2* | 8/2022 | Park | H04W 80/02 |
| 2010/0136987 A1* | 6/2010 | Kim | H04W 28/16 |
| | | | 455/450 |
| 2010/0255869 A1* | 10/2010 | Sood | H04W 76/14 |
| | | | 455/517 |
| 2016/0073378 A1* | 3/2016 | Wang | H04B 7/18502 |
| | | | 455/431 |
| 2016/0248886 A1* | 8/2016 | Thubert | H04L 67/12 |
| 2018/0092067 A1* | 3/2018 | Liu | H04W 72/04 |
| 2018/0288651 A1* | 10/2018 | Chiu | H04L 69/22 |
| 2019/0132784 A1* | 5/2019 | Thubert | H04L 45/50 |
| 2019/0158993 A1* | 5/2019 | Kwon | H04L 5/0091 |
| 2019/0364424 A1* | 11/2019 | Vanderveen | H04W 12/041 |
| 2020/0178124 A1* | 6/2020 | Lei | H04W 4/029 |

(Continued)

FOREIGN PATENT DOCUMENTS

WO    WO-2019157918 A1 *    8/2019

*Primary Examiner* — Ricardo H Castaneyra
(74) *Attorney, Agent, or Firm* — ArentFox Schiff LLP

(57) ABSTRACT

The present disclosure provide various methods, computer-readable media, and apparatuses for managing communication paths, which may include at least one direct communication path between UEs, such as a sidelink communication path. Illustratively, an apparatus of the present disclosure may be a UE or component thereof that is configured to establish a direct wireless communication link and an indirect wireless communication link with another UE to carry data associated with one traffic stream. Further, the apparatus may be configured to communicate with the other UE over at least one of the direct communication link or the indirect communication link after the direct communication link and the indirect communication link are established with the other UE.

26 Claims, 19 Drawing Sheets

(56) References Cited

U.S. PATENT DOCUMENTS

| | | | |
|---|---|---|---|
| 2021/0068176 A1* | 3/2021 | Luo | H04L 69/32 |
| 2021/0153262 A1* | 5/2021 | Mochizuki | H04W 56/0045 |
| 2021/0274329 A1* | 9/2021 | Ying | H04W 4/40 |
| 2021/0377842 A1* | 12/2021 | Xu | H04W 40/12 |
| 2022/0095186 A1* | 3/2022 | Zhang | H04W 36/0044 |
| 2023/0199613 A1* | 6/2023 | Jung | H04W 40/248 |
| | | | 370/329 |

* cited by examiner

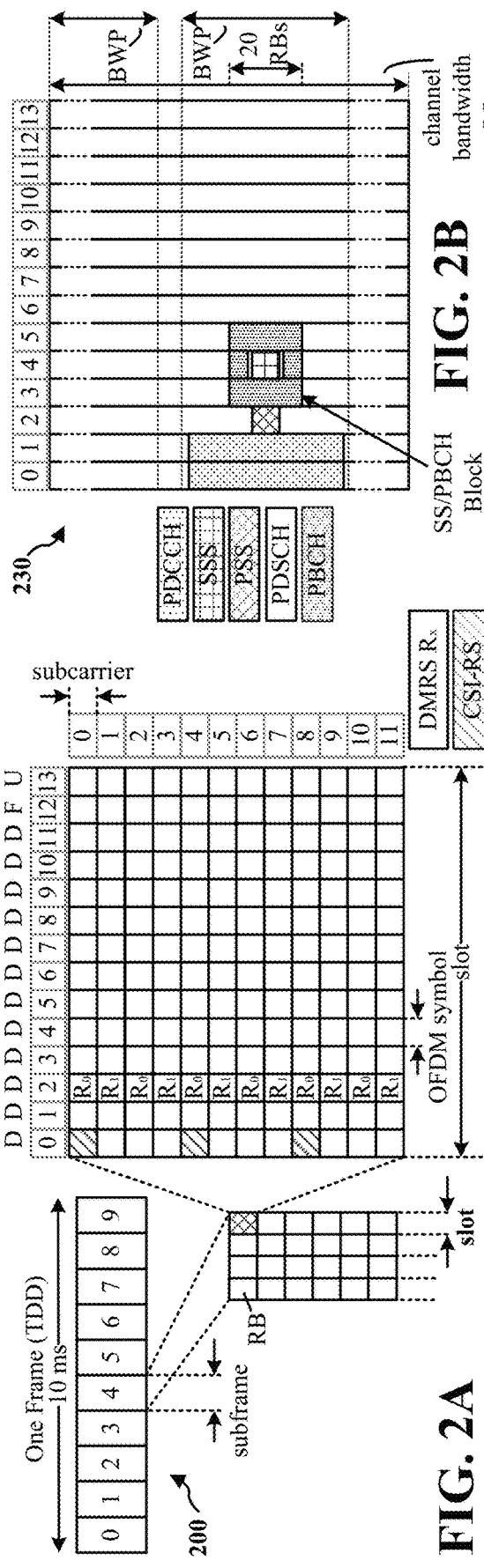
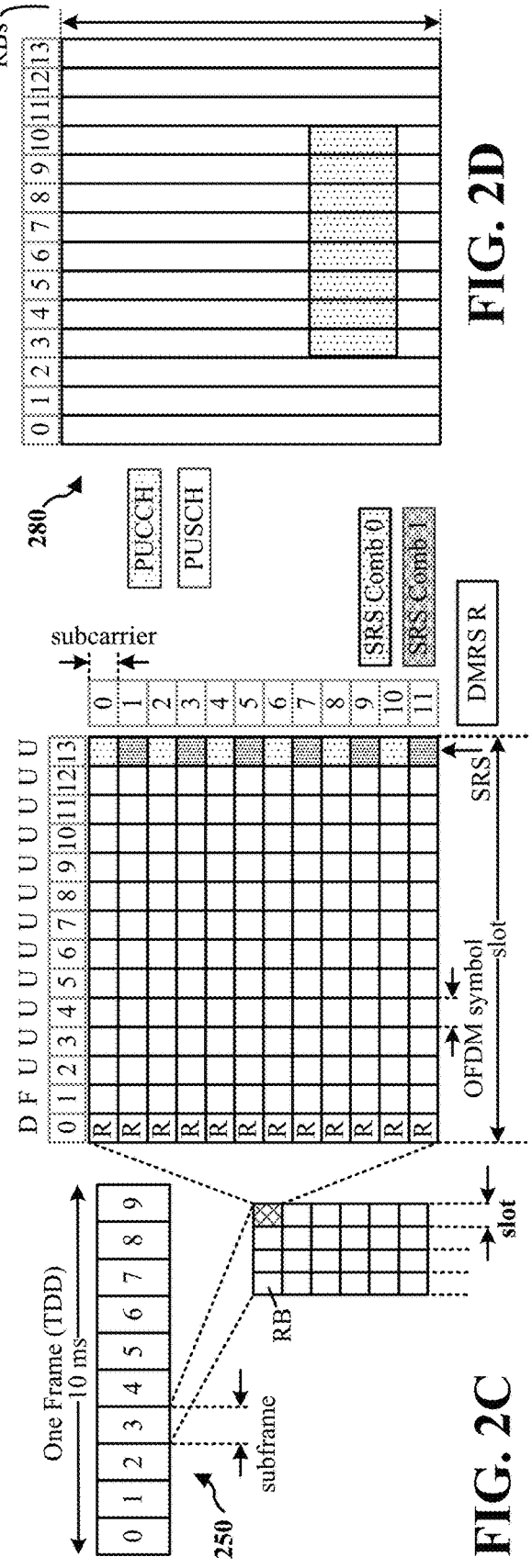
FIG. 2A
FIG. 2B
FIG. 2C
FIG. 2D

PATH MANAGEMENT WITH DIRECT DEVICE COMMUNICATION

BACKGROUND

Technical Field

The present disclosure generally relates to communication systems, and more particularly, to communication between user equipment (UE) over at least one of a direct communication path between UEs or an indirect communication path through a base station or other network entity.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low-latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

With the expanding adoption of the Internet of Things (IoT), various connected systems and devices are found with increasing frequency across a myriad of areas. In the context of production and some other industries, such connected systems and devices enable many (and perhaps all) Industrial IoT (IoT) applications, such as with automation and factory or other assembly/production (re)configuration. For example, connected systems and devices enable countless automated operations and processes, robots, automated guided vehicles (AGVs), etc. for realization of connected factories, warehouses, controlled-environment agriculture, and other such scenarios that may be characterized as IIoT or similar thereto.

Some specific deployments of connected systems and devices in IIoT and related scenarios may include, inter alia, management systems (e.g., industrial computing systems for logic and controller programming, for collecting and quantifying metrics and other data, and for maintaining system and data security and integrity), wireless transmit and/or receive units responsible for executing instructions, human machine interface (HMI) devices (e.g., tablets, panels, wearables, etc.) through which some instructions may be input.

In many current or recent instances, the connectivity between the aforementioned connected systems and devices is implemented with Industrial Ethernet, Wi-Fi, or a personal area network (PAN) such as Bluetooth. However, each of these approaches to connectivity has respective drawbacks, for example, in terms of implementation and realization costs and complexities or in terms of performance (e.g., latency) and reliability (e.g., error rate) characteristics. Therefore, a needs exists for approaches to connectivity in IIoT applications that are suitable both in terms of cost and complexity and in terms of the many parameters and other conditions imposed upon connected networks and devices for IIoT applications, such as high reliability or low latency.

The present disclosure describes various techniques and solutions for IIoT connectivity that are suitable for the various constraints and conditions requisite in IIoT communication and other similar contexts. With IoT and IIoT as illustrative applications, the disclosure herein provides for connectivity according to at least one wireless or radio access technology (RAT), such as 5G New Radio (NR) or Long Term Evolution (LTE). Such connectivity through an access network may be implemented in tandem with direct device communication, such as device-to-device (D2D) communication on sidelink channels. In some other aspects, connectivity may be realized through both an access network and another type of network, such as Wi-Fi or other local or wide area network.

In view of the preceding, some aspects of the present disclosure provide various methods, computer-readable media, and apparatuses for managing communication paths, which may include at least one direct communication path between UEs, such as a sidelink communication path. Illustratively, an apparatus of the present disclosure may be a UE or component thereof that is configured to establish a direct wireless communication link and an indirect wireless communication link with another UE to carry data associated with one traffic stream. Further, the apparatus may be configured to communicate with the other UE over at least one of the direct communication link or the indirect communication link after the direct communication link and the indirect communication link are established with the other UE. Some further aspects of path management with direct device communication are also provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

DETAILED DESCRIPTION

Figure 1:
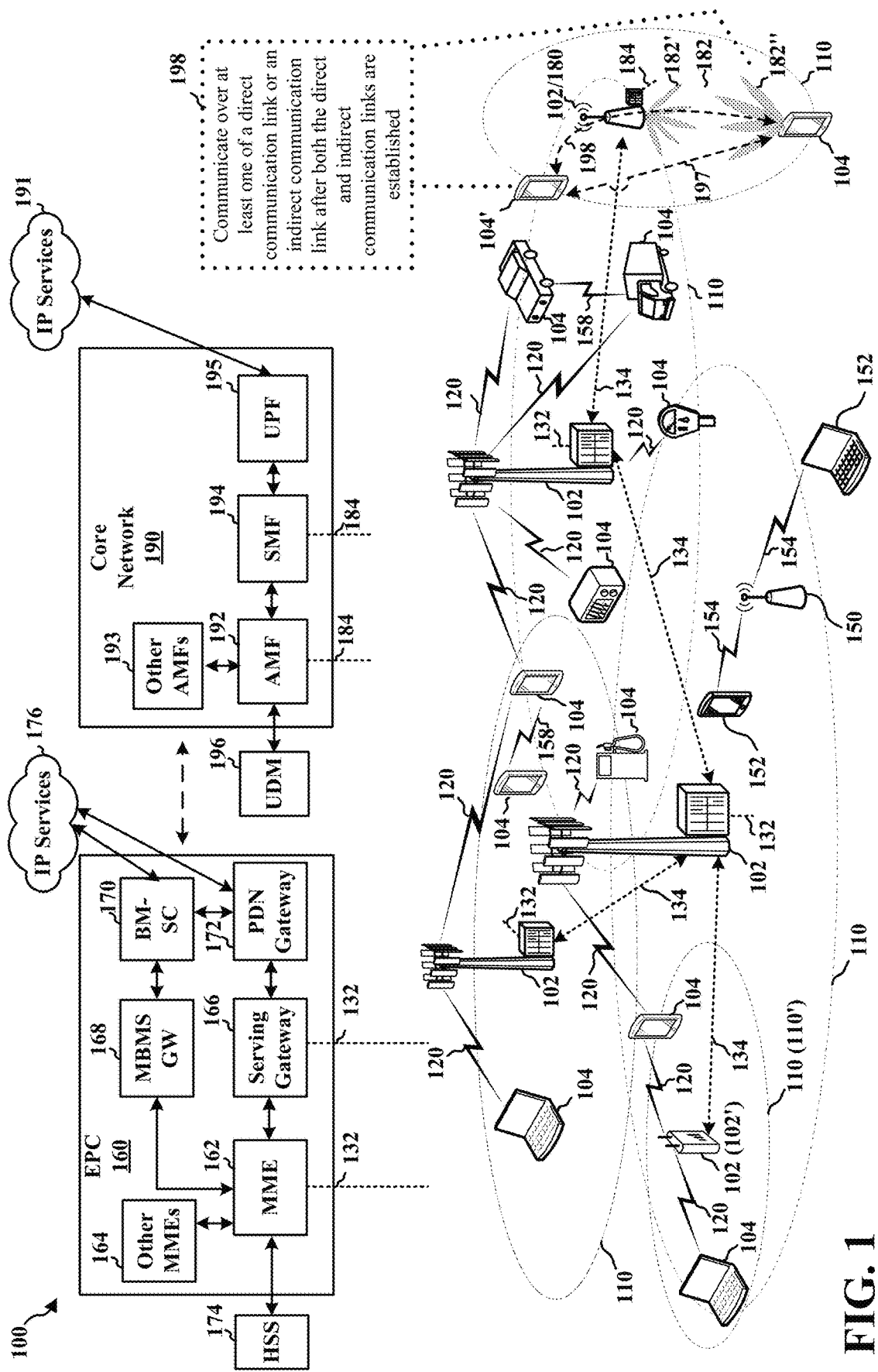
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

The Industrial Internet of Things (IIoT) broadly captures connectivity of various devices, such as sensor and controls, with various aspects of production and manufacturing. For example, connected systems and devices enable countless automated operations and processes, robots, automated guided vehicles (AGVs), etc. for realization of connected factories, warehouses, controlled-environment agriculture, and other such scenarios that may be characterized as IIoT or similar thereto.

Some specific deployments of connected systems and devices in IIoT and related scenarios may include, inter alia, management systems (e.g., industrial computing systems for logic and controller programming, for collecting and quantifying metrics and other data, and for maintaining system and data security and integrity), wireless transmit and/or receive units responsible for executing instructions, human machine interface (HMI) devices (e.g., tablets, panels, wearables, etc.) through which some instructions may be input, and other user equipment (UE). Broadly, a UE may be a device having at least one of transmit and/or receive capabilities that may serve as one or both of an origination point or a termination point for some data communicated over a network. Illustratively, data may broadly encompass any set of bits intended to convey some information—e.g., data may include user data and may additionally or alternatively include control information, and/or data may be intended for a relatively lower layer on a protocol stack (e.g., a radio resource control (RRC) layer or radio link control (RLC) layer) or a relatively higher layer on the protocol stack (e.g., an application layer or a non-access stratum (NAS) layer).

In some examples, some UEs may be referred to as programmable logic controllers (PLCs). A PLC may include a computing system, such as industrial computing system, that is configured or adapted for control of production and/or manufacturing processes. A PLC may include ruggedized computing systems that withstand the physical toll that IIoT deployments have the potential to exact on computing systems (e.g., due to increased temperatures, increased particulate matter, etc.).

In some other examples, some UEs may be referred to as sensor/actuators (S/As). An S/A broadly refers to any device that is capable of physically manifesting computer code (e.g., a robot, AGV, heater, motor, etc.) and/or capable of converting physical phenomena into digital signals (e.g., a thermometer, pressure gauge, magnetometer, etc.). A PLC may provide an interface with one or more S/As, for example, to reprogram an S/A, to retrieve some local data, and so forth.

In some aspects, a PLC may instruct an S/A to execute one or more operations, and/or the PLC may provide the S/A with some parameters to be followed in the course of operations (e.g., a periodicity at which to obtain measurements, an amount of force to apply, etc.). In some other aspects, a PLC may receive information that an S/A has sensed or detected. For example, a PLC may receive one or more measurements obtained by an S/A, such as a temperature reading, a distance, and so forth.

In many instances, PLCs are not collocated with the S/As with which the PLCs communicate. In order to instruct an S/A to perform an operation or obtain a reading from an S/A, a communication link may be established between the PLC and the S/A. Such connections may be established via wired or wireless networks, such as Industrial Ethernet, Wi-Fi, or a personal area network (PAN) such as Bluetooth. Many IIoT environments expect the systems and devices therein to adhere to certain criteria, as the risk of severe or catastrophic damages to persons, property, and/or financial interests may be significant. For example, PLCs and S/As may be subject to various conditions in terms of speed and reliability, such as conditions on data rate and block error rate (BLER), respectively.

The present disclosure describes various techniques and solutions to connectivity in IIoT applications using at least one of a radio access technology (RAT) and direct device communication (which may be associated with a certain RAT), that are suitable both in terms of cost and complexity and in terms of the many parameters and other conditions imposed upon connected networks and devices in IIoT applications and other contexts, such as high reliability or low latency.

With IoT and IIoT as illustrative applications, the disclosure herein provides for UE (e.g., PLC and S/A) connectivity according to at least one wireless or RAT, such as 5G New Radio (NR) or Long Term Evolution (LTE). The techniques and solutions provided herein may be implemented in an access network, such as the 5G NR radio access network (RAN), and/or may be implemented through device-to-device (D2D) communication. For example, the at least one RAT may offer some wireless communication protocols, use cases, or other technologies enabling UEs, base stations, and other network systems and devices to adhere to express and inherent conditions that UEs are expected to observe in IIoT and other similar communication systems.

In some aspects of the present disclosure, a direct device communication path between two UEs, such as a PLC and an S/A, may be carried on sidelink channels, as with D2D communication. Illustratively, sidelink communication between UEs may be on the PC5 interface specified by the Third Generation Partnership Project (3GPP) for LTE, 5G NR, and beyond. Such direct device communication may provide some benefits over existing implementations (e.g., Industrial Ethernet, Wi-Fi, etc.), as the capacity on direct device connections (e.g., on the PC5 interface) may offer improvements upon link capacity, latency, and power consumption, either individually or in any combination thereof.

Potentially, however, direct device communication may not be perpetually available. For example, a sidelink channel may become blocked or interference on the sidelink channel may prevent transmissions from being successfully received and decoded. In other words, a direct device communication path may lack the requisite reliability expected out of PLCs, S/As, and other UEs. Therefore, a direct device communication path may be supplemented or backed up by another link, such as an indirect communication path.

An indirect communication path through the access network (e.g., at least one base station) may feature a relatively high reliability, particularly in comparison with direct device communication, e.g., as an indirect communications may include multipath diversity and increased transmission powers. Such multipath diversity and increased transmission powers may be unattainable on direct device communication paths with UEs having fewer multipath components, or may lack multipath diversity entirely, while also having transmission powers potentially subject to network control, physical size or device form factor constraints, and/or battery considerations.

However, indirect connections are likely not competitive with direct device connections in terms of capacity. Specifically, the load and resource consumption forced on the access network if all IIoT communication were to be carried thereon is likely prohibitive, as the available resources would be substantially reduced. Moreover, the addition of at least one hop, rendering the communication path between two UEs as a multipath link, may increase the latency in packet transmissions. In effect, an indirect communication path may feature relatively higher reliability but relatively lower capacity and latency when compared with a direct device communication path.

In view of the foregoing, the characteristics of direct device communication are largely complementary to those of indirect (or multi-hop) communication. Therefore, a deployment of both types of communication links in some scenarios, such as for IIoT communication, may be beneficial in terms of link capacity, reliability, latency, and the like. By way of illustration, a direct device communication path may be supported by another communication path, such as an indirect communication path through a base station or other access network entity (although other types of communication paths using other technologies or standards may also be possible).

Selection of one or both of the paths may be predicated upon characteristics of one or both of the direct device communication path (e.g., sidelink channel) and indirect communication path. For example, a UE may select the direct device communication path if a QoS condition is satisfied by the communication path, such as a condition stipulating a data rate or reliability (e.g., interference level) on the direct device path that must first be met before the direct device path is selected for a transmission. In another example, the UE my select the indirect communication path instead of the direct device path in instances in which the direct device communication path is blocked or unavailable due to physical distance between UEs.

In a further example, the UE may select both the indirect and direct device paths for a transmission where the nature of a transmission is critical (e.g., mission critical), emergency, or otherwise of very high importance, which may result in some data redundancy over the two communication paths that serves to increase reliability. However, access networks may lack functionality for path switching, path selection, and/or path redundancy (e.g., duplicate transmission). As further described herein, however, the protocol stack of some UEs (e.g., PLCs and S/As) may be adapted for inclusion of such functionality, e.g., by the addition of a "management" layer, which may logically reside above a packet data convergence protocol (PDCP) layer.

Some further aspects of path management and other wireless communication techniques are also provided herein.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 170 through first backhaul links 132 (e.g., S1 interface). The base stations 102 configured for 5G NR, which may be collectively referred to as Next Generation RAN (NG-RAN), may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless. At least some of the base stations 102 may be configured for integrated access and backhaul (IAB). Accordingly, such base stations may wirelessly communicate with other such base stations. For example, at least some of the base stations 102 configured for IAB may have a split architecture that includes at least one of a central unit (CU), a distributed unit (DU), a radio unit (RU), a remote radio head (RRH), and/or a remote unit, some or all of which may be collocated or distributed and/or may communicate with one another. In some configurations of such a split architecture, the CU may implement some or all functionality of a RRC layer, whereas the DU may implement some or all of the functionality of a RLC layer.

Illustratively, some of the base stations 102 configured for IAB may communicate through a respective CU with a DU of an IAB donor node or other parent IAB node (e.g., a base station), further, may communicate through a respective DU with child IAB nodes (e.g., other base stations) and/or one or more of the UEs 104. One or more of the base stations 102 configured for IAB may be an IAB donor connected through a CU with at least one of the EPC 160 and/or the core network 190. In so doing, the base station(s) 102 operating as an IAB donor(s) may provide a link to the one of the EPC 160 and/or the core network 190 for other IAB nodes, which may be directly or indirectly (e.g., separated from an IAB donor by more than one hop) and/or one or more of the UEs 104, both of which may have communicate with a DU(s) of the IAB donor(s). In some additional aspects, one or more of the base stations 102 may be configured with connectivity in an open RAN (ORAN) and/or a virtualized RAN (VRAN), which may be enabled through at least one respective CU, DU, RU, RRH, and/or remote unit.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink and uplink (e.g., more or fewer carriers may be allocated for downlink than for uplink). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using D2D communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 191. The IP Services 191 may include the Internet, an intranet, an IMS, a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a UE 104 (e.g., a PLC) may be configured to establish a direct wireless communication link 197 and an indirect wireless communication link 198 with another UE 104' (e.g., an S/A) to carry data associated with one traffic stream. The direct communication link 197 may include a sidelink connection, such as a D2D or other similar connection, whereas the indirect communication link 198 may traverse one or more network entities that may facilitate the communication between the UEs 104, 104', such as a base station 102/180.

Further, the UE 104 may be configured to communicate with the other UE 104' over at least one of the direct communication link 197 or the indirect communication link 198 after the direct communication link 197 and the indirect communication link 198 are established with the other UE 104' (199). In some aspects, communication between the UEs 104, 104' may include a degree of redundancy, which may be realized on one or both of the communication link 197, 198. For example, the UE 104 may transmit a set of data packets on the direct communications link 197, and may further transmit a set of redundant data packets on the indirect communications link 198, thereby increasing the probability that each of the data packets will be successfully received by the other UE 104'.

Various other aspects related to reducing latency while increasing reliability and/or capacity on communication links are further described herein.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies. Further, the various techniques and solutions provided by the present disclosure may be described with reference to IoT, and specifically IIoT; however, the various concepts and aspects herein may be applicable across a broad range of contexts and implementations, and so are not limited to IIoT or IoT. Thus, one of ordinary skill in the art will recognize that many of the various concepts and aspects described herein may be implemented outside of a factory, production floor, automated workflow, or other IIoT context without departing from the scope of the present disclosure.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds ($\mu$s). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB)

(also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one pilot and/or reference signal (RS) for the UE. In some configurations, an RS may include at least one demodulation RS (DM-RS) (indicated as $R_x$ for one particular configuration, where 100× is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 2B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (ID) (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), such as scheduling requests (SRs), a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
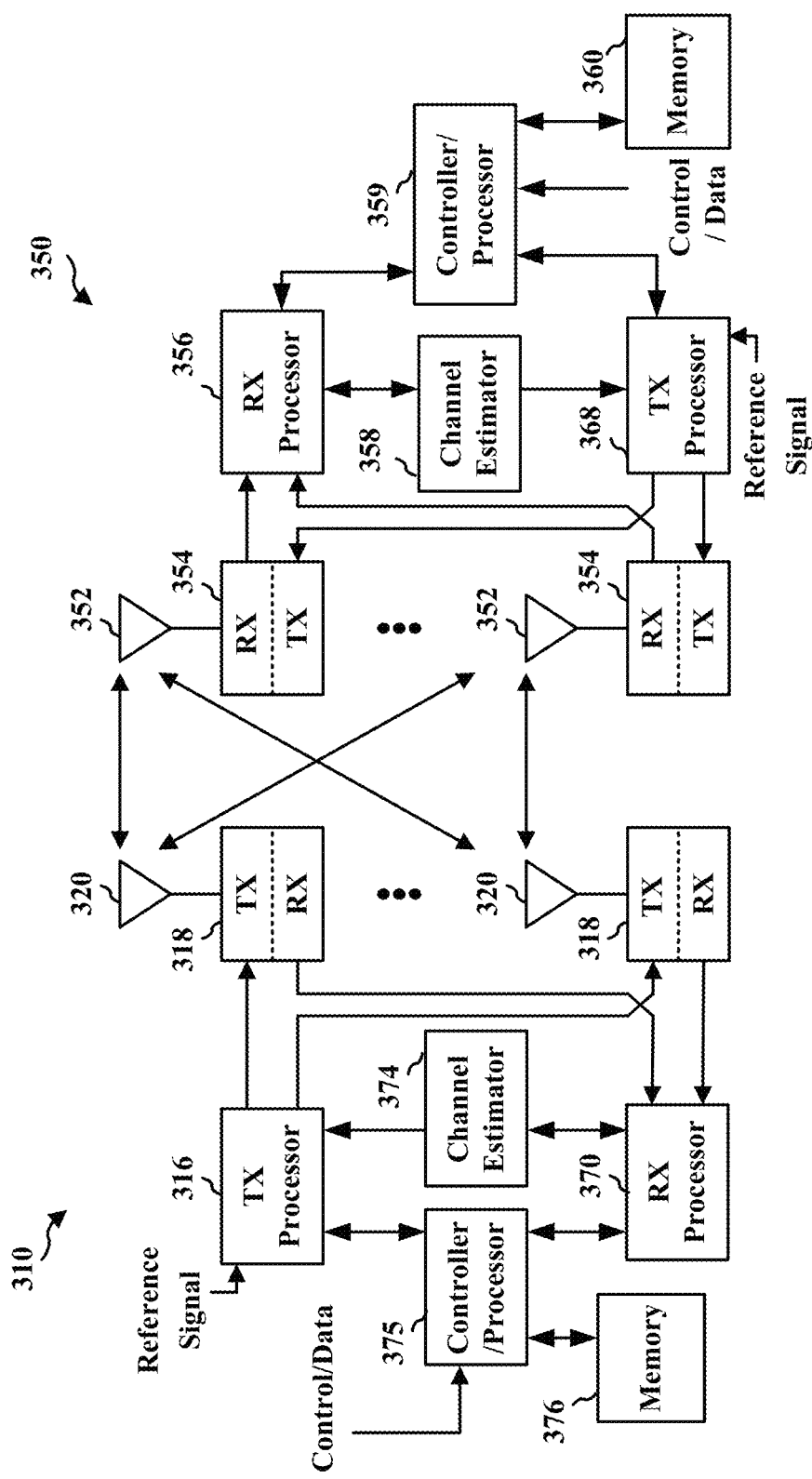
FIG. 3 is a diagram illustrating an example of a base station and user equipment (UE) in an access network.

FIG. 3 is a block diagram of a base station 310 in communication with a UE 350 in an access network. In the downlink, IP packets from the EPC 160 may be provided to a controller/processor 375. The controller/processor 375 implements Layer 2 (L2) and Layer 3 (L3) functionality. L3 includes an RRC layer, and L2 includes a service data adaptation protocol (SDAP) layer, a PDCP layer, an RLC layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement Layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement L1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements L3 and L2 functionality.

The controller/processor 359 can be associated with a memory 360 that stores program codes and data. The memory 360 may be referred to as a computer-readable medium. In the uplink, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the downlink transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the uplink, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with (199) of FIG. 1.

Figure 4:
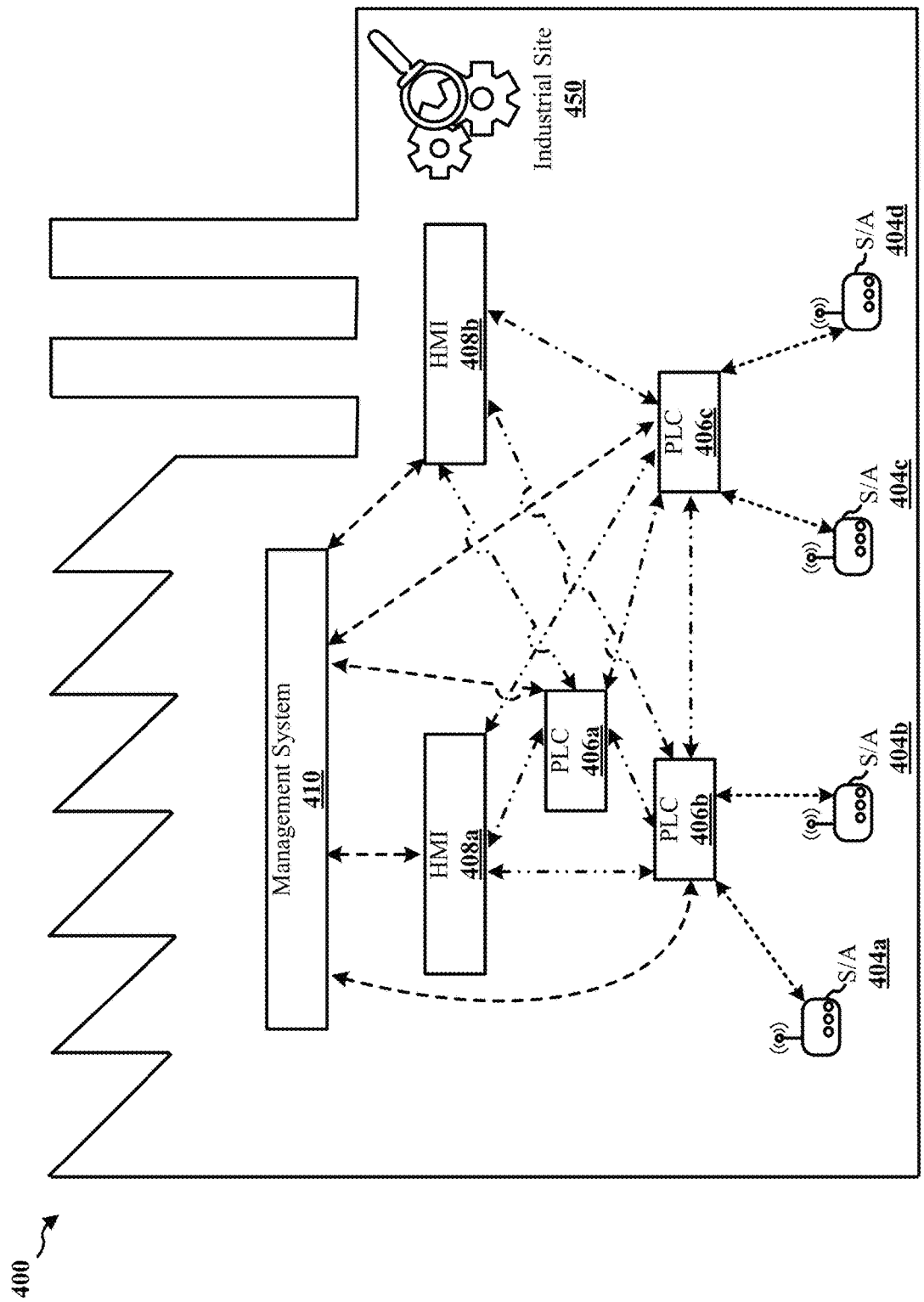
FIG. 4 is a diagram illustrating an example implementation of an Industrial Internet of Things (IMT) network at an industrial site.

FIG. 4 is a diagram 400 illustrating an example implementation of an IIoT network at an industrial site 450. In some aspects of IIoT, an industrial site 450 may include, inter alia, a management system 410, a set of HMIs 408*a-b*, a set of PLCs 406*a-c*, and a set of S/As 404*a-d*. Potentially, one or more of the illustrated communication systems and devices may be remotely located.

The management system 410 may include at least one computing system, such as a personal computer (PC) that may be customized or otherwise adapted for IIoT deployment. The management system 410 may implement controller programming for the IIoT network of the management system 410. Further, the management system 410 may be responsible for the software and security management of the IIoT network, as well as monitoring and recordation of key performance indicators (KPIs).

The management system 410 may include and/or may be connected with a set of HMIs 408*a-b*. Each of the HMIs 408*a-b* may provide an interface to the management system 410 and/or other system(s) and device(s). For example, the HMIs 408*a-b* may be configured to receive input from a user. To that end, some of the HMIs 408*a-b* may implement machine control at the floor, such as start and stop of a processes. Examples of the HMIs 408*a-b* include tablet computers, panel computers, wearable devices, handheld devices, automated reality/virtual reality (AR/VR) systems and devices, and so forth.

At the floor (and elsewhere), the industrial site 450 includes a plurality of S/As 404*a-d*. Each of the S/As 404*a-d* may be any device that is capable of physically manifesting computer instructions, such as a rotary motor or a linear servomotor, and/or any device capable of converting physical phenomena into digital signals, such as a position sensor or a thermometer.

Control and operation of the each of the S/As 404*a-d* may be driven through at least one of the PLCs 406*a-c*. That is, each of the PLCs 406*a-c* may be configured to issue a set of commands (e.g., motion or actuation) to one or more of the S/As 404*a-d* and/or receive a set of inputs (e.g., sensor feedback) from one or more of the S/As 404*a-d*. Further, the PLCs 406*a-c* may coordinate with one another, e.g., for cohesive operation across the industrial site 450. Each of the PLCs 406*a-c* may include a computing device, such as industrial PC, that is configured or adapted for control of one or more production and/or manufacturing processes. In some aspects, one or more of the PLCs 406*a-c* may include customized hardware and/or software specifically designed for the industrial site 450 and/or for the manufacture or processes performed thereat.

The aforementioned systems and devices may be some realization of Industry 4.0—that is, the fourth industrial revolution. Industry 4.0 may generally refer to scalable automated and machine-implemented industry and manufacture, in which the means of manufacture and production shifts toward machine-to-machine (M2M) and IoT communication that reduces the level of human intervention and/or increases output.

In some other IIoT applications, connectivity of similar systems and devices at various sites related to Industry 4.0 may be implemented with Industrial Ethernet, Wi-Fi, and/or Bluetooth. However, each of these connectivity mechanisms has respective drawbacks, for example, in terms of implementation and realization costs and complexities or in terms of performance (e.g., latency) and reliability (e.g., error rate) characteristics. For example, Industrial Ethernet may be difficult to implement and maintain due to the presence of wired connections, of which many industrial sites may be prohibitive. On the other hand, Bluetooth and Wi-Fi may fail to meet performance criteria expected to be satisfied. Table 1, infra, illustrates some conditions expected of connected systems and devices for IIoT applications.

|  | PLC to S/A | Inter-PLC | PLC-to-higher entities (e.g., HMI, management system) |
|---|---|---|---|
| Round trip time (RTT) | 0.5-10 ms | 4-10 ms | Similar to enhanced mobile broadband (eMBB) use cases (e.g., file download, HTML); also extends to AR/VR |
| Packet error rate (PER) target | $10^{-6}$ | $10^{-6}$ | |
| Packet size | 40-256 bytes | 1 kilobyte (kB) | |
| Range | Up to 100 meters (m); typically 10-15 m | Typically 100 m | |

Figure 5:
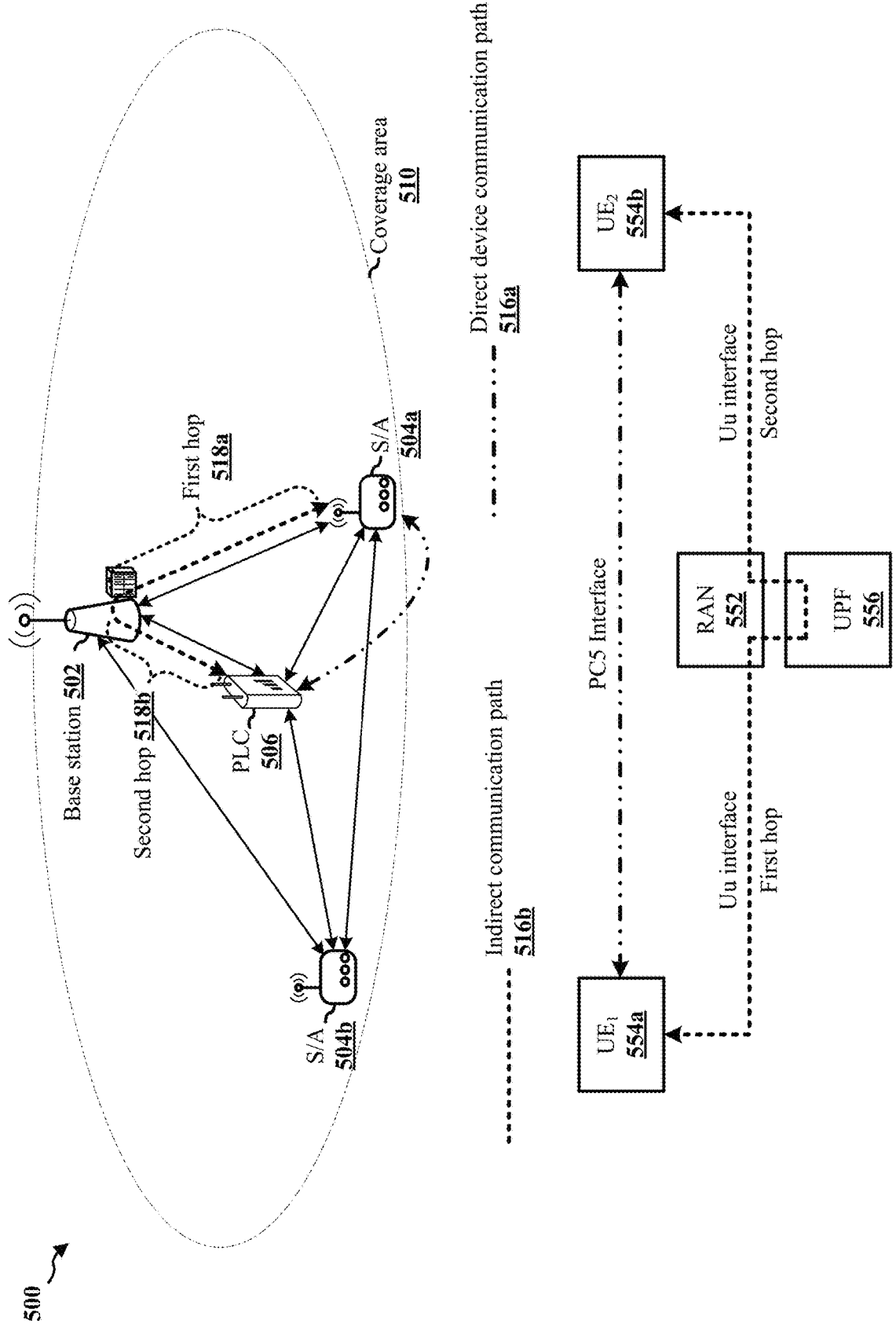
FIG. 5 is a diagram illustrating example paths of communication between at least one programmable logic controller (PLC) and a set of sensor/actuators (S/As) for IIoT connectivity.

FIG. 5 is a diagram 500 illustrating example paths of communication between at least one PLC 506 and a set of S/As 504a-b for IIoT connectivity. In the illustrated aspect, the PLC 506 and the S/As 504a-b (e.g., UEs) may be subscribers of a RAN and may be in a coverage area 510 provided by a base station 502 of the RAN. In addition, some or all of the base station 502, PLC 506, and/or S/As 504a-b may be connected to one another.

Much of the network traffic exposed on an IIoT network may be between the PLC 506 and the S/As 504a-b. For example, the traffic between the PLC 506 and the S/As 504a-b may be mission critical (MiCr), essential, or otherwise fundamental to the operation of at least a portion of at least one aspect of a manufacturing or industrial entity (e.g., a company, an industrial site, etc.). As such, network traffic between the PLC 506 and the S/As 504a-b may be subject to stringent guidelines, e.g., in terms of latency, reliability, throughput, and so forth.

In an effort to meet the guidelines imposed thereon, the PLC 506 and S/As 504a-b may support direct device communication, e.g., according to a technology standardized for compatibility with a RAT to which the RAN (and by extension, the base station 502) belongs, such as some implementations of D2D communication in 3GPP. For example, the PLC 506 and S/As 504a-b may communicate on a PC5 interface over sidelink channels. Accordingly, the PLC 506 and at least one of the S/As 504a-b, such as the first S/A 504a, may establish a direct device communication path 516a over which the two may communicate. The direct device communication path 516a may feature low latency and high capacity, e.g., relative to indirect communication through the base station 502 and/or other RAN entity. In addition, the direct device communication path 516a may be less resource expensive in terms of power consumption relative to indirect communication.

Direct device communication may be carried on sidelink channels, which may include channels dedicated to such direct device communication that are separate from or multiplexed with uplink and downlink channels between the PLC 506/S/As 504a-b and the base station 502. However, the PLC 506 may also establish an indirect communication path 516b with the first S/A 504a.

The indirect communication path 516b may be a multi-hop path through at least one network entity. For example, the indirect communication path 516b may include a first hop 518a between the PLC 506 the base station 502 and a second hop 518b between the base station 502 and the first S/A 504a. In implementation of the indirect communication path 516b, the PLC 506 and S/As 504a-b may communicate through the base station 102/180 on a Uu interface, e.g., over uplink or downlink channels, random access channels, broadcast channels, etc.

The indirect communication path 516b may fail to achieve the same latency level and link capacity as the direct device path 516a, and transmissions on the indirect communication path 516b may involve an appreciably greater amount of power than those on the direct device path 516a. However, the indirect communication path 516b may feature greater reliability than the direct device path 516a. Individually, communication on the direct device path 516a may lack some or all multipath components present for communication on the indirect path 516b. For example, in comparison to the base station 502 (e.g., gNB), the PLC 506 and S/As 504a-b necessarily include fewer antenna elements (e.g., due to device form factor) and lesser transmission powers (e.g., due to battery consumption and interference factors), which may force direct device communication onto a single path (e.g., line-of-sight path) as a receiving device may either lack the requisite antenna technology to realize such diversity, or the transmitting device may lack the requisite power necessary to generate signals resulting in reliable multipath components at the receiver. Coupled with the risks from blockages, interference, and other channel degradation contributors, reliance on the direct device communication path 516a alone may inject a degree of risk uncertainty that is unacceptable for some or al IIoT deployments.

In view of the foregoing considerations, communication between UEs in an IIoT environment (e.g., communication between the PLC 506 and at least one of the S/As 504a-b or between the two S/As 504a-b) may be managed so as to select a communication path that is suitable for the rigid communication constraints demanded of the PLC 506 and S/As 504 on the communication paths 516a-b. In other words, communication paths in IIoT deployments may be managed in order to meet the requisite conditions enforced on network communication.

In some aspects, a $UE_1$ 554a of the UEs 554a-b—e.g., a transmitting one of the S/As 504a-b or PLC 506—may determine that some information, whether data or control, is especially delay-intolerant or is of paramount importance—for example, $UE_1$ 554a may be configured to assign a relatively high (e.g., highest) priority to some information or instructions, such as MiCr information, emergency warnings, catastrophic fault/failure detection and recovery procedures, etc. Potentially, $UE_1$ 554a may be of a type specifically deployed for distribution of such high-priority information, and therefore, most or all information transmitted by $UE_1$ 554a may be classified as high priority by virtue of being transmitted by $UE_1$ 554a. In some other aspects, $UE_1$ 554a may obtain some sensor data (e.g., temperature, pressure, toxicity level, etc.) and may determine that the data is indicative of an emergency or otherwise time-sensitive situation.

When $UE_1$ 554a determines such high-priority information should be transmitted to other systems and devices, such as $UE_2$ 554b (e.g., another one of the S/As 504a-b or the PLC 506). Doing so, however, involves the risk of failure, should $UE_2$ 554b fail to successfully receive some or all of a set of packets carrying high-priority information. In some instances, however, this risk may be reduced, and the probability that $UE_2$ 554b successfully receives such high-priority information may be increased, through redundant data transfer or other path management techniques and solutions.

According to some approaches, $UE_1$ 554a may implement redundant transfer with transmission of a set of packets (e.g., carrying the high-priority information) over both the direct device communication path 516a and the indirect communication path 516b. Thus, if one or more of the set of packets fails on one of the paths 516a-b (e.g., $UE_2$ 554b misses a packet transmission or a decoding error prevents accurate packet recovery), $UE_2$ 554b is afforded another opportunity to successfully recover those one or more packets without the added delay unavoidably inherent in feedback-based retransmission mechanisms (e.g., NACK feedback) and without the risk of retransmission futility if the issue causing the initial packet recovery failure remains unresolved at the time of retransmission of the initial packet(s) (e.g., an unresolved issue such as a blocker that remains in a communication path or a high level of ongoing interference at the environment of the receiver causing an unrecoverable number of bit erasures, etc.).

The foregoing redundant transfer mechanism may not be suitable for all scenarios. While reliable communication between IIoT systems and devices may be a desirable characteristic, scenarios are unlikely in which every transmission from a UE is of such overriding importance that all other factors are excluded from consideration. More plausibly, the various factors will be weighed against one another, and selection of one or both communication paths over which to transmit will be a situation-specific cost-benefit analysis, which may be dynamic and/or may follow a set of static rules.

Redundant message transmission on two (or more) communication paths may be expensive in terms of overhead costs with respect to resource consumption. For example, the exclusionary nature of resource allocation for message transmission may reduce each of the sidelink (for the direct device path), uplink (for the first hop of the indirect path), and downlink (for the second hop of the indirect path) pools of resources available for other transmissions. Thus, the mobile network operator (MNO) of the RAN may wish to reduce the amount of resources allocated to redundant transmissions to prevent overall degradation of network performance.

Furthermore, some radio and processor operations inherently performed for transmission or reception of packets may be twice as expensive with respect to power (e.g., battery) and computational resource (e.g., instruction cycles, processor capacity) consumption, as each duplicated packet may be substantially equal in costs to transmit from one UE and costs to receive and decode at the other UE (e.g., in order to ascertain whether a received packet is in fact duplicative). While acceptable in some instances, incurring these costs may be deleterious or unsustainable for each packet transmission.

As further described, infra, UEs may be configured with a protocol stack having functionality enabling early detection of packets carrying duplicative information. Such early detection may mitigate some costs that would otherwise be incurred by receiving UEs during redundant transfers. Additionally or alternatively, UEs of the present disclosure may be adapted to perform some path management operations that may reduce or defray some other expenses that might otherwise be incurred by existing systems and devices. However, the foregoing assumes that existing systems and devices are even capable of redundant data transfer over two different communication paths or established/active links, which may not necessarily be the case. For example, the configuration or standardization of some RANs or other networks may be prohibitive of autonomous path management by terminal or user devices. Regardless of the difference(s), UEs and other systems and devices described herein may feature some beneficial configurations and characteristics that may improve IIoT connectivity and/or other aspects of wireless communication.

In particular, $UE_1$ 554a may manage communication paths over which to transmit, e.g., so as to avoid redundant transmission, by selecting at least one communication path identified as more likely to facilitate expeditious packet delivery with data integrity than another communication path. To that end, $UE_1$ 554a may measure at least one QoS value on at least one of the direct device communication path 516a or the indirect communication path 516b. For example, $UE_1$ 554a may measure at least one respective PER, packet loss rate, etc., based on communication (e.g., transmission or reception) of a respective set of packets over each of the one or more candidate communication paths, such as a set of specialty packets specifically communicated for QoS measurements. $UE_1$ 554a may compare the measured QoS value with a threshold (e.g., an acceptable threshold, a threshold specific to a relevant IIoT deployment, etc.) and/or with another QoS value measured on the indirect communication path 516b. If the measured QoS value associated with the direct device path 516a is determined to satisfy (e.g., meet or exceed) the threshold (and/or meet or exceed the other QoS measurement from the indirect communication path 516b), then $UE_1$ 554a may transmit on the direct device path 516a (e.g., on the PC5 interface), and may refrain from transmitting on the indirect path 516b (e.g., on the Uu interface).

However, if $UE_1$ 554a determines that the direct device communication path 516a is (temporarily) blocked or the measured QoS value fails to satisfy (e.g., is less than) the threshold (and/or if the other QoS measured on the indirect path 516b is greater than that measured on the direct device path 516a), then $UE_1$ 554a may select the indirect communication path 516b on which to communicate with $UE_2$ 554b. Accordingly, $UE_1$ 554a may transmit a set of packets to the $UE_2$ 554b along a multi-hop path on a Uu interface, which may traverse at least two hops over the RAN 552 (e.g., via the base station 502), with a UPF 556 directing the set of packets to the intended recipient $UE_2$ 554b.

Figure 6:
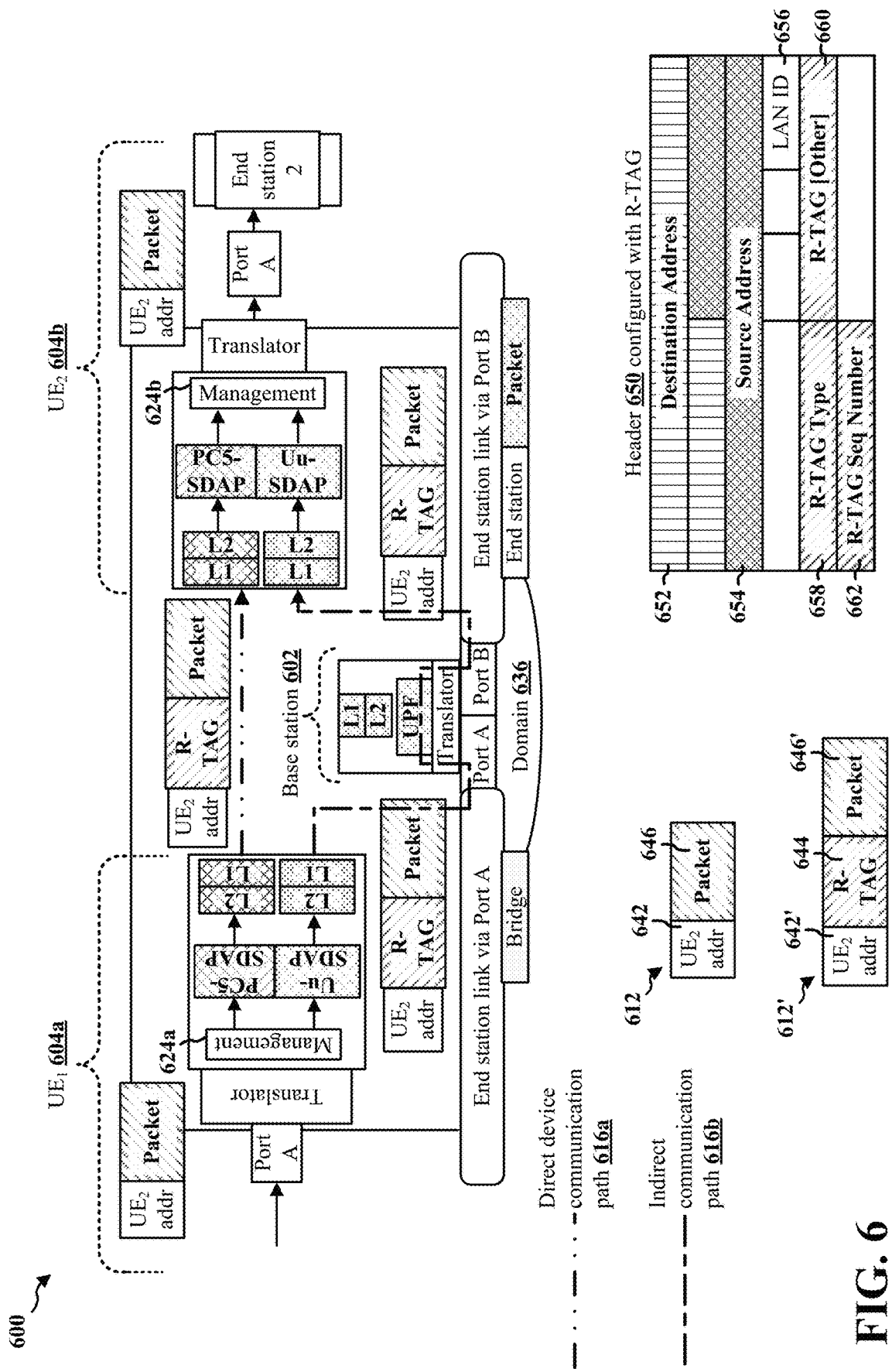
FIG. 6 is a diagram illustrating an example of redundant user plane paths between UEs.

FIG. 6 is a diagram 600 illustrating an example of redundant transfer on the user plane over communication paths between two UEs 604a-b. In some aspects, one of the UEs 604a-b may be a PLC, while the other of the UEs 604a-b may be an S/A. Both the PLC and the S/A may be deployed in the same domain 636—e.g., a domain may include a group of commonly managed devices or a set of devices that are configured by the same management mechanism. The domain 636 may be or may include an IIoT domain, such as an IIoT domain deployed at an manufacturing, production, or other industrial site.

The UEs 604a-b may be within a coverage area of the base station 602, and therefore, the UEs 604a-b may be connected with an access network. More particularly, the UEs 604a-b may be connected with one another through the access network, with any traffic flow therebetween. However, any communication between the UEs 604a-b will be transmitted through the base station 602, at which point the packet 612 may be handled by a UPF. The UPF, which may or may not be collocated with the base station 602, may find the location (or area) of $UE_2$ 604b, and the UPF may proceed with relaying the packet 612 to $UE_2$ 604b.

At a minimum, two hops are incurred by this network-assisted mechanism for packet transmission between UEs: (1) the first hop from $UE_1$ 604a to the base station 602; and (2) the second hop from the base station 602 to $UE_2$ 604b. Inherently, this indirect mode increases the latency in packet delivery relative to direct transmission, as processing of the packet 612 (e.g., to identify and locate the recipient) by the UPF and/or base station 602, as well as transmission and reception by the base station 602, may consume a non-negligible amount of time which, by extension, reduces the overall available delay budget.

In the various aspects shown in FIG. 6, $UE_1$ 604a may have a set of packets, including the illustrated packet 612, to transmit to $UE_2$ 604b. Transmission of the packet 612 may be expected to conform to be very low latency and/or high reliability criteria, e.g., as with as ultra-reliable low-latency communication (URLLC) use cases. For example, latency in packet transmission between the UEs 604a-b may be less than 1 ms, while simultaneously, and simultaneously, a packet loss rate of $10^{-6}$ may not be exceeded in order to ensure high reliability of that packet transmission (although different delay budgets and error rates may vary in acceptability across different deployments). When the UEs 604a-b are communicating with one another, coordination of such communication by and/or through the base station 602 or other separate resource management system may be impractical or undesirable, e.g., as inclusion thereof may incur time-domain overhead that further reduces the available delay budget.

However, assigning packet transmission between the UEs 604a-b on to a direct device channel (e.g., sidelink channel) that does not traverse the base station 602 or other network entities may also be ineffective to meet the high reliability expected of packet transmission between the UEs 604a-b. For example, where the UEs 604a-b are each implemented as one of a PLC or an S/A, direct device communication therebetween does not guarantee a maximum threshold that will not be exceeded, such as a maximum permissible bit error rate (BER), PER, and/or packet loss rate. In the present example, direct device communication between a PLC and S/A cannot be guaranteed to meet a packet loss rate of $10^{-6}$.

Relative to the base station 602, the UEs 604a-b may have very few antennas elements, particularly where one or both of the UEs 604a-b is classed as low complexity. Consequently, the UEs 604a-b may be unable to benefit some wireless diversity schemes that implement multipath components, such as spatial diversity schemes. Rather, the direct device link between the UEs 604a-b may substantially rely on a dominant path, such as the link-of-sight (LoS) path. Such configuration may be more susceptible to blockages and other interference than access network links through the base station 602, and this susceptibility may be amplified by limitations placed upon UE or direct device transmit power.

In view of the foregoing, various techniques and solutions may be applied to the illustrated deployment in order to support multi-path/multi-hop transmission and transmission aggregation across paths. In order to effect these techniques and solutions, the protocol stack of some connected systems and devices may be configured with a management layer, such as the management layers 624a-b with which the UEs 604a-b are respectively configured.

In some aspects, a management layer may logically reside above L2 of a device's protocol stack. For example, the management layer may logically reside above the PDCP layer and, in some aspects, above the SDAP layer (n.b., though separately illustrated here, the SDAP layer may be regarded as an L2 layer). However, the management layer may logically reside below at least one of application layer, Layer 4 (L4), L3, and/or below a network layer (e.g., an IP layer). In other words, packets (e.g., PDUs or SDUs) traveling up the protocol stack of a UE may be received at L1, passed to L2, and then passed to the management layer before being passed to the application layer or, in some aspects, L3 or network layer. Potentially, the management layer may be implemented as a sub-layer of L3, as a layer between L2 and L3, as the highest sub-layer of L2, or as the first layer of a network layer (e.g., below an IP layer).

In some aspects, various path management operations may be controlled at the management layers 624a-b. To that end, the UEs 604a-b may establish at least two communication paths 616a-b therebetween, a first of which may be a direct device communication path 616a, e.g., over a sidelink channel on the PC5 interface, and a second of which may be an indirect communication path 616b through at least the base station 602 of the access network, e.g. over uplink/downlink channels on the Uu interface. The management layers 624a-b of the UEs 604a-b may communicate to discover and query availability and capability information related to one another, e.g., so that redundant paths can me established. As further described herein, such discovery and capability information may be communicated over the control plane, such as a sidelink control plane separate from an access network control plane.

Each of the at least two communication paths 616a-b may be established on a respective radio bearer, e.g., so that L1 and L2 entities at the UEs 604a-b treats each of the communication paths 616a-b is independent and unrelated to the other communication path. The management layers 624a-b at each of the UEs 604a-b may be responsible for establishing one or more of the radio bearers, and may be further responsible for activating and deactivating communication paths. In some aspects, the establishment and/or activation, as well as the termination and/or deactivation, of radio bearers used for communication paths in the context of low latency and high reliability communication between PLCs and S/As may be restricted to the management layer, and may not be exposed to other layers.

One or more limitations may be characteristic of each of the direct device and network-assisted indirect links, such as insufficient reliability and unsatisfactory latency, respectively. However, though the potential exists for packet transmission that is unreliable on the direct device path 616a and/or exceeds a latency budget on the indirect path 616b, neither will necessarily occur with each packet transmission. Thus, each packet may be delivered through each of the direct device path 616a and the indirect path 616b within the high reliability and very low latency criteria. The respective characteristic lower latency or higher reliability of the direct device path 616a and the indirect path 616b may be leveraged in the aggregate to effectively act as a virtual link between the two UEs 604a-b, e.g., that satisfies the high reliability and very low latency criteria specified for PLC-to-S/A, inter-PLC, or other similar IIoT-related communication.

Figure 7:
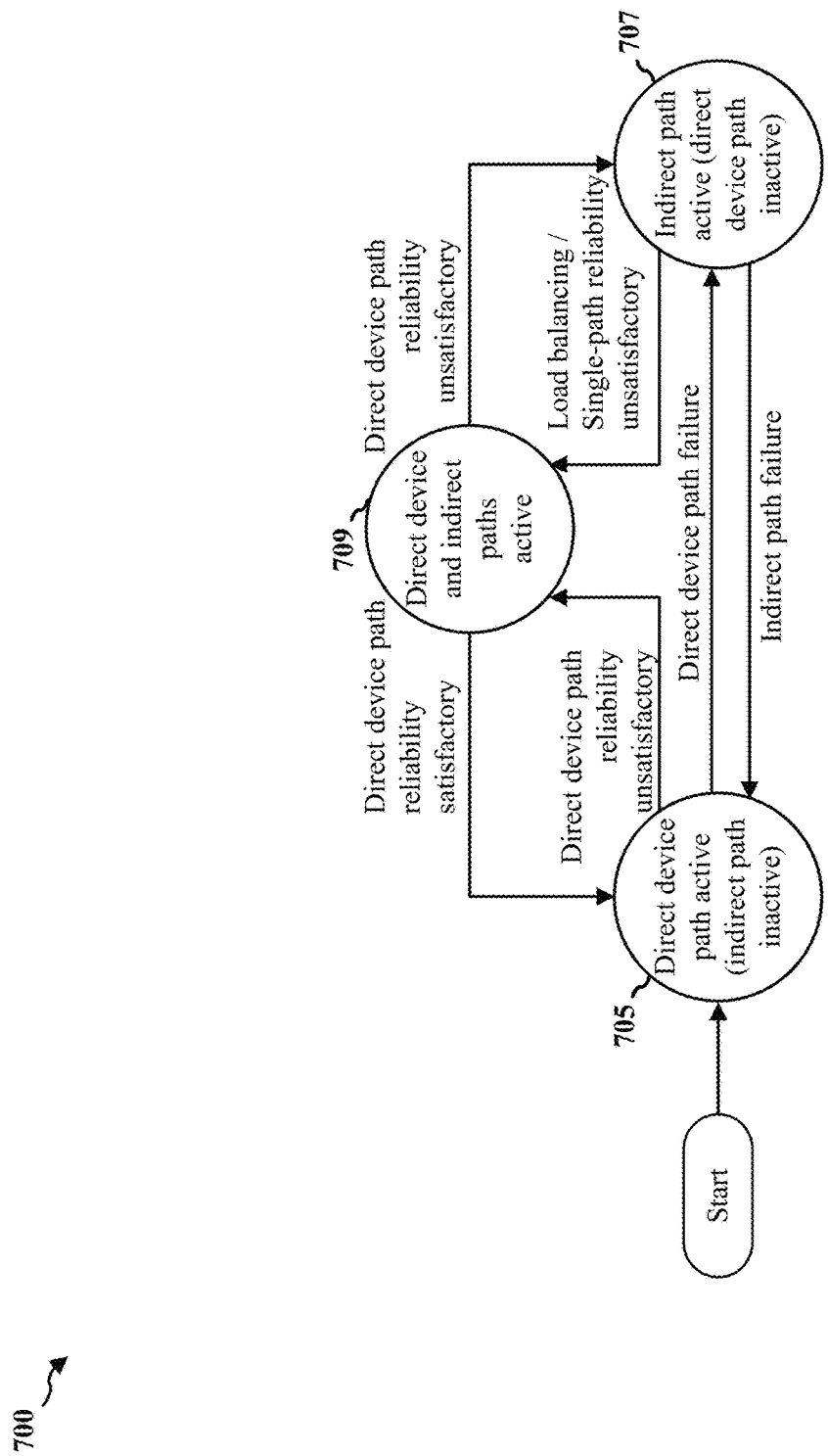
FIG. 7 is a state diagram illustrating example connectivity states and conditions triggering transitions therebetween.

FIG. 7 is a state diagram 700 that illustrates the various states of packet transmission from a PLC or S/A (e.g., $UE_1$ 604a) to another PLC or S/A (e.g., the UE 604b). A UE may be configured to switch between the modes 705, 707, 709 for recovery from radio link failure or other interference inhibiting successful reception and decoding of packets. By switching to an appropriate one of the modes 705, 707, 709, some QoS conditions may be fulfilled, such as by avoiding or reducing service interruptions by switching between different communication paths according to different scenarios and/or adding a redundant data stream to increase data reliability and throughput rate. Accordingly, the risk of time-sensitive, critical, and/or otherwise fault intolerant data becoming stale before transmission and/or expiration of a survival timer may be reduced or substantially eliminated.

In some aspects, a transmitting $UE_1$ 604a, upon arrival at the management layer 624a of a set of packets, may select one of the three modes 705, 707, 709 of transmission for the packet 612. $UE_1$ 604a may be configured with a default or initialization mode, which may be the communication path(s) to which $UE_1$ 604a defaults, and conditions on other path(s) may be evaluated from the position of having selected the default mode already selected.

In the illustrated aspect, $UE_1$ 604a may be initially configured with the direct device path 616a, and any transition to another one of the modes may be predicated upon the inability of the high reliability and/or low latency criteria to be satisfied on the direct device path 616a. For example, when $UE_1$ 604a is to transmit the packet 612, $UE_1$ 604a may, at the management layer 624a, determine whether the direct device path 616a is satisfactorily highly reliable to allow for the packet 612 to be carried thereon.

In some aspects, $UE_1$ 604a may determine whether the direct device path 616a is highly reliable by measure at least one value indicative of the link quality on the direct device path 616a. At the management layer 624a, at least one value may be measured for at least one of a reference signal receive power (RSRP), reference signal receive quality (RSRQ), signal-to-noise ratio (SNR), signal-to-interference-plus-noise ratio (SINR), packet loss ratio, bit error rate, BLER, PER, or the like. Potentially, the UEs 604a-b may communicate and perform measurements on some packets with no or dummy payloads (e.g., specialty packets specifically communicated for measurements).

Upon measuring a value indicative of the channel quality or reliability on the direct device path 616a, $UE_1$ 604a may compare the measured value with a threshold (e.g., a minimum satisfaction threshold, a threshold specific to a relevant IIoT deployment, etc.) and/or with another value of the same type but measured on the indirect communication path 616b. If the channel reliability-associated value measured on the direct device path 616a is determined to be satisfactory based on the comparison(s) (e.g., measured value meets or exceeds the threshold and/or meets or exceeds another channel reliability-associated value measured on the indirect communication path 616b), then $UE_1$ 604a may operate in a first mode 705 in which the direct device path 616a is active and the indirect path 616b is inactive. In the first mode 705, $UE_1$ 604a may transmit a data stream, which may include the packet 612, on the active path—in this example, the direct device path 616a (e.g., on the PC5 interface)—and $UE_1$ 604a may refrain from transmitting the data stream on the inactive path—in this example, the indirect path 616b (e.g., on the Uu interface).

Due in part to limitations on UE design, constraints on UE transmit power, and various other factors, the radio link over the direct device path 616a-b between the UEs 604a-b may fail, and with more frequency than that established with the base station 602. $UE_1$ 604a may detect such radio link failure, which may be appreciably expensive with respect to time cost, by following a different approach to detection than evaluating the link for satisfactorily high reliability (although potentially, radio link failure may be found using the same approach as that used for evaluating the direct device path 616a for satisfactorily high reliability, either alone or in combination with one or more other factors).

In some example aspects, $UE_1$ 604a may include an RRC layer (e.g., at L3) that is configured to detect a radio link failure—e.g., $UE_1$ 604a may include a first RRC layer entity configured for the bearer on the direct device path 616a, and a second RRC layer entity configured for the bearer on the indirect path 616b. (An entity may include software, hardware, firmware, or any combination thereof configured to perform the operations described in connection with the entity.) When one of the RRC layer entities detects that a link failure on a corresponding one of the paths 616a-b, that one of the RRC layer entities may signal the management layer 624a that a radio link failure on that one of the paths 616a-b has been detected. In some other aspects, one or more L2 layers, such as the MAC layer and/or RLC layer may signal some information to the upper layers according to which a radio link failure may be assumed at the management layer 624a. For example, radio link failure can be assumed at the management layer 624a in response to some abrupt or rapid occurrence or consecutive failed occurrences (e.g., retransmission failures), which may be indicated to the management layer 624a from one or more lower layers.

When the radio link on the direct device path 616a fails, recovery therefrom may not be immediate; instead, link recovery by the UEs 604a-b may cost a significant amount of the delay budget. For example, the duration commensurate with $UE_1$ 604a performing some discovery and synchronization procedures with $UE_2$ 604b, or recalculating some beamforming or other transmission parameters (e.g., beamforming weights, transmit power) in order to reestablish the link over the direct device path 616a may consume all or most of the delay budget afforded in the domain 636, which leaves little if any time for packet transfer, and so potentially renders at least some data on the stream stale or unrecoverable. To avoid this sort of reliability failure on the direct device path 616a, $UE_1$ 604a may transition to the second mode 707, which may include an indirect path mode.

In the second mode 707, the direct device path 616a is inactive, whereas the indirect path 616b, including at least one multi-hop connection from $UE_1$ 604a to $UE_2$ 604b through the RAN (e.g., via the base station 602, UPF, and/or other access network entities), is active. In the second mode 707, $UE_1$ 604a may transmit on the indirect path 616b (e.g., on the Uu interface), and may refrain from transmitting on the direct device path 616a (e.g., on the PC5 interface). Thus, when radio link failure is experienced on the direct device path 616a, $UE_1$ 616a may continue a data stream nearly uninterrupted by transitioning from the first mode 705, in which packets are streamed over the direct device path 616a, to the second mode 707, in which packets are streamed in a network-assisted manner over the indirect path 616b.

In some other aspects, the reliability of the direct device path 616*a* may decline or fluctuate at or near the threshold separating measurements indicative of high reliability from those not indicative of high reliability; potentially, however, the direct radio link between the UE 604*a-b* may remain established. For example, the direct device path 616*a* may estimate that highly reliable packet transfer on the direct device path 616*a* is unlikely to be sustained based on trends observed on channel conditions (e.g., declining RSRP, declining RSRQ, etc.). In some such cases, transitioning to the second mode 707 may be undesirable for scenarios that do not involve radio link failure because the low latency on the direct device path 616*a* is sacrificed when the direct device path 616*a* is inactive. Thus, $UE_1$ 604*a* may be configured to operate in a third mode 709.

The way in which transition to the third mode 709 is triggered may be dependent upon which of the first mode 705 or the second mode 707 a UE is operating at the time of transitioning. For example, if $UE_1$ 604*a* is operating in the first mode 705 and the channel conditions are poor or are degrading at more than a threshold rate, then $UE_1$ 604*a* may determine that the reliability of packet delivery on the direct device path 616*a* is unsatisfactory. For example, $UE_1$ 604*a* may determine that a channel reliability-associated value (e.g., RSRP, RSRQ, SNR, SINR, etc.) does not satisfy (e.g., is less than) a threshold at which channel conditions are considered satisfactory for wireless communication, or a set of measured values associated with channel reliability may reflect a decline (or rate of decline) that exceeds a threshold for satisfactory reliability. In order to avoid the data transfer reliability from failing to or remaining at unsatisfactory levels, redundant data transmission may be initiated.

If $UE_1$ 604*a* is operating in the second mode 707, then one or more different events may trigger a transition to the third mode 709. For example, if the set of packets to be transmitted to $UE_2$ 604*b* exceeds the capacity of the resources allocated to the UEs 616*a-b* on the indirect path 616*b*, then rather than delay transmission of some packets until sufficient resources are allocated on the indirect path 616*b*, $UE_1$ 604*a* may offload or redistribute some data pending transmission on the indirect path 616*b* to the direct device path 616*a*, such as by reconfiguring headers of such redistributed packets and/or de-queuing such redistributed packets from a transmission queue or buffer on the indirect path 616*b* and re-queuing those redistributed packets in a transmission queue or buffer on the direct device path 616*a*. Accordingly, $UE_1$ 604*a* may transition from the second mode 707 to the third mode 709.

In another some example, some data may be of a very high priority relative to other data, such as safety- or mission-critical data, and fast, reliable delivery of such very high priority data may be paramount. For such data, $UE_1$ 604*a* may transmission from the applicable one of the first mode 705 or the second mode 707 into the third mode 709 so that the very high priority data is transmitted with redundancy on both the direct device path 616*a* and the indirect path 616*b*. In other aspects, different implementations of dividing packets and redundant versions thereof across different communication paths or bearers maybe practiced at the management layer 624*a* without departing from the scope of the present disclosure.

$UE_1$ 604*a* may not remain in the third mode 709 in perpetuity; rather, $UE_1$ 604*a* may continue to monitor the radio link on the direct device path 616*a*. If values measured on the direct device path 616*a* have improved or are improving, e.g., to the point at which highly reliable data transfer on the direct device path 616*a* can be represented as satisfactory, then $UE_1$ 604*a* may return to the first mode 705. For example, $UE_1$ 604*a* may continuously or periodically measure interference/noise or poll signaling (e.g., RSRP, SNR, SINR, etc. based on reference signals from $UE_2$ 604*b*) on the wireless channel on which the direct device path is configured. $UE_1$ 604*a* may compare one or more measurements based on such measurements or polling to a threshold associated with an acceptable quality of the wireless channel—e.g., such a threshold may define a value at which packet transmission on the direct device path is estimated to be satisfactory. If $UE_1$ 604*a* determines that the measurement(s) satisfy (e.g., meet or exceed) the threshold associated with acceptable quality on the wireless channel, then $UE_1$ 604*a* may transition to the first mode 705.

If, however, $UE_1$ 604*a* is to transition out of the third mode 709 but the first mode 705 continues to provide an inadequate level of reliability, then $UE_1$ 604*a* may transition to the second mode 707. If radio link failure is detected by the management layer (e.g., as signaled by the RRC layer entity for the bearer on the indirect path 616*b*), then $UE_1$ 604*b* may transition to the first mode 705, as even with sub-high reliability, the direct device path 616*a* will still be more reliable than anything the failed radio link can offer.

The preceding examples are intended to be illustrative and not limiting. The conditions triggering transitions between modes 705, 707, 709 may be different in different implementations. For example, a UE may be configured to transition from the first mode 705 to the second mode 707 (or vice versa) in response to receiving NACK feedback on the direct device path 616*a* (or indirect path 616*b*, if applicable) in response to a threshold number of retransmission attempts being exceeded. In some other examples, a UE may be configured to transition from the second mode 707 to the first mode 705 (or vice versa) in response to an absence of ACK feedback on the indirect path 616*b* (or the direct device path 616*a*, if applicable) or in response to expiration of a timeout timer.

Transmission redundancy may be implemented though the third mode 709, as some degree of diversity is achievable with both the direct device path 616*a* and the at least one indirect path 616*b* being simultaneously active. $UE_1$ 604*a* may be able to transmit a set of original packets to $UE_2$ 604*b*, including the example packet 612 indicating the $UE_2$ address 642 and carrying a payload packet 646. If $UE_1$ 604*a* is operating in the third mode 709, then $UE_1$ 604*a* may transmit the set of original packets over one of the direct device path 616*a* or the indirect path 616*b*, and further, may transmit a set of redundant packets that include payload packets respectively duplicating those of the set of original packets over the other one of the direct device path 616*a* or the indirect path 616*b*. $UE_1$ 604*a* may control transmission of the set of packets so that one set of packets is transmitted over the bearer on the direct device path 616*a* and another set of packets is transmitted over the bearer on the indirect path 616*b*.

At the management layer 624*a*, $UE_1$ 604*a* may be aware of the protocol(s) configured for communication in the domain—e.g., a management layer entity may receive (or intercept) signaling from another layer (e.g., a network layer or a data link layer), whether that other layer is higher or lower than the management layer 624*a*. With such protocol awareness at the management layer 624*a*, $UE_1$ 604*a* (e.g., management layer entity) may configure packets such that each is sent on the appreciate one of the radio bearers on a respective one of the direct device or indirect paths 616*a-b*. For example, $UE_1$ 604*a* may configure respective headers of a set of packets to indicate each packet is to be transmitted on the direct device path 616*a* (or bearer thereon), and similarly, UE$_1$ 604*a* may configure respective headers of a set of redundant packets to indicate each redundant packet is to be transmitted on the indirect path 616*b* (or bearer thereon).

In some examples, UE$_1$ 604*a* may intercept packets coming on the protocol stack from another layer, such as a network layer or data link layer, and UE$_1$ 604*a* may change, remove, or insert some information, e.g., according to the radio bearer or communication path on which the packets are to be transmitted. For example, UE$_1$ 604*a* may be configured to intercept and (re-)configure Ethernet packets, such as in an IIoT Ethernet network, and/or UE$_1$ 604*a* may be configured to intercept and (re-)configure IP packets. In some aspects at the management layer 624*a*, UE$_1$ 604*a* may tag received and intercepted packets with information to be used at the complementary management layer 624*b* of the receiving UE$_2$ 604*b*.

Corresponding to the redundant transmission by UE$_1$ 604*a* of one data stream over both the direct device path 616*a* and the indirect path 616*b*, UE$_2$ 604*b* may receive the same data whether UE$_2$ 604*b* listens on the direct device path 616*a* or the indirect path 616*b*. Such an arrangement may hedge against unsatisfactory reliability on the direct device path 616*a* with the greater stability and/or diversity on the indirect path 616*b*, and similarly, may hedge against unsatisfactory latency on the indirect path 616*b* with faster transfer rates and/or increased resource availability on the direct device path 616*a*. The aggregate effect of such redundant transmission may deliver very low latency and high reliability data transfer, with one path providing low latency when the other fails to do so and/or the other path providing high reliability when the one fails to do so.

According to various aspects, UE$_1$ 604*a* include, in an original packet 612, information indicating an address (addr) 642 of UE$_2$ 604*b* to control delivery destination, and potentially communication path, of some payload data, such as a packetized packet 646 (or PDU) from another layer. For example, UE$_1$ 604*a* may configure the UE$_2$ address 642 to be an address or port at which UE$_2$ 604*b* is available to receive on the direct device path 616*a*. Upon transmission on the direct device path 616*a*, the packet 612 may be carried over a sidelink channel on the PC5 interface and/or may be traverse a bridge on the domain 636, for example, that virtualizes the connection with UE$_2$ 604*b* to an Ethernet connection between ports of the UEs 604*a*-*b* (e.g., Port A of each UE).

For transmission on the indirect path 616*b*, UE$_1$ 604*a* may transmit the packet 612 over an uplink channel to the base station 602 via the Uu interface. A LAN connecting the UEs 604*a*-*b* in the domain 636 may be bridged with an access network including the base station 602. Thus, where the redundant packet 612' is transmitted over the indirect path 616*b*, the redundant packet 612' may be received at the base station 602 via the bridged networks and routed through the base station 602 to UE$_2$ 604*b* via port A and port B, respectively. Accordingly, UE$_2$ 604*b* may receive the redundant packet 612' over a downlink channel on the Uu interface.

Additionally, and potentially contemporaneously, UE$_1$ 604*a* may transmit the redundant packet 612' over the indirect path 616*b*. The redundant packet 612' may likewise include the UE$_2$ address 642' to direct the redundant packet 612' toward the a same device as the original packet 612, although the UE$_2$ address 642' potentially may adapted for the bearer or connection on the indirect path 616*b*. Further, the redundant packet 612' may include a redundant payload packet 646' that substantially duplicates the payload packet 646 of the original packet 612.

Further, the header of each packet may include one or more fields illustrated by the example packet header 650, such as at least one field(s) for at least one of a destination address, source address, and/or local area network (LAN) ID. In various other aspects, a packet header may include one or more additional or alternative fields, such as a customer tag (C-Tag) field, a priority code point (PCP) field, a drop eligibility indicator (DEI) field, a type/size field, and/or one or more additional or alternative fields. In still other aspects, some of the illustrated fields may be omitted.

The destination address 652 may indicate the address of the recipient, such as the address of UE$_2$ 604*b*. Correspondingly, the source address 654 may indicate the address of the sender of the corresponding packet, such as the address of UE$_1$ 604*a*. The LAN ID 656 may identify the network in which the UEs 604*a*-*b* are communicating—e.g., the LAN ID may identify a virtual LAN (VLAN) on which a traffic stream between the UEs 604*a*-*b* is included.

At the lower layers, such as L1 and L2, UE$_2$ 604*b* may be listening on both paths 616*a*-*b*, because packets on each of the bearers may remain separate and unintegrated prior to unification at the management layer 624*b*. Therefore, UE$_2$ 604*b* is likely to successfully receive redundant data with each data burst, which is generally reflected by the duplicative packets received on each of the paths 616*a*-*b*. Redundancy such as this may be impose additional overhead on UEs, access networks, and/or base stations. For example, low-complexity UEs may be limited in terms of computational, processing, and/or power resources, and a substantial percentage of such resources will be consumed through decoding and other processing of redundant packets prior to identifying those packets as redundant. Even absent such a low-complexity implementation, decoding and other processing of redundant data may negatively impact device performance and potentially create a bottleneck for UEs that lack a mechanism to short-circuit redundancy detection prior to decoding and comparing the payloads of every received packet.

According to some aspects, efficient redundancy detection may be implemented by the receiving UE$_2$ 604*b* at least partially at the management layer 624*b* as a counterpart of that of the transmitting UE$_1$ 604*a*. In the lower layers of the protocol stack, including L1, L2, and/or SDAP layers, the direct device path 616*a* and the indirect path 616*b* may be configured on respective bearers that are different from one another, e.g., thereby causing split entities at each of the L1, L2, and SDAP layers. Thus, packets received on each of the bearers may be treated as separate streams as the packets are passed up the lower layers of the protocol stack of UE$_2$ 604*b* until being delivered to the management layer 624*b*.

The management layer 624*b* of the receiving UE$_2$ 604*b* may unify the two split bearers carrying the redundant data streams over the direct device and indirect paths 616*a*-*b* from the transmitting UE$_1$ 604*a*. In so doing, UE$_2$ 604*b* may discard redundant packets that duplicate previously received packets without decoding the payload of such redundant packets and without comparing payloads between packets. To that end, UE$_1$ 604*a* may configure a header of a redundant packet to indicate the packet is redundant with another packet—that is, UE$_1$ 604*a* may configure the header of the redundant packet with an indication that the payload is a duplicate of another payload of another packet transmitted over another one of the paths 616*a*-*b*.

One example of such a packet header that indicates the payload packet is redundant with another packet payload includes the packet header 650 configured with a set of fields configured to convey a redundancy tag 644, or equivalently "R-Tag." If the set of fields includes more than one field, then two or more fields in the aggregate may indicate the R-Tag 644. Illustratively, the packet header 650 of the redundant packet 612' (and other redundant packets) may include an R-Tag Type, R-Tag Reserved information, and R-Tag sequence (seq) number.

In some aspects, the R-Tag 644 may include an R-Tag type 658 to indicate the protocol or layer for which the payload packet 646' provides redundancy—e.g., the R-Tag type 658 may indicate that the management layer 624b processes the redundancy of the payload or may indicate a protocol at the management layer according to which the payload is formatted. In some aspects, the R-Tag 644 may include R-Tag Reserved information 660 that may be used at the management layer for processing the redundant payload or may include padding. In still further aspects, the R-Tag 644 may include an R-Tag sequence number 662 that corresponds to the sequence number of the original packet 646 duplicated in the redundant packet 612'.

At least one of the R-Tag type 658, R-Tag Reserved information 660, and/or R-Tag sequence number 662 may be used by the management layer 624b of $UE_2$ 604b to determine that the redundant packet 612' is redundant. Where $UE_2$ 604b identifies the redundant packet 612' as redundant, $UE_2$ 604b may discard the redundant packet 612' without decoding the enclosed redundant packet 646' unless $UE_2$ 604b is unable to recover the payload packet 646 packetized in the original packet 612. Once all the redundancy has been eliminated, a unified stream of packets may be passed up the protocol stack from the management layer 624b at $UE_2$ 604b. For example, the unified stream of packets may be delivered to a single port (e.g., port A, which may be an Ethernet or other LAN port) of $UE_2$ 604b, e.g., so that the upper layers of $UE_2$ 604b are only aware of receiving one stream of packets that is highly reliable and low latency.

Figure 8:
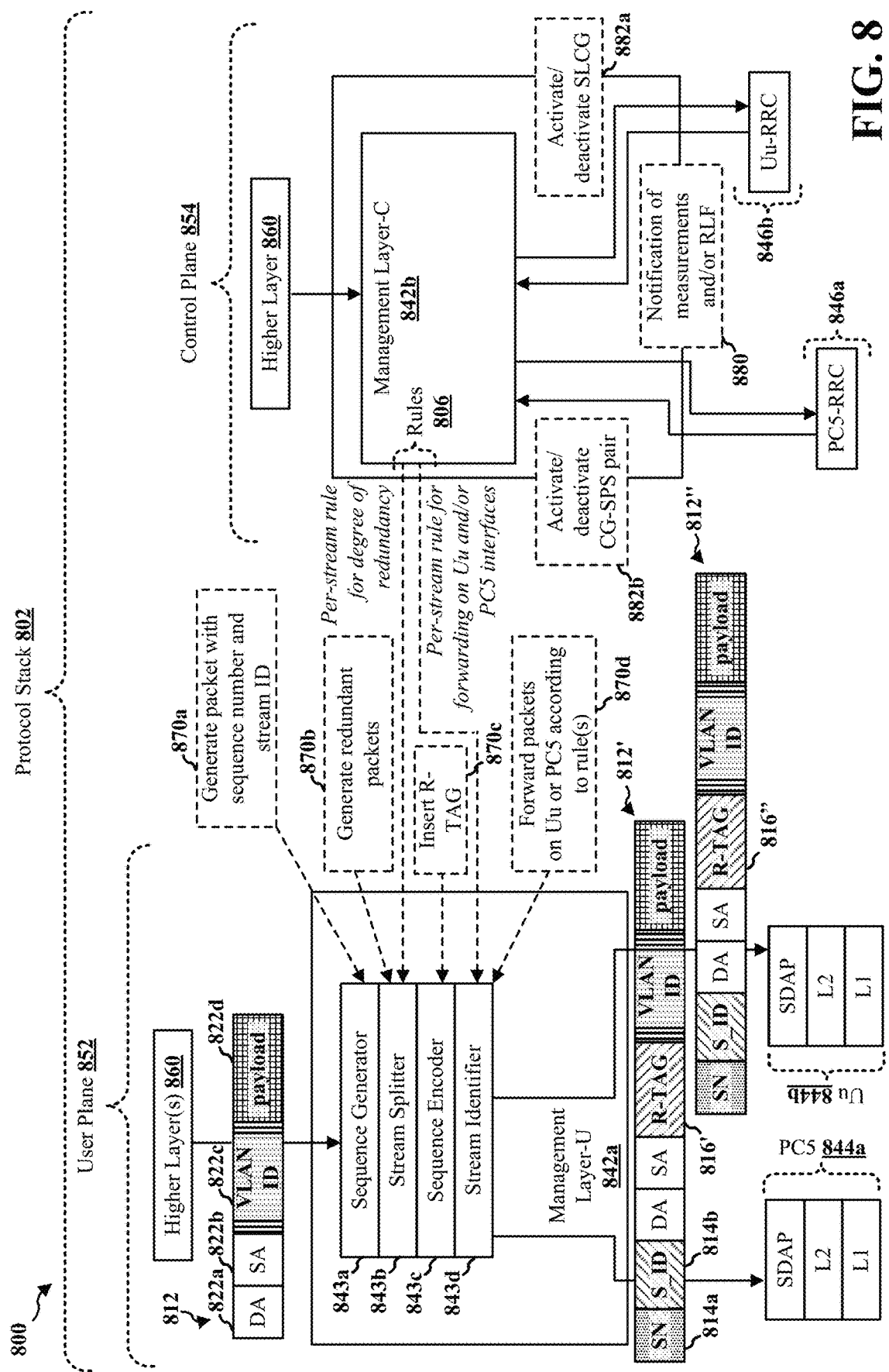
FIG. 8 is a diagram illustrating an example a user plane and a control plane on a protocol stack of a transmitting UE.

FIG. 8 is a diagram 800 illustrating an example of a protocol stack 802 with which a transmitting UE may be configured. In some aspects, the protocol stack 802 may be configured in a UE that is one of a PLC or an S/A. Correspondingly, the transmitting UE having the protocol stack 802 may be transmitting (or preparing to transmit) to a receiving UE, which also may be a PLC or an S/A.

The protocol stack 802 may include a set of layers on a user plane 852 and another set of layers on a control plane 854. In some other aspects, the user plane 852 and the control plane 854 may be viewed as two separate protocol stacks without departing from the scope of the present disclosure. Regardless of perspective, the control plane 854 may carry signaling used to establish and tear down bearers, as well as define routing on different bears so that data may be mapped onto the correct communication path to reach the intended receiving UE.

Complementarily, the user plane 852 may carry data signaling to the receiving UE over one or more bearers set up by the control plane 854 on the communications paths. In particular, the data on the user plane 852 may be transmitted along the routes defined from signaling on the control plane 854.

As described supra, at least the transmitting UE may be configured with a management layer, for example, logically residing between or at least partially within at least one of L2 and L3 of the protocol stack 802. As with many of the constituent layers configured in L2 and some in L3, the management layer may be separated into the user plane side, management layer-U 842a, and the control plane side, management layer-C 842b. The two sides may implement different functionality and, as many of the control plane layers (e.g., RRC layer) do not exist on the user plane, and vice versa, may not necessarily reside at an equivalent position on a protocol stack. For example, the management layer-C 842b on the control plane 854 may be implemented in L3, e.g., above the L3 RRC layer, whereas the management layer-U 842a on the user plane 852 at L2, or immediately above the L2 SDAP layer.

Prior to data transmission, the entity of the management layer-C 842b may set up radio bearers on both a direct device communication path and a network-assisted indirect communication path. For example, the radio bearer on the direct device communication path may include a sidelink radio bearer (SLRB) for traffic on the sidelink interface (e.g., PC5 interface) directly between two UEs (e.g., an PLC and an S/A), whereas the radio bearer on the indirect communication path may include an access network radio bearer for traffic on the access network interface (e.g., Uu interface) because such traffic is to be routed through a base station to reach the receiving UE. With the routes established for both the direct device and the indirect communication paths, the transmitting UE may be configured to deliver a very low-latency and high reliability traffic stream over two (or more) network communication paths.

In addition, the entity of the management layer-C 842b may establish a set of rules 806 to be applied to traffic streams, which may define how packets are routed and otherwise treated upon arriving at the management layer-U 842a. Such rules 806 may define the local policies regarding the number n of duplicate or redundant packets that are generated for each packet passed down from the higher layer(s) 860 for transmission. For example, a transmitting UE may have multiple different links simultaneously established with multiple receiving UEs, and so the mode according to which the UE communicates, the degree of redundancy, and the like, may vary between packets arriving from the higher layer(s) 860.

The rules 806 may be implemented by the entity at the management layer-U 842a. In some example, referring to FIG. 7, the entity of the management layer-C 842b may configure rules 806 for transitioning between the first, second, and third modes 705, 707, 709, such as the threshold at which a channel quality is considered satisfactory, an amount of traffic that should be offloaded from the indirect path to the direct device path, and so forth. In some other examples, the entity of the management layer-C 842b may configure rules 806 for the number of redundant packets to generate for each traffic stream and for which packets are distributed on which bearer (e.g., a rule indicating all packets tagged with redundancy information are to be transmitted over the bearer on the indirect path, whereas packets without such tags are to be transmitted over the bearer on the direct device path).

When the transmitting UE is to transmit a set of packets in a traffic stream, the set of packets may be passed down from the higher layer(s) 860 and obtained or intercepted at the management layer-U 842a. In some aspects, the entity of the management layer-U 842a may include a sequence generator 843a that is configured to generate 870a a first management layer packet 812' from each higher layer packet 812 obtained from the higher layer(s) 860 for transmission. For example, the entity of the management layer-U 842a may packetize the packet 812 (e.g., PDU) received from the higher layer(s) 860 into a first management layer packet 812', such as by prepending or otherwise attaching a header on the higher layer packet 812 to generate a first management layer packet 812'. The sequence generator 843a may assign the first management layer packet 812' a sequence number (SN) 814a, which may be based on a sequence number included in the packet 812 by the higher layer(s) 860 or assigned to the packet at the management layer-U 842a (e.g., in association with the redundant encoding).

As the direct device and indirect paths may be logically grouped together as a single traffic stream, some commonly identifying information may be implemented on each traffic stream to indicate the interrelatedness. The entity of the management layer-U 842a may be configured to indicate such interrelatedness by configuring the first management layer packet 812' to indicate a stream ID (S_ID) 814b, which may be configured in a header of the first management layer packet 812'. The stream ID 814b may be a based on some combination or function of one or more of a LAN or VLAN ID, a destination address, and/or a source address, which may be information that the entity of the management layer-U 842a is able to derive from the higher layer packet 812.

For example, the management layer-U 842a may tag a packet (e.g., an Ethernet packet or other networking protocol packet) with a stream ID 814b that is based on one or more of a destination address 822a (illustrated as "DA"), source address 822b (illustrated as "SA"), LAN or VLAN ID 822c (which may be included in a VLAN header), and/or payload 822d of the packet 812. The stream ID 814b may identify the packet across the system from the transmitting UE to the receiving UE. In some aspects, the entity of the management layer-U 842a may share the stream ID with the base station and/or UPF included on the indirect path. The entity of the management layer-U 842a may request the base station and/or UPF to apply certain policies to a stream corresponding to a stream ID, e.g., so that packets on the stream are able to meet various low latency criteria.

In some further aspects, the sequence generator 843a may assign a stream handle to each packet. A stream handle may be internally used to map packets to the applicable ones of the rules 806. For example, the stream handle may be used by the stream splitter 843b to determine a degree of redundancy for a packet (e.g., a number of duplicates for a packet). In addition, the stream handle may be used by the stream identifier 843d to map a packet to either the PC5 interface stack 844a on the direct device path bearer or the Uu interface stack 844b on the indirect path bearer.

The management layer-U 842a may further include a stream splitter 843b that is configured to either generate 870b one or more redundant packets for each management layer packet or, if no redundancy is to be used for a management layer packet, refrain from performing any redundancy operations. The stream splitter 843b may obtain one or more rules from the management layer-C 842b that specify whether a management layer packet is to be duplicated and, if so, how many duplicates to generate. Illustratively, the stream splitter 843b may obtain one or more of the rules 806 from the management layer-C 842b indicating that a degree of redundancy for the first management layer packet 812' is equal to one, and accordingly, the stream splitter 843b may generate a second management layer packet 812". In some aspects, therefore, the second management layer packet 812" may be a duplicate of the first management layer packet 812' and/or may include redundantly encoded information of the first management layer packet 812'.

In some other aspects, however, the second management layer packet 812" may be different from the first management layer packet 812'. For example, the first management layer packet 812' may carry user data, whereas the second management layer packet 812" may carry control information data, or vice versa. In another example, the first management layer packet 812' may carry data from a first entity of the higher layer(s) 860 (e.g., a first application at an application layer), whereas the second management layer packet 812" may carry data from a second entity of the higher layer(s) 860 (e.g., a second application at an application layer).

The management layer-U 842a may further include a sequence encoder 843c that is configured to either encode redundant packets with redundancy information, if no redundancy is to be used for a management layer packet, refrain from performing any redundancy operations. Specifically, the sequence encoder 843c may generate redundancy information that indicates a management layer packet is being transmitted with redundancy (and potentially, the degree of redundancy), as well as the information indicating the sequence number (e.g., R-Tag sequence number) of the management layer packet to which the redundant packet corresponds. The sequence encoder 843c may append or otherwise attach such information as an R-Tag in a header of the redundant packet, and potentially, in a header of the original management layer packet, as well.

Where the second management layer packet 812" includes information different from the first management layer packet 812' and includes at least some unique data that is not redundantly encoded therein from the first management layer packet 812' (or another management layer packet), the sequence encoder 843c may refrain from tagging both the first and second management layer packets 812', 812" with an R-Tag or other information intended to identify redundancy across packets.

For example, the sequence encoder 843c may obtain the first management layer packet 812' and the second management layer packet 812". The sequence encoder 843c may encode information indicative of the redundancy across the packets 812', 812". In some configurations, the sequence encoder 843c may insert 870c an R-Tag 816" to the second management layer packet 812" that indicates the second management layer packet 812" corresponds to (e.g., is a duplicate of) the first management layer packet 812' having the SN 814a with the stream ID 814b. In some aspects, the first management layer packet 812' and the second management layer packet 812" may include the same payload, which of the packets 812', 812" is used at the receiving UE (or whether the two packets are combined for error/erasure correction) may be of no moment as long as the payload is reliably received within the allotted latency budget. Therefore, the sequence encoder 843c may further insert 870c an R-Tag 816' to the first management layer packet 812' in order to indicate the redundancy with which the first management layer packet 812' is transmitted.

In some aspects, the sequence encoder 843c may further insert a data security or data integrity value into each of the packets 812', 812". For example, the sequence encoder 843c may insert an integrity/security value into a header of each of the packets 812', 812", or may insert (e.g., append) an integrity/security value to the payload of each of the packets 812', 812". Examples of such values may include cyclic redundancy check (CRC) values, frame sequence check (FCS) values, and other error detecting and/or error correcting codes.

The management layer-U 842a may further include a stream identifier 843d that is configured to forward 870d packets from the management layer-U 842a on the interface or bearer corresponding to one of the direct device or indirect paths, e.g., according to one or more of the rules 806 obtained from the management layer-C 842*b*. The stream identifier 843*d* may obtain one or more of the rules 806 from the management layer-C 842*b* that specify a policy for routing packets of each traffic stream. For example, one or more of the rules 806 may specify a bearer or path over which packets are to be transmitted. In another example, where redundancy is implemented, the one or more rules may define a percentage or fraction of packets to transmit on each of the bearers or paths. In some aspects, the stream identifier 843*d* may tag a packet, such as by configuring a header of the packet, to indicate the bearer or path on which the packet is to be transmitted.

Illustratively, the stream identifier 843*d* may tag the first management layer packet 812' for transmission over the bearer on the direct device path (e.g., on the PC5 interface, on a sidelink channel, etc.). Accordingly, when the first management layer packet 812' is released from the management layer-U 842*a*, the packet 812' may be sent down through the SDAP, L2, and L1 layers on the PC5 interface (or other direct device interface) stack 844*a*. Similarly, the stream identifier 843*d* may tag the second management layer packet 812" for transmission over the bearer on the indirect path (e.g., on the Uu interface, on uplink/downlink channels through a base station, etc.). When the second management layer packet 812" is released from the management layer-U 842*a*, the packet 812" may be sent down through the SDAP, L2, and L1 layers on the Uu interface (or other network-assisted or indirect interface) stack 844*b*.

In some aspects, the entity of the management layer-C 842*b* may receive a notification 880 of at least one of radio link failure (RLF) and/or measurements indicative of whether a channel quality is satisfactory, and may instruct the stream identifier 843*d* to route packets on one or both of the stacks 846*a-b* corresponding to a respective interface on one of the paths. For example, the entity of the management layer-C 842*b* may be notified of a radio link failure on one of the direct device or indirect paths and, in response, may provide a rule to the stream identifier 843*d* to route all traffic away from the interface on the path having the failed radio link, and route all traffic to the interface on the other path.

Additionally, the entity of the management layer-C 842*b* may monitor the conditions on each of the paths, and so may receive notification 880 of an RSRP, SNR, and/or another measurement indicative of channel quality on each of the protocol stack 846*b* on the indirect path (e.g., over the Uu interface) and/or the protocol stack 846*a* on the direct device path (e.g., over the PC5 interface). According to whether such measurements satisfy or fail to satisfy a threshold with respect to satisfactory reliability, the entity of the management layer-C 842*b* may instruct the stream identifier 843*d* to route all traffic to one of the Uu interface (or other indirect path interface) stack 844*b* or the PC5 interface (or other direct device interface) stack 844*a*. For example, referring to FIG. 7, the entity of the management layer-C 842*b* may cause the management layer-U 842*a* to transition between one of the three modes, depending upon the channel and radio link conditions.

The entity of the management layer-C 842*b* may be notified of channel quality measurements (e.g., RSRP, SNR, etc.) and radio link failures on each of the paths by a respective RRC layer entity. That is, the RRC layer entity of the PC5 interface stack 846*a* may provide information indicative of channel quality measurements or radio link failures to the entity of the management layer-C 842*b* for the direct device path, and similarly, the RRC layer entity of the Uu interface stack 846*b* may provide information indicative of channel quality measurements or radio link failures to the entity of the management layer-C 842*b* for the indirect path.

In some aspects, the entity of the management layer-C 842*b* may be configured to activate one or both of the direct device and/or indirect paths, for example, using a sidelink configured grant (SLCG) 882*a* on the direct device channel and/or using a configured grant (CG) and semi-persistent scheduling (SPS) pair 882*b* on the indirect path. With the SLCG, certain resources on the sidelink channel may be allocated for a traffic stream on the direct device path. Similarly, with CG, certain resources on the uplink channel may be allocated for the management layer-C 842*b* to inform the base station to activate SPS with the receiving UE so that the indirect path may become active. For example, the base station and/or UPF may store information facilitating activation of SPS so that SPS may be quickly activated by the base station upon receiving a MAC control element (CE) (or other similar element) on CG resources. Thus, the combination of the CG requesting SPS activation and the actual SPS activation may activate the indirect path to the receiving UE, which may reduce the latency that might otherwise be experienced with such an arrangement.

Figure 9:
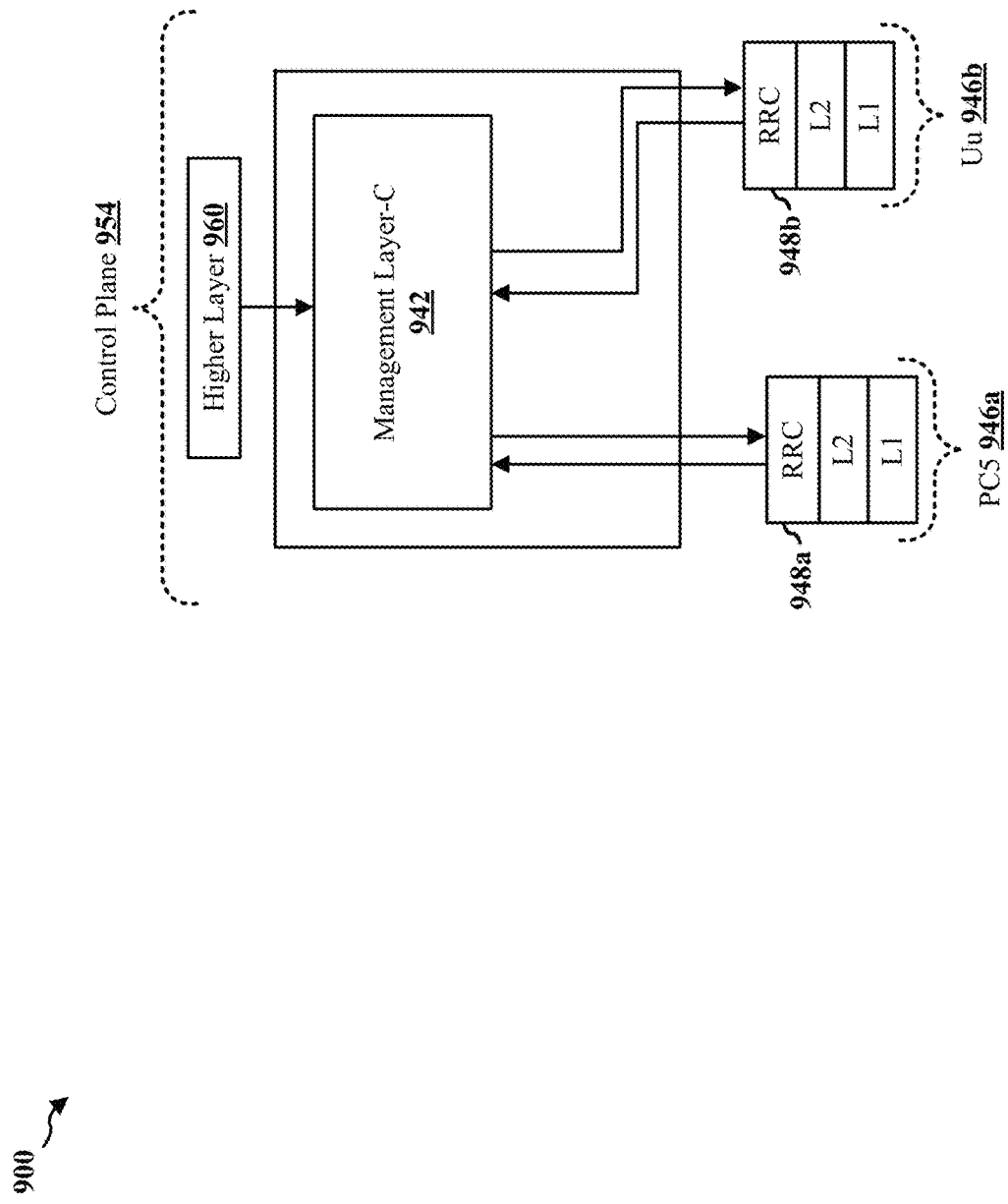
FIG. 9 is a diagram illustrating another example of a control plane on a protocol stack with which a transmitting UE may be configured.

FIG. 9 is a diagram 900 illustrating an example of a control plane 954 of a protocol stack with which a transmitting UE may be configured. The control plane 954 may include a higher layer 960, such as an application layer, which may pass a packets down the protocol stack. Such packets may be received at the management layer-C 942, which may be configured to determine rules for forwarding packets on either a direct device path via the PC5 interface stack 946*a* or indirect path via the Uu interface stack 946*b*.

The management layer-C 942 may be part of or may be above L3 of a transmitting UE. The entity of the management layer-C 942 may be communicate with the RRC layer entities 948*a-b* on the PC5 and Uu interface stacks 946*a-b*. For example, the entity of the management layer-C 942 may be configured to communicate on an interface adapted for the RRC layer entities 946*a-b*. Through such an interface, the entity of the management layer-C 942 may be configured to probe both of the direct device path through the PC5 interface and the indirect path through the Uu interface.

The entity of the management layer-C 942 may obtain, through the RRC layer entity 948*a* on the PC5 interface stack 946*a*, a first set of values indicative of the channel quality on the direct device path, such as an RSRP, SNR, SINR, BLER, etc. For example, the first set of values may be based on pilot signals received from a receiving UE on the opposite end of the direct device path or transmitted to the receiving UE (e.g., the receiving UE may report channel quality measurements).

In addition, the entity of the management layer-C 942 may obtain, through the RRC layer entity 948*b* on the Uu interface stack 946*b*, a second set of values indicative of the channel quality on the indirect path, such as an RSRP, SNR, SINR, BLER, etc. For example, the second set of values may be based on pilot signals received from or transmitted to a base station that acts at as the first hop on the indirect path. In another example, the second set of values may be based on pilot signals communicated between the base station and the receiving UE, and then received up the Uu interface protocol stack 946*b* to the management layer-C 942.

The entity of the management layer-C 942 may compare one or more of the first set of values and/or one or more of the second set of values with one or more thresholds, e.g., as described above with respect to FIG. 7. The management layer-C 942 may select one of the operating modes 705, 707, 709 for communication with the receiving UE, e.g., based on at least one of the first set of values and/or the second set of values.

Once the trigger(s) arrives from the Uu interface stack 946b at the entity of the management layer-C 942 indicating that the indirect path is to be activated, the relevant allocations may be activated to reduce latency in mapping information on resources. In particular, the entity of the management layer-C 942 may receive information indicating that the CG is configured. Such signaling may indicate that the corresponding SPS with the other UEs may still occur. In response to CG activation, the entity of the management layer-C 942 may pass the information down the stack to be transmitted on the CG over the indirect path. Further, the entity of the management layer-C 942 may pass information down the PC5 interface stack 946b to be mapped onto resources defined according to the SLCG.

Figure 10:
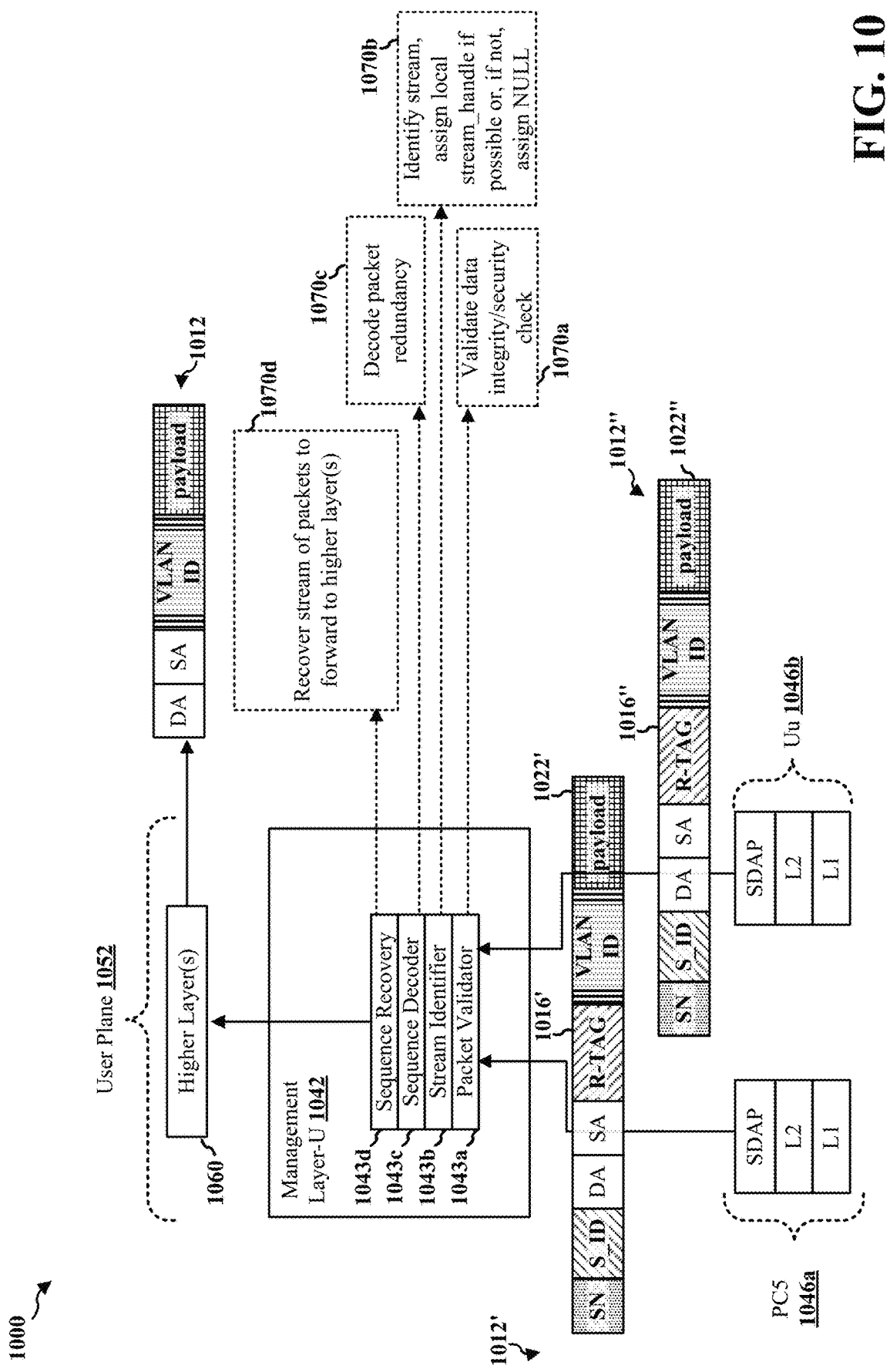
FIG. 10 is a diagram illustrating an example of a user plane of a protocol stack with which a receiving UE may be configured.

FIG. 10 is a diagram 1000 illustrating an example of a user plane 1052 of a protocol stack with which a receiving UE may be configured. For example, the receiving UE may be one of a PLC or an S/A. As described above, two bearers may be established between a transmitting UE and the receiving UE. Each of the bearers may be on a different port of the receiving UE, each of which may be a logical or virtual port.

The user plane 1052 may include a management layer-U 1042, which may be considered part of L2, L3, or both L2 and L3. Below the management layer-U 1042, the user plane 1052 may include various L2 and L1 layers or sublayers, such as a PDCP layer, MAC layer, and PHY layer. In some aspects, the management layer-U 1042 may reside above the SDAP layer in each of the L1/L2 protocol stacks 1046a-b.

The user plane 1052 may carry data signaling from the transmitting UE received over one or more bearers set on the communications paths. In particular, the data on the direct device path may be received along via the PC5 interface on a bearer through one L1/L2 protocol stack 1046a, whereas the data on the indirect path may be received along via the Uu interface on a bearer through the other L1/L2 protocol stack 1046b. That is, the first radio protocol stack 1046a may carry the direct device bearer on the PC5 interface, whereas the second L1/L2 protocol stack 1046b may carry the indirect bearer on the Uu interface.

Depending upon the transmission mode with which the transmitting UE is operating, the receiving UE may receive packets on one or both of the direct device path (at the L1/L2 protocol stack 1046a on the PC5 interface) and/or the indirect path (at the L1/L2 protocol stack 1046b on the Uu interface). Each of the L1/L2 protocol stacks 1046a-b may pass received packets up the various L1 and L2 layers (and, potentially, one or more L3 layers), maintaining separation between the two streams until reaching the management layer-U 1042. The higher layer(s) 1060 above the management layer-U 1042 may be substantially agnostic to the path on which the packets are received.

In some aspects, the entity of management layer-U 1042 may determine over which of the one or more paths a packet is transmitted. For example, the entity of management layer-U 1042 may determine that a packet is transmitted over one of the direct device or indirect paths, but not both paths, based on a management layer header with which the payload data was packetized by the management layer entity of the transmitting UE. For example, the header may include some information indicating whether the packet was redundantly transmitted over both the direct device and indirect communications paths.

If only one copy of a packet is received (e.g., as indicated by a value in a packet header), then the entity of the management layer-U 1042 may extract information intended for the higher layer(s) 1060 from the packet and pass that information up the protocol stack for delivery to the applicable one of the higher layer(s) 1060.

When the transmitting UE is configured to operate in a data redundancy mode, two packets carrying redundant payloads may be transmitted for every one packet originating at the higher layer(s) of the transmitting UE. In some instances, then, the receiving UE may receive a first packet 1012' and a second packet 1012" on the PC5 interface and the Uu interface, respectively. Logically, the first packet 1012' may be received over the bearer on the L1/L2 protocol stack 1046a for the PC5 interface, while the second packet 1012" may be received over the bearer on the L1/L2 protocol stack 1046b for the Uu interface.

Bearers on the PC5 and Uu interfaces of split L1/L2 protocol stacks 1046a-b may be unified at the management layer-U 1042 (when applicable). In some aspects, each packet arriving at the management layer-U 1042 may be validated with a data integrity and/or data security check. For example, the entity of the management layer-U 1042 may include a packet validator In some aspects, the entity of the management layer-U 1042 may include a packet validator 1043a, which may intercept each packet arriving at the management layer-U 1042, and may check a data security and/or data integrity value included in each of the packets 1012', 1012". For example, the packet validator 1043a may validate 1070a an integrity/security value included in a header or appended to a payload (or included elsewhere) of each of the packets 1012', 1012", and may execute a data integrity or security or other similar check on each arriving packet. For example, the packet validator 1043a may be configured to validate CRC values, FCS values, and/or other error detecting and/or error correcting codes.

Illustratively, the transmitting and receiving UEs may share a cryptographic function, such as a hash function, from which each of the UEs is expected to receive the same value or set of bits in response to the same input. In some aspects, the entity of the management layer at the transmitting UE—e.g., the sequence encoder 843c of the management layer-U 842a, illustrated at FIG. 8—may insert (e.g., append) a data integrity/security value in the payload into the payloads 1022', 1022" of each of the packets 1012', 1012". Illustratively, the sequence encoder 843c may insert a respective short check value for each of a set of blocks (e.g., all of the payload blocks) in the payload 1022' to enable CRC checking on packets.

For example, the transmitting UE management layer entity may attach a respective short check value to each of a set of blocks included in the payloads 1022', 1022". A short check value may be obtained from a polynomial equation with a corresponding block being input as a variable—e.g., the short check value may be equal to or based on the remainder of a polynomial division of block contents. Upon receiving the packets 1012', 1012", the packet validator 1043a may extract each transmitted short check value, which may be an expected value, and the packet validator 1043a may repeat the same polynomial equation as used by the transmitting UE to obtain a respective short check value for the contents of each block, as received at the management layer-U 1042.

For each block having a corresponding short check value, the packet validator 1043a may compare the expected short check value with a short check value corresponding to the received block contents. If the packet validator 1043*a* finds that the two values match, then the packet may be validated and advanced within for further processing at the management layer-U 1042.

If the packet validator 1043*a* finds the two values are different, however, the packet validator 1043*a* may attempt to repair the erroneous or erased bits, if configured to do so. In instances in which the packet validator 1043*a* either cannot recover the corrupted or missing bits or is not configured for error correction, the packet validator 1043*a* may discard the packet. Potentially, NACK feedback or other similar negative feedback may be provided to the transmitting UE in response to discarding a packet for failing a data integrity and/or security check.

In some configurations, the management layer-U 1042 may further include a stream identifier 1043*b*, which may obtain validated packets from the packet validator 1043*a*. The stream identifier 1070*b* may be configured to identify 1070*b* a traffic stream to which each of the packets 1012', 1012" is assigned. In particular, the stream identifier 1043*b* of the receiving management layer-U 1042 may be configured to identify the stream in which a packet included.

In practical effect, the stream identifier 1043*b* may be responsible for the internally routing received packets. For example, for each packet, the stream identifier 1043*b* may identify a stream corresponding to the higher layer(s) 1060 (e.g., an application) or a thread or process of the higher layer(s) 1060, which may be the terminal point for the packet. In some aspects, the stream identifier 843*d* may identify the stream in which a packet is included based on a header of the packet and/or based on the bearer over which the packet is received. For example, a complementary stream identifier at the transmitting UE (such as the stream identifier 834*d* of FIG. 8) may tag a packet with information indicating the traffic stream in which the packet is included, and the stream identifier 1043*b* of the receiving management layer-U 1042 may identify the stream on which the packet is transmitted based on the tag.

Illustratively, packets 1012', 1012" may be received over the wireless channel at the management layer-U 1042 and, as the packets 1012', 1012" are redundant copies of one another, the stream identifier 1043*b* may identify one stream as including both of the packets 1012', 1012". The stream identifier 1043*b* may then configure each of the packets 1012', 1012" for internal (e.g., local) processing. For example, the stream identifier 1043*b* may assign a local stream handle each of the packets 1012', 1012". A stream handle may be internally used to differentiate packets arriving from the lower L1/L2 protocol stacks 1046*a*-*b*, which may be redundantly encoded and may therefore be decoded to remove the redundancy.

In some aspects, a stream handle may be additionally (or alternatively) used to map packets to the terminal destination, e.g., at the higher layer(s) 1060. If the stream identifier is unable to assign a stream handle (e.g., unable to identify a higher-layer destination) for a packet, then the stream identifier 1043*b* may assign a "null" stream value to the packet and pass the packet further up the protocol stack without modification.

In logical connection with the stream identifier 1043*b*, a sequence decoder 1043*c* may be further included at the management layer-U 1042. The sequence decoder 1043*c* may be configured to decode 1070*c* some or all packets arriving from the L1/L2 protocol stacks 1046*a*-*b*. In particular, the sequence decoder 1043*c* may be configured to identify whether two different sets of packets received over two bearers on two different interfaces both correspond to the same logical end point. That is, the sequence decoder 1043*c* may identify whether two packets incoming on two connections, in fact, carry the same payload information (e.g., although the headers and some other information may be different).

Illustratively, the sequence decoder 1043*c* may be provided at least one packet 1012' received over the bearer on the PC5 interface from one L1/L2 protocol stack 1046*a*. The sequence decoder 1043*c* may be configured to determine whether a packet includes data that is redundantly encoded across at least one other data packet. For example, the sequence decoder 1043*c* may detect whether the one packet 1012' is configured with an R-Tag 1016', e.g., as with a specific value or bit in the header. If the sequence decoder 1043*c* finds that a packet is not redundantly encoded—such as, where the R-Tag 1016' is absent, then the sequence decoder 1043*c* may advance the packet within the management layer-U 1042.

However, as illustrated, the sequence decoder 1043*c* may find that the one packet 1012' is redundantly encoded across the other packet 1012". In such instances, the sequence decoder 1043*c* may decode 1070*c* the redundancy with which the packets 1012, 1012" are encoded, such as by determining which packets include at least a portion of the same information. For example, in decoding the packets 1012', 1012", the sequence decoder 1043*c* may identify a number or other value in each packet header, and two packets referring to the same number or other value may be identified as the redundantly encoded. The sequence decoder 1043*c* may assign a packet number in the local stream (e.g., associated with the stream handle) to each of the packets 1012', 1012", which may be the same packet number, and forward on the packets 1012', 1012" with the same stream handle intact and sequence number associated with each.

In decoding packets, the sequence decoder 1043*c* may extract the R-Tags 1016', 1016" from the headers of each of the packets 1012', 1012". Accordingly, the sequence decoder 1043*c* may recover a packet 812 that is suitable to be delivered to the higher layer(s) 1060.

The management layer-U 1042 may further include a sequence recovery entity 1043*d*. The sequence recovery entity 1043*d* may be configured to recover 1070*d* the packets of the stream, which is to be provided to the intended destination higher layer(s) 1060. Packets may be received at the sequence recovery entity 1043*d* from multiple different streams, and therefore, the sequence recovery entity 1043*d* may begin by sorting packets according to the corresponding stream handles. For example, the sequence recovery entity 1043*d* may sort the illustrated packets 1012', 1012" into the same stream, as both may be assigned the same stream handle.

The sequence recovery entity 1043*d* may identify duplicate packets. In some aspects, the sequence recovery entity 1043*d* may implement a match recovery algorithm, which may be suitable for both a single stream and for multiple streams. According to such an algorithm, for each packet, the sequence recovery entity 1043*d* recovers one copy, which may be the packet received from the sequence decoder 1043*c* (e.g., if no further error correction and/or soft combining is necessary), having one packet number. The sequence recovery entity 1043*d* then compares that packet number with the respective packet numbers of the next packets as packets are delivered. If the sequence recovery entity 1043*d* determines the packet number of the first packet matches that of a next packet, the sequence recovery entity 1043*d* discards the duplicate next packet. If the sequence recovery entity 1043*d* determines the two do not match, then the sequence recovery entity 1043d may determine that the next packet is not redundant and may order the packet forwarding to the higher layer(s) 1060. The sequence recovery entity 1043d may then use that packet number to compare with the subsequently arriving packets.

In some other aspects, the sequence recovery entity 1043d may implement a vector recovery algorithm, which may be more suitable for larger streams. In such an algorithm, the sequence recovery entity 1043d may maintain a window of outstanding packets. Packets having sequence numbers outside of that window may be identified as redundant packets, and so the sequence recovery entity 1043d may discard those packets. However, packets having sequence numbers within the window may be identified as new packets and so may be forward to the higher layer(s) 1060. The window may be based on the most recently received packet (e.g., the sequence number of the most recently received packet), and a range of packet numbers that the sequence recovery entity 1043d may expect to receive. If some packets are not received (e.g., within a timeout period), then the sequence recovery entity 1043d may reset the window.

In some other aspects, the sequence recovery entity 1043d may implement another approach to identifying duplicate packets. The sequence recovery entity 1043d may pass the recovered packet stream, having the duplicates removed, to the higher layer(s) 1060. For example, for the two redundantly encoded packets 1012', 1012", the sequence recovery entity 1043d may recover the one original packet 1012, which may be suitable to be forwarded to the higher layer(s) 1060.

In some further aspects, the sequence recovery entity 1043d may be configured to reorder packets so that the recovered packets are forwarded to the higher layer(s) 1060 in a defined order or sequence. For example, the sequence recovery entity 1043d may identify a respective sequence number associated with each of the packets, and may reorder the packets in sequential numerical order, e.g., according to the identified sequence numbers or other ordering criteria. The sequence recovery entity 1043d may order each stream of packets individually—e.g., the sequence recovery entity 1043d may separately order a first set of packets having one stream handle assigned thereto and a second set of packets having another stream handle assigned thereto.

In some aspects, the management layer may not be implemented on the control plane of the receiving UE. For example, the receiving UE may include an entity of the management layer-U 1042 on the user plane 1052, and an entity of the management layer-C may be absent from the control plane. As the transmitting UE may setup the bearers and establish the communication paths, the receiving UE may avoid the additional complexity that may accompany implementation of the management layer on the control plane. Instead, the communication paths and the associated bearers may be assumed to be satisfactory for the context in which they are established. Accordingly, the management layer-U 1042 on the user plane 1052 may be sufficient for the redundant communication paths, with the entity of the management layer-U 1042 being sufficient to decode redundantly encoded packets for delivery to the higher layer(s) 1060. Potentially, this arrangement may reduce some overhead and/or signaling complexity by limiting the potential for conflicts.

Figure 11:
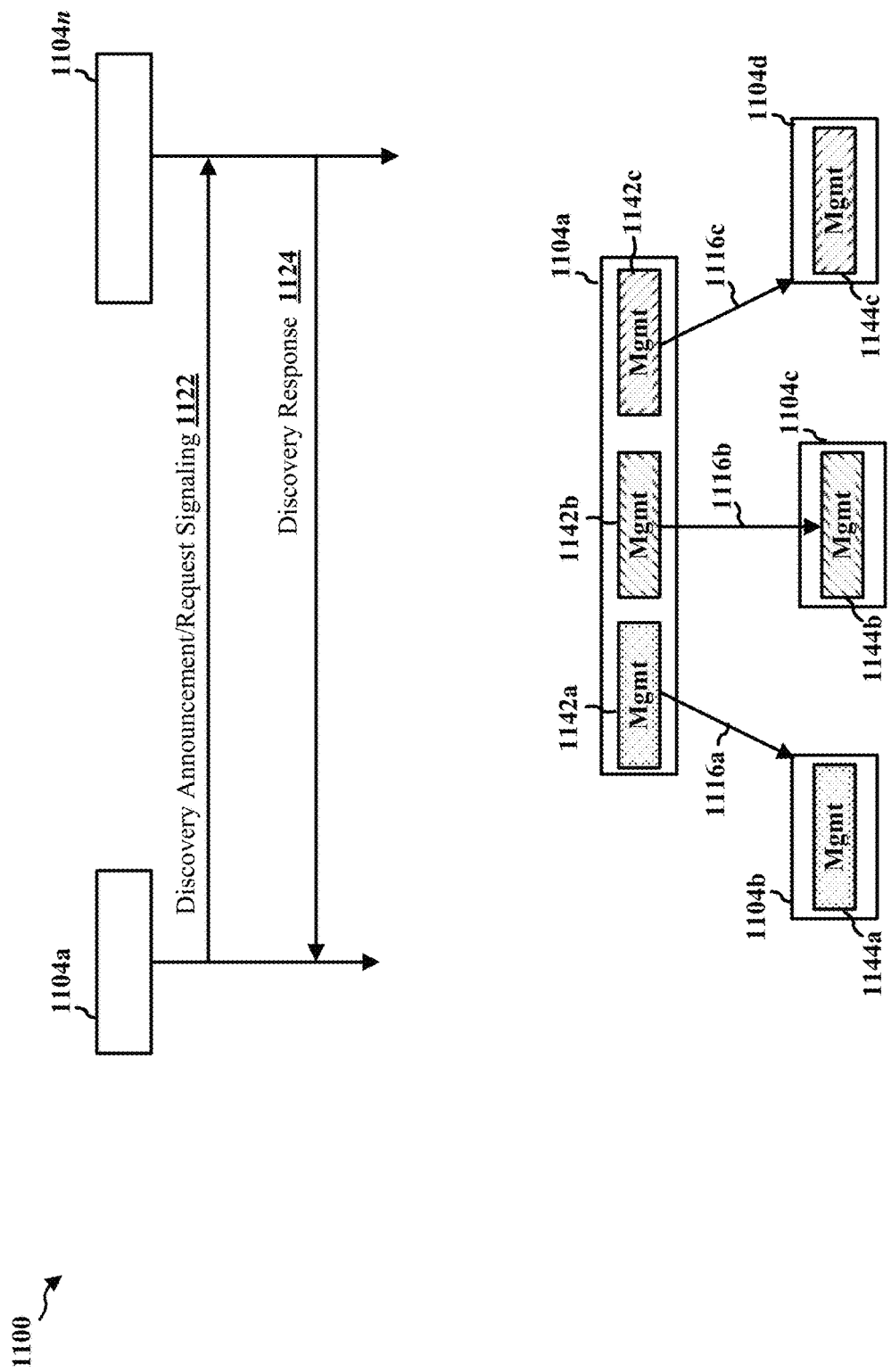
FIG. 11 illustrates a diagram of example discovery and communications procedures for UEs configured to establish direct device and indirect communication paths with one another.

FIG. 11 illustrates a diagram 1100 of example discovery and communications procedures for UEs 1104a-c configured to establish direct device and indirect communication paths with one another. For example, $UE_1$ 1104a may be a PLC, whereas each $UE_2$ 1104b-d may be an S/A. In various aspects, discovery and link establishment signaling may be configured between the management layer (illustrated as "Mgmt") of $UE_1$ 1104a and the management layer of $UE_n$ 1104n, for example, on the control plane.

In particular, $UE_1$ 1104a may transmit (e.g., broadcast) a discovery announcement message 1122, which may be intended to elicit a response from one or more other UEs within a coverage area or range of $UE_1$ 1104a. For example, $UE_1$ 1104a may transmit the discovery message on sidelink resources of a sidelink channel, such as a PSDCH. As the discovery messages and other exchanged data packets are communicated over sidelink resources (e.g., on the PC5 interface), the RAN (and by extension, the core network) may not be informed of the sidelink communication between $UE_1$ and other UEs. Therefore, operations by the RAN (and core network) that may adversely affect redundant packet transfer by $UE_1$ 1104a may be avoided, such as where the RAN attempts to reduce network congestion by eliminating the indirect path when aware of the direct device path.

The discovery announcement message 1122 may query an S/A to report one or more of: (1) device identity (e.g., at the management layer); (2) device capabilities (e.g., to support redundant packet transfer); (3) stream information, which may be used for addressing and routing packet transfers. Where a UE lacks some capability that prohibits the UE from finding the discovery announcement message 1122, $UE_1$ 1104a may assume management layer operations for the UE, at least to the extent $UE_1$ 1104a is able to do so.

In some aspects, the discovery announcement message 1122 may include stream information from the management layer of $UE_1$ 1104a. For example, $UE_1$ 1104a may set the source address of the discovery announcement message 1122 to be equal to a value that is based upon information identifying $UE_1$ 1104a (e.g., a device ID or source address of the management layer of $UE_1$ 1104a) and a VLAN ID (e.g., a unique ID intended to be assigned to the traffic stream between $UE_1$ 1104a and a responding UE).

A set of UEs 1104b-d for which $UE_1$ 1104a is to act as the PLC may receive the discovery announcement message 1122, and may respond accordingly with a discovery response message 1124 in order to establish a respective one of the streams 1116a-c of the direct device paths. Each discovery response message 1124 may include, inter alia, information identifying the UE and/or a type of S/A, a set of capabilities of the responding UE, and/or information used to identify a traffic stream between a respective one of the management layer entities 1144a-c of the responding UEs and the management layer entity of $UE_1$ 1104a.

$UE_1$ 1104a may receive the discovery response message 1124 from each of the UEs 1104b-d, and based thereon, may set up configure a direct device link between $UE_1$ 1104a and each of the UEs. In so doing, $UE_1$ 1104a may separate the management layer into management layer entities 1142a-c for the responding UEs 1104b-d (e.g., S/As) connected thereto. Each of the management layer entities 1142a-c of $UE_1$ 1104a may configure and manage one of the traffic streams 1116a-c to a respective one of the management layer entities 1144a-c of the responding UEs 1104b-d. $UE_1$ 1104a may therefore identify and communicate with each of the responding UEs 1104b-d by assigning each of the traffic streams 1116a-c to one of the management layer entities 1142a-c.

Figure 12:
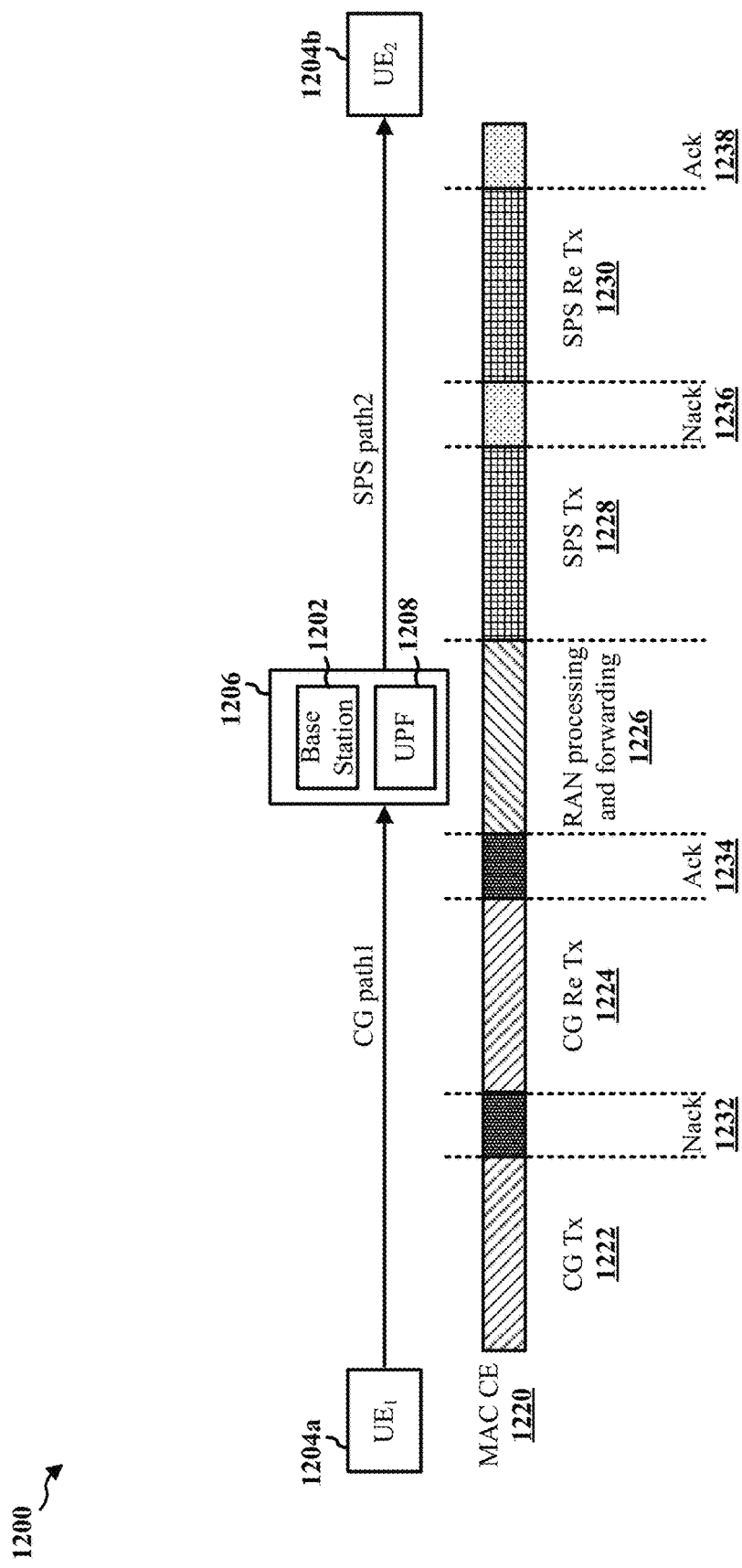
FIG. 12 is a diagram illustrating example communication over an indirect path between two UEs that is assisted by a user plane function.

FIG. 12 is a diagram 1200 illustrating example communication over an indirect path between two UEs 1204a-b that is assisted by a UPF 1208. The RAN 1206 may include, inter alia, at least one base station 1202, such as a gNB or other similar base station, and a UPF 1208 for routing and forwarding packets between UEs. Potentially, the UPF 1208 may be collocated with the base station in the RAN 1206.

$UE_1$ 1204a may be configured to transmit data packets to $UE_2$ 1204b, with $UE_2$ 1204b being configured to acknowledge those data packets. While this communication may be direct, indirect communication may lend itself to certain scenarios more than direct communication. In such scenarios, the data packets may traverse the RAN, which may be regarded as highly reliable in regard to packet delivery (e.g., the RAN may feature a packet error rate of approximately less than $10^{-6}$, or other similar relatively low metric).

On various communication paths, $UE_1$ 1204a and $UE_2$ 1204b may be logically linked at one or more layers of the respective protocol stacks, e.g., in addition to a link at the management layer. For example, a link between the UEs 1204a-b may be established at the MAC layers of the UEs 1204a-b, which may in. Accordingly, $UE_1$ 1204a may transmit MAC PDUs that are addressed to the MAC address (potentially, Ethernet address) of $UE_2$ 1204b. Such MAC PDUs may be acknowledged (or non-acknowledged) by $UE_2$ 1204b, routed according to the MAC address (or Ethernet address) of $UE_1$ 1204a.

At the RAN 1206, the UPF 1208 may provide MAC layer-level support for such links. To that end, the UPF 1208 may be configured to record the binding of MAC addresses so that MAC layer signaling can be used to communicate with one or both of the UEs 1204a-b. For example, the UPF 1208 may at least temporarily bind a link at a relatively higher layer, such as an RRC layer, with one or both of the MAC addresses of the UEs 1204a-b and/or the associated MAC PDU session.

Therefore, the UPF 1208 may be configured to uniquely identify the MAC layer link between the UEs 1202a-b. With such a capability, the UPF 1208 may be aware of the UEs (or UE links) to which MAC CEs correspond. Accordingly, $UE_1$ 1204a and/or $UE_2$ 1204b may include some information intended for the RAN 1206 in MAC CEs, and the UPF 1208 may be able to identify the link between the UEs 1204a-b as the link to which the information in such MAC CEs is applicable.

A CG may be configured for $UE_1$ 1204a so that the UE may quickly transmit on resources that have already been allocated for that communication. However, the CG may not be perpetually active. Rather, $UE_1$ 1204a may request to activate the CG, and may transmit on the allocated resources without first waiting for a response from the RAN 1206 (or after receiving relatively low-overhead ACK/NACK feedback). $UE_1$ 1204a may include the CG activation message in a MAC CE to the RAN 1206, or in another message (e.g., BSR) to the RAN 1206.

The UPF 1208 may maintain a mapping between the CG for $UE_1$ 1204a and an SPS configuration with which $UE_2$ 1204b is configured (e.g., a CG/SPS pair), as once the CG is activated for $UE_1$ 1204a, then the SPS configuration should likewise be activated for $UE_2$ 1204b in order to forward the data on the CG resources to $UE_2$ 1204b on SPS resources. Thus, by binding the MAC layer link between the UEs 1204a-b, one MAC CE may be sufficient for the RAN 1206 to be configured for the network-assisted D2D communication between the UEs 1204a-1204.

As illustrated in FIG. 12, a set of data packets may be transmitted and acknowledged on an indirect path where $UE_1$ 1202a requests activation of a CG by transmitting a MAC CE 1220 to the RAN 1206, or by transmitting another message (e.g., BSR) to the RAN 1206. In some aspects, the CG and corresponding SPS configuration may have been earlier configured by the RAN 1206 for the indirect path between the UEs 1204a-b. With the CG activated, $UE_1$ 1204a may transmit a CG transmission 1222 including a set of data packets on the CG resources.

When the RAN 1206 receives the MAC CE 1220 (or other message) requesting CG activation, the UPF 1208 may identify the link between the UEs 1204a-b using stored information binding the MAC addresses of one or both $UE_1$ 1204a and/or $UE_2$ 1204b to the link. Accordingly, the UPF 1208 may instruct the base station 1202 to activate the SPS configuration corresponding to the received MAC CE 1220. When the set of data packets arrives, the UPF 1208 may consume a relatively brief duration 1226 in forwarding and processing of the set of data packets from the $UE_1$ 1204a to downlink resources so that the set of data packets is included in a first SPS transmission 1228 on SPS resources for $UE_2$ 1204b.

Potentially, $UE_2$ 1204b may fail to successfully receive the SPS transmission 1228, and therefore, UE 1204b may provide NACK feedback 1236 in response. Assuming the RAN 1206 does not buffer the first CG transmission 1222 for retransmission, the UPF 1208 may identify the MAC layer HARQ feedback is intended for $UE_1$ 1204a. Accordingly, the RAN 1206 may forward NACK feedback 1232 on toward $UE_1$ 1204a based on the NACK feedback 1236 received from $UE_2$ 1204b.

In response to the NACK feedback 1232, $UE_1$ 1204a may retransmit the set of data packets in a CG retransmission 1224 on the CG resources (e.g., on the next or other subsequent periodic occurrence of the CG resources). Again, the UPF 1208 may identify $UE_2$ 1204a as the intended destination for the set of packets, and so may provide information to the base station 1202 indicating $UE_2$ 1204b as the intended destination for the set of data packets. The base station 1202 may transmit the set of data packets in an SPS retransmission 1230 on the configured SPS resources.

When $UE_2$ 1204b successfully receives the SPS retransmission 1230, $UE_2$ 1204b may provide ACK feedback 1238 in response. The UPF 1208 may route the ACK feedback 1238 toward $UE_1$ 1204a, and therefore, the RAN 1206 may transmit ACK feedback 1234 to $UE_1$ 1204a. When $UE_1$ 1204a has completed transmission of a packet stream to $UE_2$ 1204b (and no other data remains to be transmitted), $UE_1$ 1204a may deactivate the CG using another MAC CE, with the other MAC CE also having the effect of deactivating the SPS configuration according to the MAC layer binding at the UPF 1208.

The use of such a MAC CE to activate the foregoing procedure may be beneficial in terms of overhead. In particular, MAC CEs are relatively fast and lightweight in that a small amount of resources are consumed for MAC CE transmission, and therefore, a CG/SPS pair can be quickly activated and deactivated, e.g., relative to activation and deactivation of a CG/SPS pair at the RRC layer. Further, unused SPS resources may be avoided when the network-assisted communication path is unused because the UPF 1208 may be deactivate the corresponding SPS configuration upon receiving a MAC CE deactivating a CG from $UE_1$ 1204a.

Figure 13:
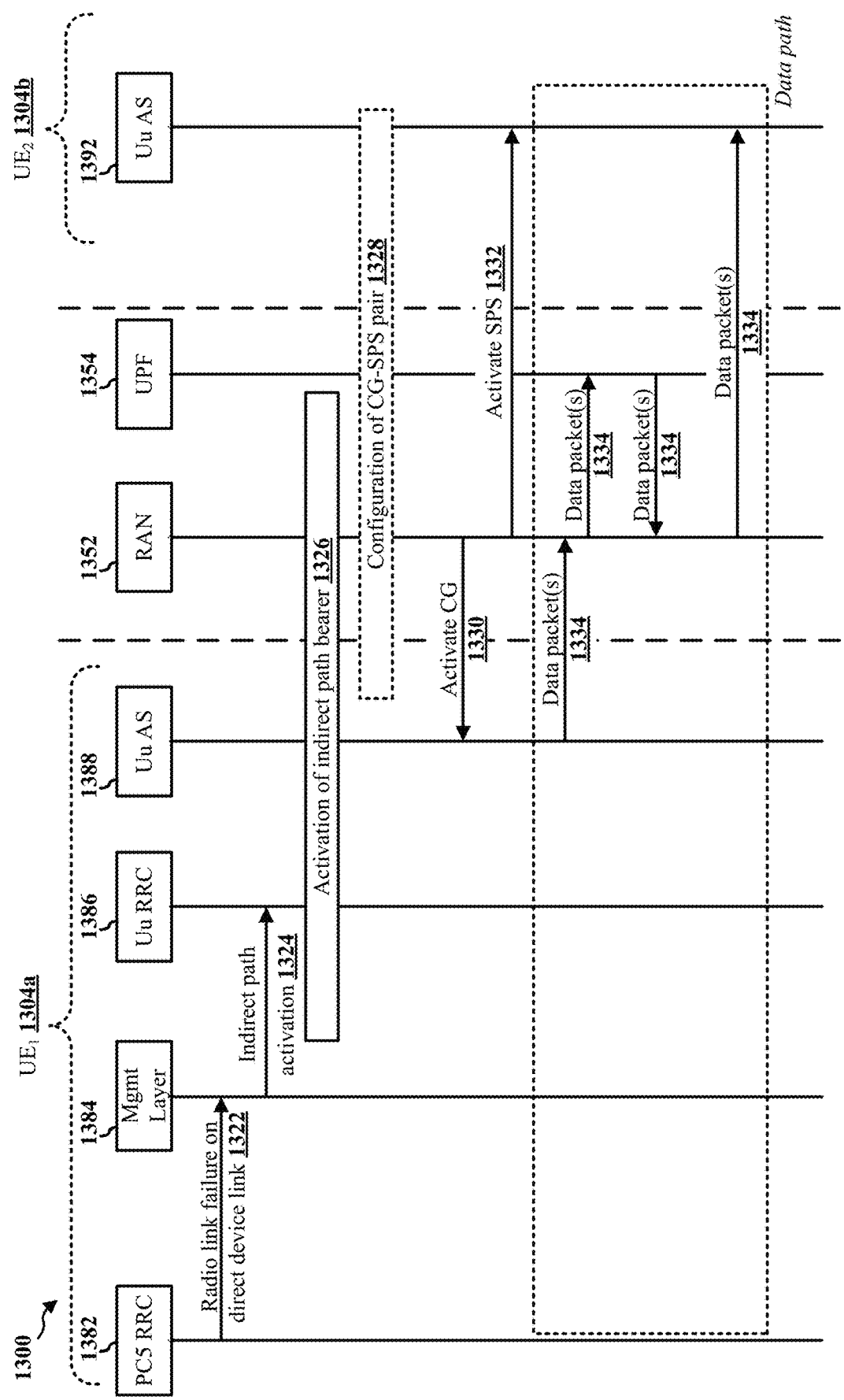
FIG. 13 is a call flow diagram 1300 illustrating example operations for recovering data communication between devices when direct device communication fails.

FIG. 13 is a call flow diagram 1300 illustrating example operations for recovering data communication between devices when direct device communication fails. While the present disclosure describes the concepts and various aspects herein with reference to the PC5 interface on sidelink channels for direct device communication and the Uu interface on physical control and/or shared channels, one of ordinary skill will appreciate that such reference is illustrative and non-limiting. That is, the concepts and various aspects described herein may be practiced on other interfaces and/or channels without departing from the scope of the present disclosure.

In some IoT applications, and IIoT in particular, $UE_1$ 1304a (e.g., a PLC) may establish a direct device path with $UE_2$ 1304b, such as a D2D link on a PC5 interface over sidelink resources. Specifically, the management layer entity 1384 may establish a bearer to a receiving $UE_2$ 1304b, which may terminate at a receiving management layer entity, an RRC entity, or another entity of the $UE_2$ protocol stack. The direct device path may enable low latency communications, e.g., as $UE_1$ 1304a and $UE_2$ 1304b may complete any communication on the direct device path without intervention from or inclusion of other systems that inherently increase latency.

However, the direct device path may be more susceptible to interference and blockages than channels on the air interface with the RAN, thereby jeopardizing some reliability. In anticipation of meeting high reliability in addition to low latency use cases, the management layer entity 1384 may establish an indirect path (e.g., on the control plane), which may be a multi-hop path through the RAN 1352 for D2D communication between $UE_1$ 1304a and $UE_2$ 1304b. The RAN 1352 may be unaware of or agnostic to the redundant paths between the two UEs 1304a-b.

The Uu RRC entity 1386 may establish, through a Uu access stratum (AS) entity 1388 that implements the air interface with the RAN 1352 (e.g., a gNB, small cell, or other RAN network entity), activation of a network-assisted bearer 1326 for an indirect communication path from $UE_1$ 1304a to $UE_2$ 1304b. In order to reduce the latency in communicating over the network-assisted D2D bearer, the RAN 1352 may establish configuration of an CG-SPS pair 1328 on the network-assisted indirect path, e.g., based on activation of the bearer 1326 on the indirect path. In some aspects, the configuration of the CG-SPS pair 1328 may be completed before radio link failure is detected on the direct device path.

For configuration of the CG-SPS pair 1328, the RAN 1352 may allocate a set of resources for the network-assisted indirect path to between $UE_1$ 1304a and $UE_2$ 1304b, which may be dedicated or may be time-division multiplexed with another allocation. Allocated uplink resources may be configured as a grant to $UE_1$ 1304a for a period of time, which may be finite or may be indefinite until deactivated. Accordingly, $UE_1$ 1304a may transmit on the CG resources without issuing any further requests to the RAN 1352 or otherwise reserving resources on the sidelink channel. For example, the $UE_1$ 1304a may be configured to transmit on uplink CG resources without first transmitting a scheduling request and/or receiving DCI indicating an uplink grant, as the CG is sufficient as the grant on which $UE_1$ 1304a may transmit. Allocated downlink resources may be configured as SPS resources that are configured with a periodicity for $UE_2$ 1304b to monitor.

While this arrangement may reduce latency on the uplink portion of the indirect path to $UE_2$ 1304b, the downlink portion of the path from the RAN 1352 to $UE_2$ 1304b may also be configured so as to reduce latency. In some aspects, the RAN 1352 may configure $UE_2$ 1304b with SPS resources, which the RAN 1352 may activate or deactivate as needed, e.g., according to uplink information received on the CG resources. When activated, $UE_2$ 1304b may be configured to monitor the configured SPS resources and receive the information carried thereon. Such a coordinated approach to reducing latency on a network-assisted communication path may be referred to as a "CG and SPS pair"

or other suitable terminology. When the communication on the indirect path has ceased, the SPS resources may be deactivated, e.g., to reduce network congestion and permit $UE_2$ 1304b to operate in a relatively lower power state.

Described herein are various concepts and aspects in which the two communication paths may be leveraged to meet both high reliability and low latency demands for various use cases. In some illustrative non-limiting examples, the PC5 RRC entity 1382 of $UE_1$ 1304a detects a radio link failure 1322 and, in response, informs the management layer entity 1384 of the detected radio link failure 1322. In connection therewith, the management layer entity 1384 may activate the indirect path 1324 through the Uu RRC entity 1386. Based thereon, the Uu RRC layer entity 1386 may activate the indirect path bearer 1326, such as by signaling the RAN 1352 over the air interface using the Uu AS entity 1388. The Uu RRC entity 1386 may inform the RAN 1352 of the bearer activation, for example, using a MAC CE or other similar signaling mechanism (e.g., BSR or other message).

The activation of the indirect path bearer 1326 may explicitly or implicitly inform the RAN 1352 that a certain type or amount of signaling is imminent, and therefore, setup or other signaling commensurate with network-assisted D2D communication establishment and activation may be initiated. For example, $UE_2$ 1304b may be located for the RAN 1352 and/or an network-assisted link between $UE_1$ 1304a and $UE_2$ 1304b may be identified based on information stored by the UPF 1354. The UPF 1354 may collect, store, and maintain information that the RAN 1352 may use to locate, page, and communicate with $UE_2$ 1304b. Potentially, the UPF 1354 may be collocated or integrated with a base station in the RAN 1352.

$UE_1$ 1304a may have buffered data for transmission to $UE_2$ 1304b, and therefore, the CG 1330 may be activated by the RAN 1352 to carry transmissions from $UE_1$ 504a. In addition, the RAN 1352 (and potentially, the UPF 1354) may signal the Uu AS entity 1392 of $UE_2$ 1304b to activate the SPS configuration 1332. For example, the RAN 1352 may transmit an instruction to $UE_2$ 1304b that activates the SPS configuration 1332 such that $UE_2$ 1304b operates at a relatively higher power state and detects and decodes each of the resources indicated by the RAN 1352 as being activated by the SPS.

Following activation of the bearer 1326 (and activation of the CG 1330), $UE_1$ 1304a may transmit a set of data packets 1334 intended for $UE_2$ 1304b to the RAN 1352 on the CG resources. The RAN 1352 may receive the data packets 1334 on the CG resources, and may forward those packets to the UPF 1354.

Having located $UE_2$ 1304b, the UPF 1354 may transmit the data packets 1334 to the RAN entity appropriate for the location of $UE_2$ 1304b, which may be the same RAN entity that originally received the data packets 1334 from $UE_1$ 1304a. The RAN 1352 may then forward to data packets 1334 to the final destination of $UE_2$ 1304b.

Figure 14:
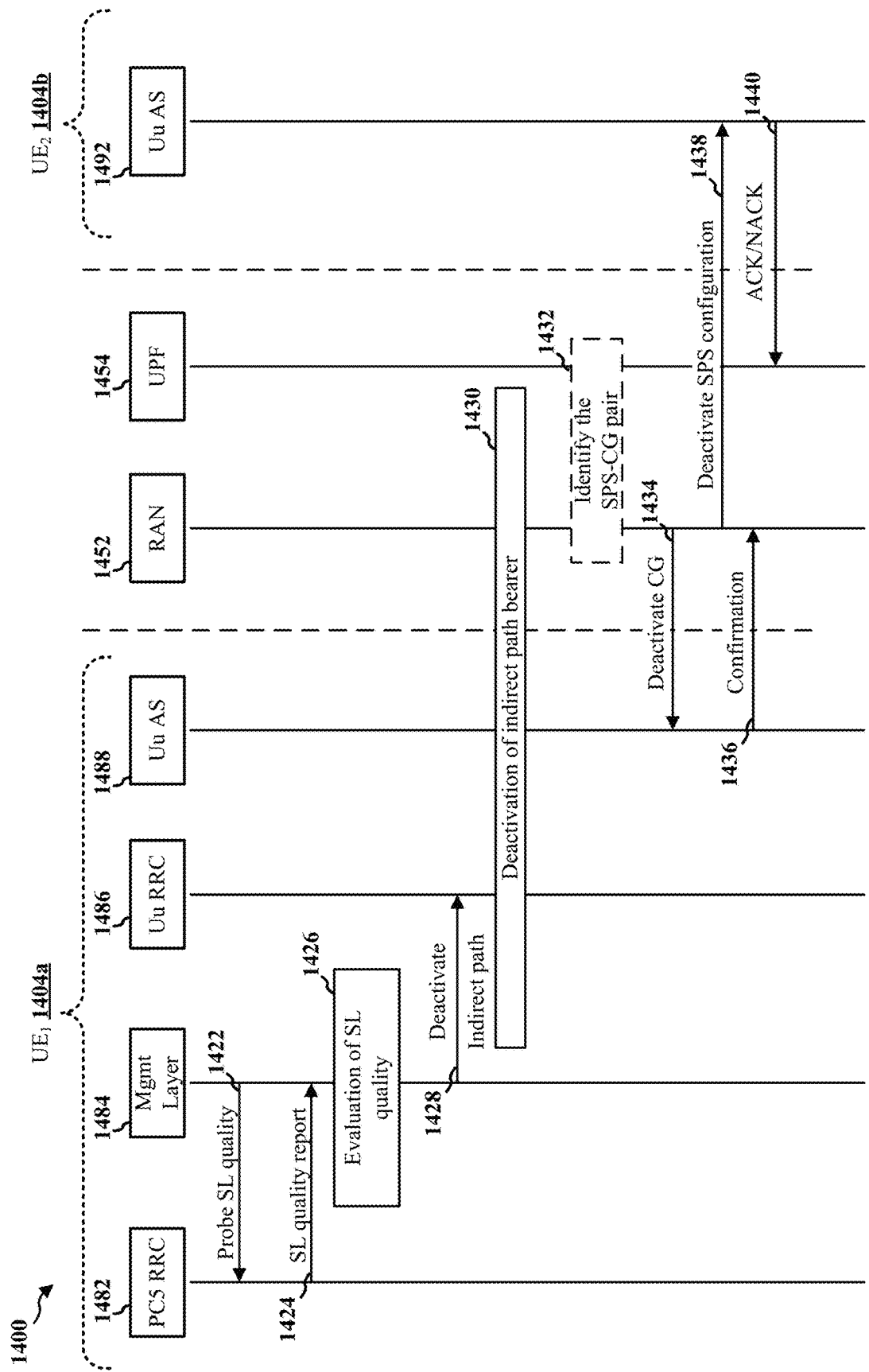
FIG. 14 is a call flow diagram illustrating an example of offloading signaling to a direct device connection from a network-assisted connection.

FIG. 14 is a call flow diagram 1400 illustrating an example of offloading signaling to a direct device connection from an indirect connection. In some configurations, a management layer entity 1584 may, through a PC5 RRC entity 1482, probe a sidelink (SL) channel 1422 on which a direct device communication path between $UE_1$ 1404a and $UE_2$ 1404b is configured. The PC5 RRC entity 1482 may detect or calculate a measurement that is indicative of the quality on the SL channel, such as an RSRP, SNR, or another similar measurement that reflects the amount of interference on resources that may be used for the SL communication.

The PC5 RRC entity 1482 may report the SL quality 1424 to the management layer entity 1484 (e.g., on the control plane), which may evaluate the sidelink quality with respect to one or more QoS conditions 1426, such as QoS conditions specifying high reliability and/or low latency. For example, the management layer entity 1484 may compare the reported SL quality measurement(s) with a threshold(s) that demarcates acceptable measurements for QoS conditions. If the management layer entity 1484 finds that the reported SL quality measurement(s) fail to satisfy the relevant threshold(s), then the management layer entity 1484 may determine that communication with $UE_2$ 1404b cannot be migrated onto the direct device communication path without an appreciable risk of violating the QoS conditions expected of the UE communication.

However, if the management layer entity 1484 determines that the reported SL quality measurement(s) satisfy the relevant threshold(s), then the management layer entity 1484 may determine that communication with $UE_2$ 1404b can be migrated onto the direct device communication path while still meeting the QoS conditions expected of the UE communication. To that end, the management layer entity 1484 may signal a Uu RRC entity 1486 of $UE_1$ 1404a to deactivate the network-assisted indirect path 1428 established with $UE_2$ 1404b. For deactivation of the indirect communication path, the Uu RRC entity 1486 may signal the deactivation of the bearer 1430 on the indirect path to the RAN 1452 (e.g., a base station, such as a gNB, or another network entity). The Uu RRC entity 1486 may signal the bearer deactivation in a MAC CE (or other message, such as a BSR) to the UPF 1454.

At the RAN 1452 (e.g., as stored by the UPF 1454), the MAC addresses of one or both of $UE_1$ 1404a and/or $UE_2$ 1404b may be bound to the bearer, and the UPF 1454 may maintain a mapping of the MAC addresses and/or bearer to a CG/SPS pair configured for the indirect path bearer. When the UPF 1454 is informed by $UE_1$ 1404a of the indirect path bearer, the UPF 1454 may determine that the SPS configuration of the relevant CG/SPS pair is to be deactivated. Accordingly, the UPF 1454 may identify 1432 the SPS configuration of the CG/SPS pair, e.g., based on the MAC addresses of one or both of $UE_1$ 1404a and/or $UE_2$ 1404b.

Upon identifying the relevant CG/SPS pair configured for the UEs 1404a-b, the UPF 1454 may provide information (e.g., to a base station) for the RAN 1452 to deactivate the CG 1434 that is configured for the indirect path between $UE_1$ 1404a and $UE_2$ 1404b. A Uu AS entity 1488 of $UE_1$ 1404a may receive the CG deactivation and may locally deactivate the CG so that $UE_1$ 1404a refrains from transmitting on the CG resources until activated again or reconfigured. Through the Uu AS entity 1488, $UE_1$ 1404a may respond to the deactivation with a message 1436 confirming that the CG of the CG/SPS for the indirect path is locally deactivated at $UE_1$ 1404a. $UE_1$ 1404a may use a MAC CE, which may be unique to the aspects described herein, or $UE_1$ 1404a may use another message type, such as a BSR.

Further, the UPF 1454 may provide information (e.g., to a base station) for the RAN 1452 to deactivate the SPS configuration 1438 of the indirect path between $UE_1$ 1404a and $UE_2$ 1404b. A Uu AS entity 1492 of $UE_2$ 1404b may receive the SPS configuration deactivation and may locally deactivate the CG so that $UE_1$ 1404a refrains from transmitting on the CG resources until activated again or reconfigured. Through the Uu AS entity 1492, $UE_2$ 1404b may respond to the deactivation with ACK/NACK feedback 1440, such as a HARQ ACK bit to acknowledge successful reception of the instruction to deactivate the SPS configuration.

Figure 15:
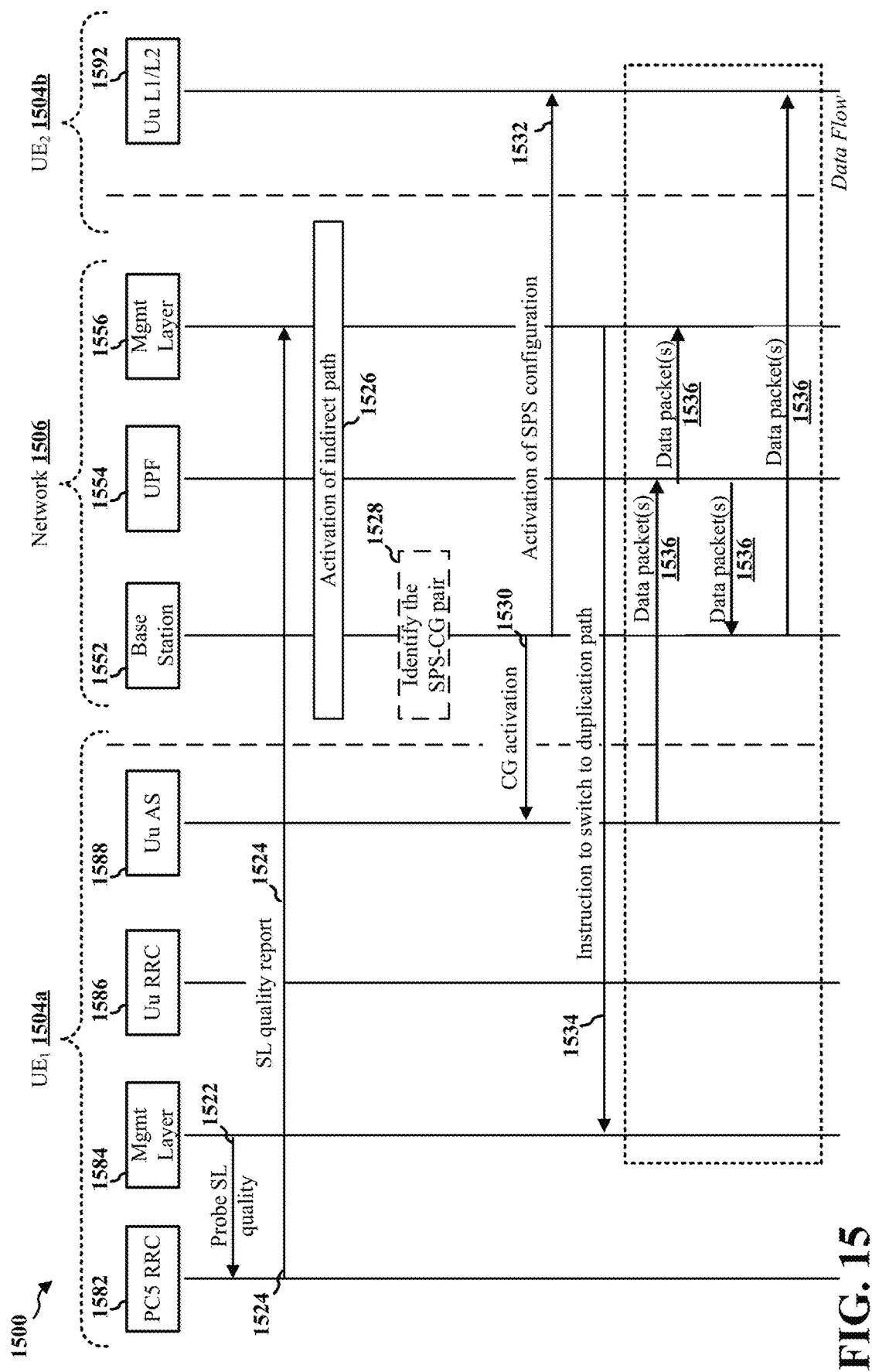
FIG. 15 is a call flow diagram illustrating an example of network-assisted path management between devices through a protocol layer on a control plane of the network.

FIG. 15 is a call flow diagram 1500 illustrating an example of network-assisted path management between devices 1504a-b through a protocol layer 1542 on a control plane of the network 1506. In some configurations, a management (illustrated as "Mgmt") layer entity 1584 may, through a PC5 RRC entity 1582, probe a SL channel 1522 on which a direct device communication path between $UE_1$ 1504a and $UE_2$ 1504b is configured. The PC5 RRC entity 1582 may detect or calculate a measurement that is indicative of the quality on the SL channel, such as an RSRP, SNR, or another similar measurement that reflects the amount of interference on resources that may be used for the SL communication.

The PC5 RRC entity 1582 may report the SL quality 1524 to the network 1506. Specifically, the network 1506 may include a management layer entity 1556 (e.g., on the control plane), which may be designed to offload some signaling and/or processing overhead from UEs onto the network.

The direct device path may be more susceptible to interference and blockages than channels on the air interface with the RAN, thereby jeopardizing some reliability. In anticipation of meeting high reliability in addition to low latency use cases, the network management layer entity 1556 may assist in establishing an indirect path (e.g., on the control plane), which may be a multi-hop path through the base station 1552 for D2D communication between $UE_1$ 1504a and $UE_2$ 1504b. The base station 1552 may be unaware of or agnostic to the redundant paths between the two UEs 1504a-b.

The network management layer entity 1556 may be configured to evaluate the sidelink quality with respect to one or more QoS conditions or other threshold(s) indicative of acceptable channel quality, such as QoS conditions specifying high reliability and/or low latency or other threshold(s) indicative of a channel quality or signal strength. For example, the network management layer entity 1556 may compare the reported SL quality measurement(s) with a threshold(s) that demarcates acceptable measurements for QoS conditions or signal quality. If the network management layer entity 1556 determines that the measurement(s) in the SL quality report satisfy the relevant threshold(s), then the network management layer entity 1556 may instruct the UEs 1504a-b that communication is not to be migrated onto the indirect communication path, e.g., because the direct device path is estimated to meet the QoS conditions expected of the UE communication If, based on the comparison, the management layer entity 1556 finds that the reported SL quality measurement(s) fail to satisfy the relevant threshold(s) and/or if the SL quality measurements are indicative of an imminent radio link failure on the SL channel (e.g., rate of decline exceeds a threshold), then the network management layer entity 1556 may determine that communication link between $UE_1$ 1504a and $UE_2$ 1504b should either be supplemented with another link (e.g., a network-assisted link) or moved off the direct device link.

To that end, the network management layer entity 1556 may signal a Uu RRC entity 1588 of $UE_1$ 1504a to activate the network-assisted indirect path 1526 established with $UE_2$ 1504b. Specifically, the network management layer entity 1556 may activate a bearer 1526 through $UE_1$ to a receiving $UE_2$ 1504b, which may terminate at a receiving management layer entity 1592, an RRC entity, or another entity of the $UE_2$ protocol stack.

In order to reduce the latency in communicating over the network-assisted D2D bearer, the base station 1552 may establish a configuration for an CG-SPS pair 1528 on the network-assisted indirect path, e.g., based on activation of the bearer 1526 on the indirect path. In some aspects, the configuration of the CG-SPS pair 1528 may be completed before radio link failure is detected on the direct device path.

For configuration of the CG-SPS pair 1528, the base station 1552 may allocate a set of resources for the network-assisted indirect path to between $UE_1$ 1504a and $UE_2$ 1504b, which may be dedicated or may be time-division multiplexed with another allocation. Allocated uplink resources may be configured as a grant to $UE_1$ 1504a for a period of time, which may be finite or may be indefinite until deactivated. Accordingly, $UE_1$ 1504a may transmit on the CG resources without issuing any further requests to the base station 1552 or otherwise reserving resources on the sidelink channel. For example, the $UE_1$ 1504a may be configured to transmit on uplink CG resources without first transmitting a scheduling request and/or receiving DCI indicating an uplink grant, as the CG is sufficient as the grant on which $UE_1$ 1504a may transmit. Allocated downlink resources may be configured as SPS resources that are configured with a periodicity for $UE_2$ 1504b to monitor.

When the network management layer entity 1556 finds the sidelink path to have failed, or to have nearly reached an associated threshold, the network management layer entity 1556 may migrate the UEs 1504a-b onto the indirect path. For example, the base station 1552 may activate 1530 the CG for the transmitting $UE_1$ 1504a, and may activate 1532 the SPS configuration for $UE_2$ 1504b. In some aspects, the network management layer entity 1556 may transmit, to $UE_1$ 1504a, an instruction 1534 to switch to path duplication or redundant paths based on the SL quality reporting 1524 indicating that the SL is will imminently fail or is negatively trending, then the network 1506 may assist with the indirect communication between $UE_1$ 1504a and $UE_2$ 1504b.

Following activation of the bearer 1526 (and activation of the CG 1530), $UE_1$ 1504a may transmit a set of data packets 1536 intended for $UE_2$ 1504b to the network 1506 on the CG resources. The UPF 1554 may receive the data packets 1536 on the CG resources, and may forward those packets to the network management layer entity 1556.

The network management layer entity 1556 may receive those packets and assign packets a stream handle used to identify the traffic stream in which each of the packets is included. In some aspects, the network management layer entity 1556 may remove redundant packets, e.g., if redundancy is encoded on the same bearer. Further, the network management layer entity 1556 may reorder the packets for each traffic stream. The network management layer entity 1556 may then deliver the packets 1536 to the UPF 1554.

The UPF 1554 may transmit the data packets 1536 to the base station 1552, which forward data packets 1536 to the final destination of $UE_2$ 1504b according to the SPS configuration activated for $UE_2$ 1504b.

Figure 16:
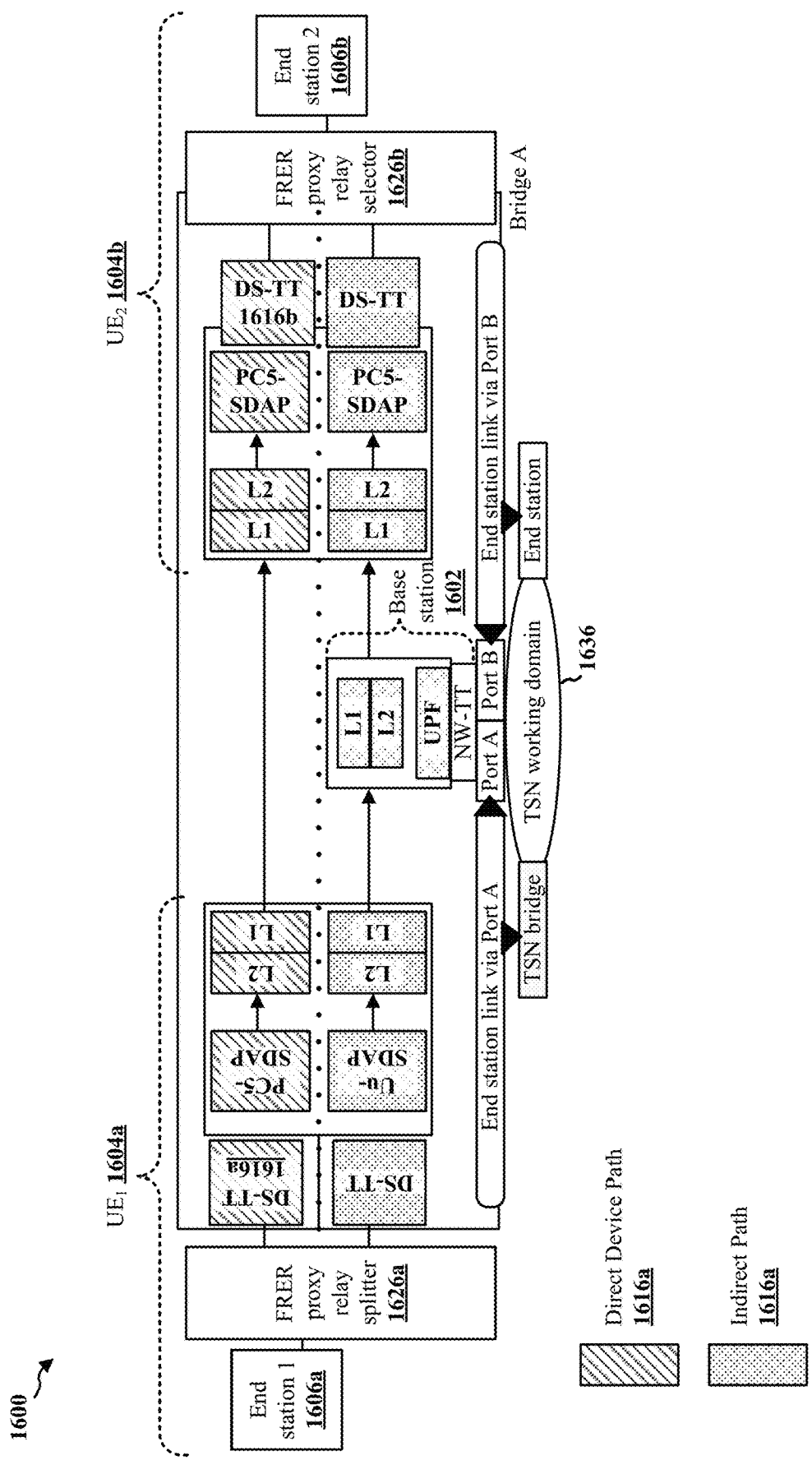
FIG. 16 is a diagram illustrating an example of redundant communication paths between UEs.

FIG. 16 is a diagram 1600 illustrating an example implementation of redundant communication paths between $UE_1$ 1604a and $UE_2$ 1604b. In the illustrated example, the UEs 1604a-b may be deployed in a time-sensitive (TSN) working domain. Such a TSN working domain 1636 may include some standardized designs and configurations of particular applicability to IIoT and similar deployments. Implementations in TSN may enable some or all devices (e.g., between PLCs and UEs) to meet or exceed some very low latency and/or high reliability thresholds enforced or expected on some traffic streams, such as control streams. For example, TSN may include some timing and synchronization for time-sensitive or delay-intolerant applications and use cases, scheduling and stream reservation enhancements, forwarding and queuing configurations, frame preemption, and so forth.

In some configurations, as shown in FIG. 16, generation of redundant packets at the transmitting $UE_1$ 1604a and identification and elimination of redundant packets at the receiving $UE_2$ 1604b may be implemented by another entity separate from the management layer entity. For example, a frame replication and elimination for reliability (FRER) proxy relay splitter 1626a may be implemented at $UE_1$ 1604a in order to generate redundant packets for transmission over the direct device path 1616a and the indirect path 1616b assisted by the base station 1602. $UE_2$ 1604b may implement a complementary FRER proxy relay selector 1626b configured to identify and discard redundant packets so an efficient stream may be provided to the end station.

In some aspects, the direct device path 1616a may be exposed as a separate component to the end stations, such as an 802.1Q link to an end station. In some other aspects, the direct device path 1616a may be exposed as a separate port on the same bridge using stream filtering to ensure that one set of data packets is provided for transmission on the direct device path 1616a, while a redundant set of data packets is transmitted on the indirect path 1616b through the base station 1602.

Potentially, a respective device-side TSN translator (DS-TT) may be allocated for each of the direct device path 1616a and the indirect path 1616b on both the transmitting side and the receiving side. The DS-TT 1622a at $UE_1$ and the DS-TT 1622b at $UE_2$ 1604b may be interpreted as a point-to-point link in the TSN working domain 1636, as well as to some other layers of the UEs 1604a-b. Both the end station 1606a of $UE_1$ 1604a and the end station 1606b of $UE_2$ 1604b may view such an arrangement as two separate links, without necessarily being aware of the convergence at the other one of the UEs 1604a-b.

Figure 17:
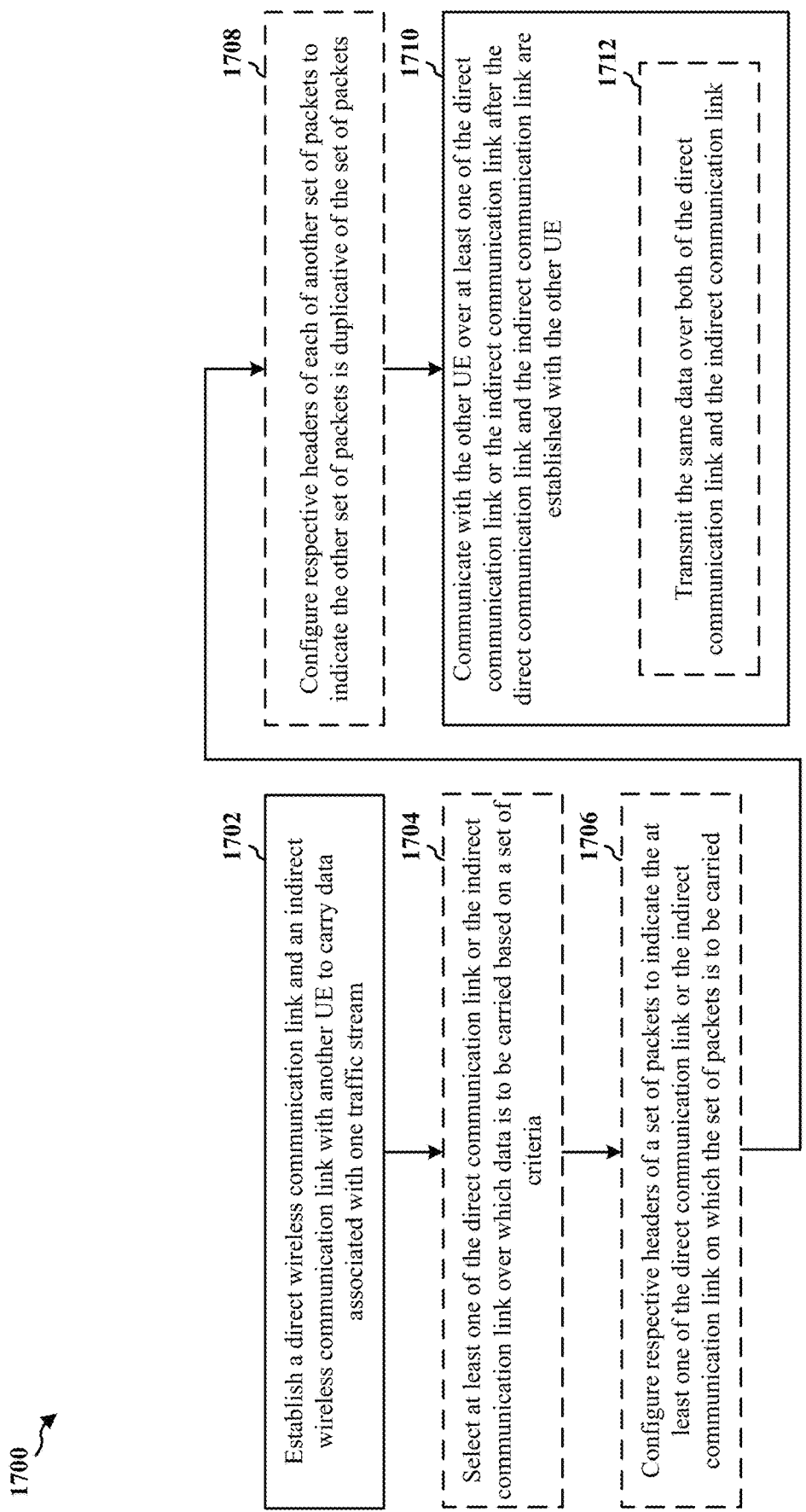
FIG. 17 is a flowchart of an example method of wireless communication by a transmitting UE.

FIG. 17 is a flowchart 1700 of a method of wireless communication by a wireless communications device. The method may be performed by a UE (e.g., at least one of the UEs 104, 104', 350, 554a, 554b, 604a, 604b, 1104a, 1104b, 1104c, 1104d, 1204a, 1204b, 1304a, 1304b, 1404a, 1404b, 1604a, 1604b), a PLC (e.g., at least one of the PLCs 406a, 406b, 406c, 506), an S/A (e.g., at least one of the S/As 404a, 404b, 404c, 404d, 504a, 504b, 504c), and/or another apparatus (e.g., at least one of the HMIs 408a, 408b, the management system 410, the apparatus 1902). According to various different aspects, one or more of the illustrated operations may be omitted, transposed, or contemporaneously performed.

At 1702, the UE may establish a direct wireless communication link and an indirect wireless communication link with another UE to carry data associated with one traffic stream. For example, first, the UE may discover the presence of the other UE, and second, the UE may set up one bearer with the other UE over a direct communication link and may set up another bearer with the other UE over an indirect communication link. In some aspects, the indirect wireless communication link may traverse at least one system of an access network (e.g., a UPF and/or a base station), and the direct wireless communication link may be a D2D link that is opened based on a sidelink discovery procedure with the other UE. In the context of FIG. 11, for example, $UE_1$ 1104a may transmit a discovery announcement message 1122 and, in response, $UE_1$ 1104a may receive a discovery response message 1124 from at least other $UE_n$ 1104n.

At 1704, the UE may select at least one of the direct communication link or the indirect communication link over which data is to be carried based on a set of criteria. According to various aspects, the set of criteria may include at least one criterion for at least one of data reliability, data integrity, latency, channel quality, link capacity, transmission error rate or packet loss rate. The architecture of the UE may be implemented such that the at least one of the direct communication link or the indirect communication link is selected at a management layer of a protocol stack, the protocol stack further includes a PDCP layer that is logically lower than the management layer, and the direct communication link and the indirect communication link are managed at the management layer. In the context of FIG. 6, for example, $UE_1$ 604a may select at least one of the direct communication path 616a or the indirect communication path 616b over which data is to be carried based on a set of criteria.

At 1706, the UE may configure respective headers of a set of packets to indicate the at least one of the direct communication link or the indirect communication link on which the set of packets is to be carried. For example, the UE may determine a stream ID for packets to be transmitted to the other UE, e.g., using a combination or function considering one or more of a VLAN ID of the traffic stream, a destination address, and/or a source address. The UE may insert the ID or other value in a header field of each packet that is to be transmitted to the other UE. In the context of FIG. 8, for example, the transmitting UE may configure a stream ID 814b based on some combination or function of one or more of a LAN or VLAN ID, a destination address, and/or a source address, which may be information that the entity of the management layer-U 842a is able to derive from the higher layer packet 812, and the transmitting UE may insert the ID into a field of a header of each packet.

At 1708, the UE may configure respective headers of each of at least another set of packets to indicate the at least the other set of packets is redundantly encoded with the set of packets. For example, the UE may determine that packets are redundantly encoded for transmission over both direct and indirect communication links. The UE may select each packet on at least one (and potentially both) of the direct and/or indirect communication links, and the UE may insert an R-Tag in each of the selected packets. In the context of FIG. 8, the transmitting UE may include a sequence encoder 843c that may encode information indicative of the redundancy across the packets 812', 812". In particular, the sequence encoder 843c may insert 870c an R-Tag 816" into the second management layer packet 812" that indicates the second management layer packet 812" corresponds to (e.g., is a duplicate of) the first management layer packet 812' having the SN 814a with the stream ID 814b.

At 1710, the UE may communicate with the other UE over at least one of the direct communication link or the indirect communication link after the direct communication link and the indirect communication link are established with the other UE. In the context of FIG. 6, for example, $UE_1$ 604a may communicate with $UE_2$ 604b over at least one of the direct communication path 616a or the indirect communication pat 616b after the direct communication path 616a link and the indirect communication path 616b are established with $UE_2$ 604b.

In some aspects of 1710, at 1712, the UE may communicate with the other UE by transmitting data over both of the direct communication link and the indirect communication link. Potentially, the data may be the same—that is, data on one of the direct communication link or the indirect communication link may be redundantly encoded as data on other of the direct communication link or the indirect communication link. In the context of FIG. 8, for example, $UE_1$ 804a may communicate with $UE_2$ 804b by transmitting the packets 812', 812" having the same data payload to $UE_2$ 804b over both the PC5 interface and the Uu interface.

Figure 18:
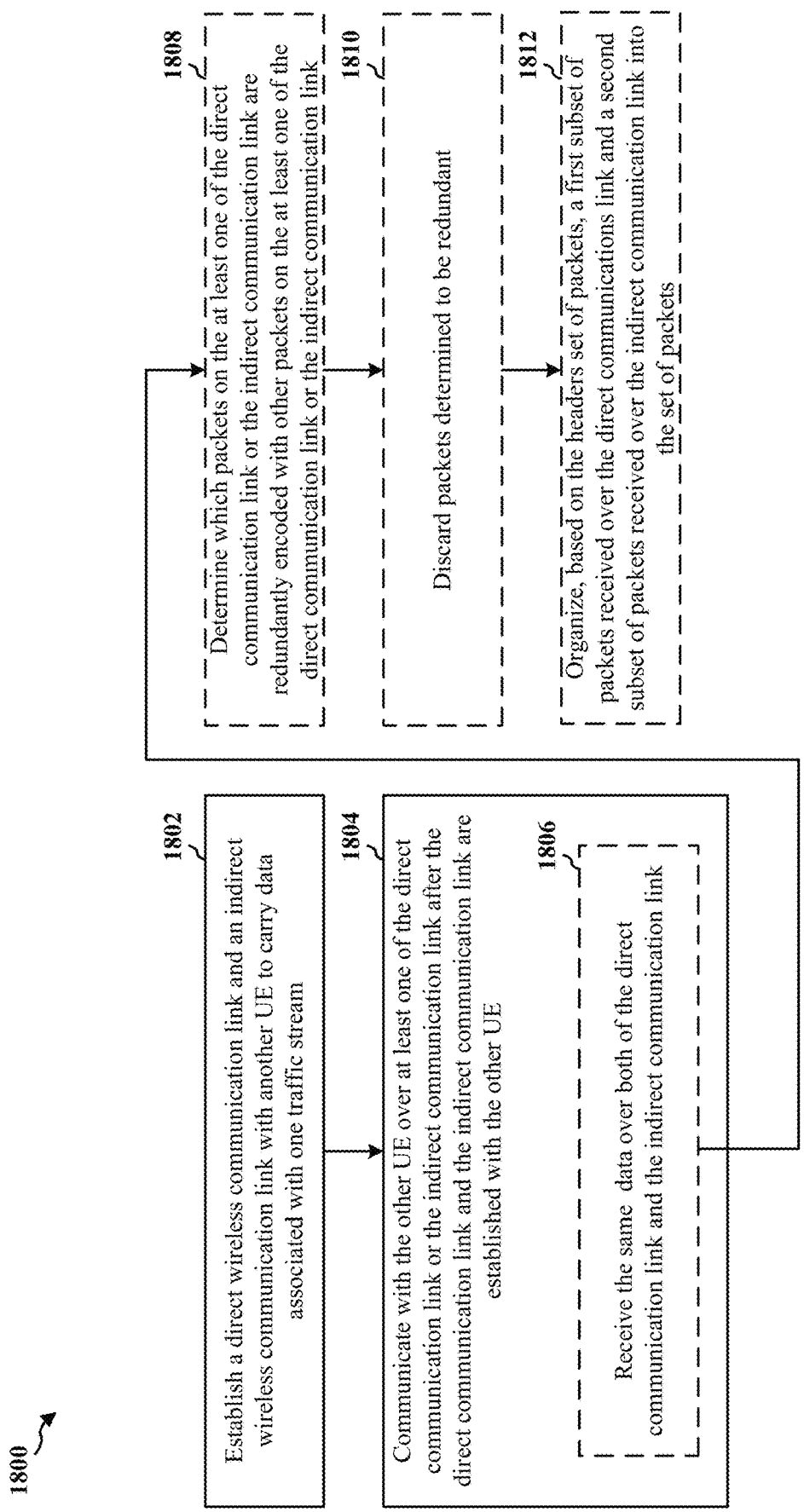
FIG. 18 is a flowchart of an example method of wireless communication by a receiving UE.

FIG. 18 is a flowchart 1800 of a method of wireless communication by a wireless communications device. The method may be performed by a UE (e.g., at least one of the UEs 104, 104', 350, 554a, 554b, 604a, 604b, 1104a, 1104b, 1104c, 1104d, 1204a, 1204b, 1304a, 1304b, 1404a, 1404b, 1604a, 1604b), a PLC (e.g., at least one of the PLCs 406a, 406b, 406c, 506), an S/A (e.g., at least one of the S/As 404a, 404b, 404c, 404d, 504a, 504b, 504c), and/or another apparatus (e.g., at least one of the HMIs 408a, 408b, the management system 410, the apparatus 1902). According to various different aspects, one or more of the illustrated operations may be omitted, transposed, or contemporaneously performed.

At 1802, the UE may establish a direct wireless communication link and an indirect wireless communication link with another UE to carry data associated with one traffic stream. For example, first, the UE may receive a discovery announcement message from another UE. The UE may find a discovery announcement message transmitted from the other UE, and the UE may generate a discovery response message to identify the UE and capabilities thereof in order to respond to the discovery announcement message. In some aspects, the indirect wireless communication link may traverse at least one system of an access network (e.g., a UPF and/or a base station), and the direct wireless communication link may be a D2D link that is opened based on a sidelink discovery procedure with the other UE. In the context of FIG. 11, for example, $UE_n$ 1104n may receive a discovery announcement message 1122 from $UE_1$ 1104a and, in response, $UE_n$ 1104n may transmit a discovery response message 1124 to $UE_1$ 1104a.

At 1804, the UE may communicate with the other UE over at least one of the direct communication link or the indirect communication link after the direct communication link and the indirect communication link are established with the other UE. In the context of FIG. 6, for example, $UE_2$ 604b may communicate with $UE_1$ 604a over at least one of the direct communication path 616a or the indirect communication pat 616b after the direct communication path 616a link and the indirect communication path 616b are established with $UE_1$ 604a.

In some aspects of 1804, at 1806, the UE may communicate with the other UE by receiving the same data over both of the direct communication link and the indirect communication link. In the context of FIG. 8, for example, $UE_2$ 804b may communicate with $UE_1$ 804a by receiving the packets 812', 812" having the same data payload from $UE_1$ 804a over both the PC5 interface and the Uu interface.

At 1808, the UE may determine which packets on the at least one of the direct communication link or the indirect communication link are redundantly encoded with other packets on the at least one of the direct communication link or the indirect communication link. For example, first the UE may inspect the headers of each of the packets being received on the at least one of the direct communication link or the indirect communication link. The UE may compare the header contents with other header contents known to correspond to a redundantly encoded packet, such as by comparing the value of an R-Tag in the header contents to determine if there is a match and the packet is redundantly encoded with at least one other packet received on the at least one of the direct communication link or the indirect communication link. According to some other aspects, the UE may implement one of a vector recovery algorithm or a match recovery algorithm in order to identify redundantly encoded packets. In the context of FIG. 10, for example, the sequence decoder 1043c of the management layer-U may determine that one packet 1012" received over the Uu interface protocol stack 1046b is redundantly encoded with another packet 1012' received over the PC5 interface protocol stack 1046a based on the R-Tag 1016" included in the one packet 1012".

At 1810, the UE may discard the packets determined to be redundant. For example, first, the UE may inspect the header contents of each packet to identify those packets having a redundancy tag indicating that the packet is redundantly encoded with another packet on the traffic stream. The UE may also determine whether the data payload in the redundantly encoded packet has already been received on the traffic stream. If the packet is redundantly encoded and data payload has already been received in another packet of the traffic stream, then the UE may erase the redundantly encoded packet from memory. Otherwise, the UE may use the redundantly encoded packet for the traffic stream. In the context of FIG. 10, for example, the sequence recovery entity 1043d of the management layer-U 1042 may discard the one packet 1012" received over the Uu interface protocol stack 1046b that is redundantly encoded with the other packet 1012' received over the PC5 interface protocol stack 1046a.

At 1812, the UE may organize, based on the headers set of packets, a first subset of packets received over the direct communications link and a second subset of packets received over the indirect communication link into the set of packets. For example, the UE may inspect contents of the headers of each of the packets to identify a respective sequence number associated with each of the packets. The UE may reorder the packets in sequential order according to the identified sequence numbers, and the UE may forward the packets to the higher layer(s), which may include the intended destination of the packets. In the context of FIG. 10, for example, the sequence recovery entity 1043d may organize packets received over the Uu interface protocol stack 1046b with packets received over the PC5 interface protocol stack 1046a into a sequential ordering, and the sequence recovery entity 1043d may deliver the sequentially order packets to the higher layer(s) 1060.

Figure 19:
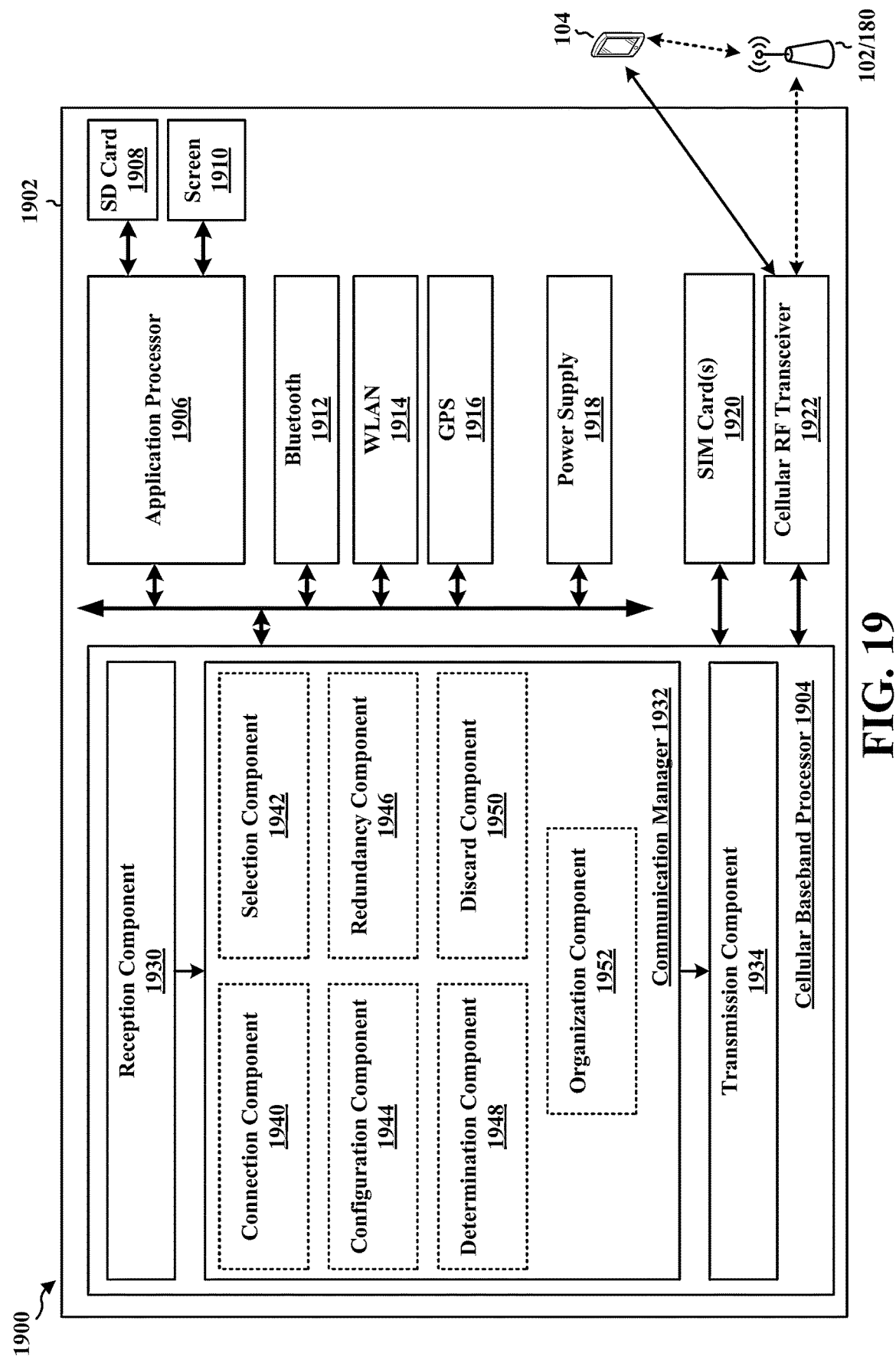
FIG. 19 is a diagram illustrating an example of a hardware implementation for an example apparatus.

FIG. 19 is a diagram 1900 illustrating an example of a hardware implementation for an apparatus 1902. The apparatus 1902 may be a UE or similar device, or the apparatus 1902 may be a component of a UE or similar device. The apparatus 1902 may include a cellular baseband processor 1904 (also referred to as a modem) and/or a cellular RF transceiver 1922, which may be coupled together and/or integrated into the same package or module.

In some aspects, the apparatus 1902 may accept or may include one or more subscriber identity modules (SIM) cards 1920, which may include one or more integrated circuits, chips, or similar circuitry, and which may be removable or embedded. The one or more SIM cards 1920 may carry identification and/or authentication information, such as an international mobile subscriber identity (IMSI) and/or IMSI-related key(s). Further, the apparatus 1902 may include one or more of an application processor 1906 coupled to a secure digital (SD) card 1908 and a screen 1910, a Bluetooth module 1912, a wireless local area network (WLAN) module 1914, a Global Positioning System (GPS) module 1916, and/or a power supply 1918.

The cellular baseband processor 1904 communicates through the cellular RF transceiver 1922 with the UE 104/104' and/or base station 102/180. The cellular baseband processor 1904 may include a computer-readable medium/memory. The computer-readable medium/memory may be non-transitory. The cellular baseband processor 1904 is responsible for general processing, including the execution of software stored on the computer-readable medium/memory. The software, when executed by the cellular baseband processor 1904, causes the cellular baseband processor 1904 to perform the various functions described supra. The computer-readable medium/memory may also be used for storing data that is manipulated by the cellular baseband processor 1904 when executing software. The cellular baseband processor 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the cellular baseband processor 1904.

In the context of FIG. 3, the cellular baseband processor 1904 may be a component of the UE 350 and may include the memory 360 and/or at least one of the TX processor 368, the RX processor 356, and/or the controller/processor 359. In one configuration, the apparatus 1902 may be a modem chip and/or may be implemented as the baseband processor 1904, while in another configuration, the apparatus 1902 may be the entire UE (e.g., the UE 350 of FIG. 3) and may include some or all of the abovementioned modules, components, and/or circuitry illustrated in the context of the apparatus 1902. In one configuration, the cellular RF transceiver 1922 may be implemented as at least one of the transmitter 354TX and/or the receiver 354RX.

The reception component 1930 may be configured to receive signaling on a wireless channel, such as signaling from a base station 102/180 or UE 104/104'. The transmission component 1934 may be configured to transmit signaling on a wireless channel, such as signaling to a base station 102/180 or UE 104/104'. The communication manager 1932 may coordinate or manage some or all wireless communications by the apparatus 1902, including across the reception component 1930 and the transmission component 1934.

The reception component 1930 may provide some or all data included in received signaling to the communication manager 1932, and the communication manager 1932 may generate and provide some or all of the data to be included in transmitted signaling to the transmission component 1934. The communication manager 1932 may include the various illustrated components, including one or more components configured to process received data, and/or one or more components configured to generate data for transmission.

The communication manager 1932 may include one or more of a connection component 1940, a selection component 1942, a configuration component 1944, a redundancy component 1946, a determination component 1948, a discard component 1950, and/or an organization component 1952. Some components may be added or omitted in various different aspects.

The connection component 1940 may be configured to establish a direct wireless communication link and an indirect wireless communication link with another UE to carry data associated with one traffic stream, e.g., as described in connection with. 1702 of FIG. 17 or as described in connection with 1802 of FIG. 18. For example, first, the connection component 1940 may discover the presence of the other UE 104', and second, the connection component 1940 may set up one bearer with the other UE 104' over a direct communication link and may set up another bearer with the other UE over an indirect communication link.

In some aspects, the selection component 1942 may be configured to select at least one of the direct communication link or the indirect communication link over which data is to be carried based on a set of criteria, e.g., as described in connection with 1704 of FIG. 17. According to various aspects, the set of criteria may include at least one criterion for at least one of data reliability, data integrity, latency, channel quality, link capacity, transmission error rate or packet loss rate. The architecture of the apparatus 1902 may be implemented such that the at least one of the direct communication link or the indirect communication link is selected at a management layer of a protocol stack, and the protocol stack further includes a PDCP layer that is logically lower than the management layer, and the direct communication link and the indirect communication link are managed at the management layer.

In some aspects, the configuration component 1944 may configure respective headers of a set of packets to indicate the at least one of the direct communication link or the indirect communication link on which the set of packets is to be carried, e.g., as described in connection with 1706 of FIG. 17. For example, the configuration component 1944 may determine a stream ID for packets to be transmitted to the other UE, e.g., using a combination or function considering one or more of a VLAN ID of the traffic stream, a destination address, and/or a source address. The configuration component 1944 may insert the ID or other value in a header field of each packet that is to be transmitted to the other UE 104'.

In some aspects, the redundancy component 1946 may configure respective headers of each of at least another set of packets to indicate the at least the other set of packets is redundantly encoded with the set of packets, e.g., as described in connection with 1708 of FIG. 17. For example, the redundancy component 1946 may determine that packets are redundantly encoded for transmission over both direct and indirect communication links. The redundancy component 1946 may assign each packet on at least one (and potentially both) of the direct and/or indirect communication links, and the redundancy component 1946 may insert an R-Tag in each of the selected packets.

In some aspects, at least one of the reception component 1930 and/or the transmission component 1934 may be configured to communicate with the UE 104 104' over at least one of the direct communication link or the indirect communication link after the direct communication link and the indirect communication link are established with the UE 104, e.g., as described in connection with 1710 of FIG. 17.

In some aspects, for example, the transmission component 1934 may be configured to communicate with the UE 104 104' by transmitting the same data over both of the direct communication link and the indirect communication link, e.g., as described in connection with 1712 of FIG. 17.

In some other aspects, at least one of the reception component 1930 and/or the transmission component 1934 may be configured to communicate with the UE 104 over at least one of the direct communication link or the indirect communication link after the direct communication link and the indirect communication link are established with the UE 104, e.g., as described in connection with 1804 of FIG. 18.

In some other aspects, for example, the reception component 1930 may communicate with the UE 104 by receiving the same data over both of the direct communication link and the indirect communication link, e.g., as described in connection with 1806 of FIG. 18.

In some other aspects, the determination component 1948 may determine which packets received on the at least one of the direct communication link or the indirect communication link are redundantly encoded with other packets on the at least one of the direct communication link or the indirect communication link, e.g., as described in connection with 1808 of FIG. 18. For example, first the determination component 1948 may inspect the headers of each of the packets being received on the at least one of the direct communication link or the indirect communication link. The determination component 1948 may compare the header contents with other header contents known to correspond to a redundantly encoded packet, such as by comparing the value of an R-Tag in the header contents to determine if there is a match and the packet is redundantly encoded with at least one other packet received on the at least one of the direct communication link or the indirect communication link. According to some other aspects, the determination component 1948 may implement one of a vector recovery algorithm or a match recovery algorithm in order to identify redundantly encoded packets.

In some other aspects, the discard component 1950 may be configured to discard the packets determined to be redundant, e.g., as described in connection with 1810 of FIG. 18. For example, first, the determination component 1948 may inspect the header contents of each packet to identify those packets having a redundancy tag indicating that the packet is redundantly encoded with another packet on the traffic stream. The discard component 1950 may determine whether the data payload in the redundantly encoded packet has already been received on the traffic stream. If the packet is redundantly encoded and data payload has already been received in another packet of the traffic stream, then the discard component 1950 may erase the redundantly encoded packet from memory. Otherwise, the discard component 1950 may forward the packet.

In some other aspects, the organization component 1952 may be configured to organize, based on the headers set of packets, a first subset of packets received over the direct communications link and a second subset of packets received over the indirect communication link into the set of packets, e.g., as described in connection with 1812 of FIG. 18. For example, the organization component 1952 identifies a respective sequence number associated with each of the packets. The organization component 1952 may reorder the packets in sequential order, e.g., according to the identified sequence numbers or other ordering criteria, and the organization component 1952 may forward the packets to the higher layer(s), which may include the intended destination of the packets.

The apparatus 1902 may include additional components that perform some or all of the blocks, operations, signaling, etc. of the algorithm(s) in the aforementioned call flow diagrams and/or flowcharts of FIGS. 11 and 13-17. As such, some or all of the blocks, operations, signaling, etc. in the aforementioned call flow diagrams and/or flowcharts of FIGS. 11 and 13-17 may be performed by a component and the apparatus 1902 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1902, and in particular the cellular baseband processor 1904, includes means for establishing a direct wireless communication link and an indirect wireless communication link with another UE to carry data associated with one traffic stream; and means for communicating with the other UE over at least one of the direct communication link or the indirect communication link after the direct communication link and the indirect communication link are established with the other UE.

In one configuration, the indirect wireless communication link traverses at least one system of an access network, and the direct wireless communication link comprises a D2D link that is opened based on a sidelink discovery procedure with the other UE.

In one configuration, the means for communicating with the other UE over the at least one of the direct communication link or the indirect communication link is configured to: transmit to the other UE, or receive from the other UE, data of the one traffic stream over the at least one of the at least one of the direct communication link or the indirect communication link, and the data is distributed over a set of packets that each includes a respective header indicating an association with the one traffic stream.

In one configuration, the apparatus 1902, and in particular the cellular baseband processor 1904, may further include means for configuring the respective headers of the set of packets to indicate the at least one of the direct communication link or the indirect communication link on which the set of packets is to be carried.

In one configuration, the apparatus 1902, and in particular the cellular baseband processor 1904, may further include means for configuring respective headers of each of at least another set of packets to indicate the at least the other set of packets is redundantly encoded with the set of packets.

In one configuration, the means for communicating with the other UE over the at least one of the direct communication link or the indirect communication link is configured to determine which packets on the at least one of the direct communication link or the indirect communication link are redundantly encoded with other packets on the at least one of the direct communication link or the indirect communication link; and discard the packets of the other set of the set of packets determined to be redundant.

In one configuration, the apparatus 1902, and in particular the cellular baseband processor 1904, may further include means for organizing, based on the headers set of packets, a first subset of packets received over the direct communications link and a second subset of packets received over the indirect communication link into the set of packets.

In one configuration, the apparatus 1902, and in particular the cellular baseband processor 1904, may further include means for selecting the at least one of the direct communication link or the indirect communication link over which data is to be carried based on a set of criteria.

In one configuration, the set of criteria includes at least one criterion for at least one of data reliability, data integrity, latency, channel quality, link capacity, transmission error rate or packet loss rate.

In one configuration, the at least one of the direct communication link or the indirect communication link is selected at a management layer of a protocol stack, the protocol stack further includes a PDCP layer that is logically lower than the management layer, and the direct communication link and the indirect communication link are managed at the management layer.

In one configuration, the means for communicating with the other UE over at least one of the direct communication link or the indirect communication link is configured to transmit or receive data over both of the direct communication link and the indirect communication link.

In one configuration, one of the apparatus or the other UE comprises a PLC and the other of the apparatus or the other UE comprises an S/A.

The aforementioned means may be one or more of the aforementioned components of the apparatus 1902 configured to perform the functions recited by the aforementioned means. As described supra, the apparatus 1902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Example 1 of the present disclosure may be an apparatus at a UE, including a memory and at least one processor. The at least one processor may be coupled to the memory and configured to establish a direct wireless communication link and an indirect wireless communication link with another UE to carry data associated with one traffic stream; and communicate with the other UE over at least one of the direct communication link or the indirect communication link after the direct communication link and the indirect communication link are established with the other UE.

Example 14 may include the apparatus of Example 13, and the indirect wireless communication link traverses at least one system of an access network, and the direct wireless communication link includes a D2D link that is opened based on a sidelink discovery procedure with the other UE.

Example 15 may include the apparatus of Example 13, and the communication with the other UE over the at least one of the direct communication link or the indirect communication link includes to: transmit to the other UE, or receiving from the other UE, data of the one traffic stream over the at least one of the at least one of the direct communication link or the indirect communication link, and the data is distributed over a set of packets that each includes a respective header indicating an association with the one traffic stream.

Example 16 may include the apparatus of Example 15, and the at least one processor is further configured to: configure the respective headers of the set of packets to indicate the at least one of the direct communication link or the indirect communication link on which the set of packets is to be carried.

Example 17 may include the apparatus of Example 15, and the at least one processor is further configured to: configure respective headers of each of at least another set of packets to indicate the at least the other set of packets is redundantly encoded with the set of packets.

Example 18 may include the apparatus of Example 15, and the transmission to the other UE, or reception from the other UE, of data of the one traffic stream over the at least one of the at least one of the direct communication link or the indirect communication link includes to: determine which packets on the at least one of the direct communication link or the indirect communication link are redundantly encoded with other packets on the at least one of the direct communication link or the indirect communication link; and discard the packets of the other set of the set of packets determined to be redundant.

Example 19 may include the apparatus of Example 15, and the at least one processor is further configured to: organize, based on the headers set of packets, a first subset of packets received over the direct communications link and a second subset of packets received over the indirect communication link into the set of packets.

Example 20 may include the apparatus of Example 13, and the at least one processor is further configured to: select the at least one of the direct communication link or the indirect communication link over which data is to be carried based on a set of criteria.

Example 21 may include the apparatus of Example 20, and the set of criteria includes at least one criterion for at least one of data reliability, data integrity, latency, channel quality, link capacity, transmission error rate or packet loss rate.

Example 22 may include the apparatus of Example 20, and the at least one of the direct communication link or the indirect communication link is selected at a management layer of a protocol stack, and the protocol stack further includes a PDCP layer that is logically lower than the management layer, and the direct communication link and the indirect communication link are managed at the management layer.

Example 23 may include the apparatus of Example 13, and the communication with the other UE over at least one of the direct communication link or the indirect communication link includes to: transmit or receive data over both of the direct communication link and the indirect communication link.

Example 24 may include the apparatus of Example 13, and one of the UE or the other UE includes a PLC and the other of the UE or the other UE includes an S/A.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if" "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    establishing a direct wireless communication link and an indirect wireless communication link with another UE to carry data associated with one traffic stream;
    selecting, at a management layer residing above a packet data convergence protocol (PDCP) layer of a protocol stack, at least one of the direct wireless communication link or the indirect wireless communication link over which data is to be carried based on a set of criteria;
    configuring, at the management layer residing above the PDCP layer of the protocol stack, a first header of a set of packets to indicate the at least one of the direct wireless communication link or the indirect wireless communication link on which the set of packets is to be carried;
    configuring, at the management layer residing above the PDCP layer of the protocol stack, a second header of each of at least another set of packets with a redundancy tag to indicate the at least the another set of packets is redundantly encoded with the set of packets, wherein the second header is different from the first header; and
    after the direct wireless communication link and the indirect wireless communication link are established with the other UE, communicating with the other UE over at least one of the direct wireless communication link or the indirect wireless communication link by transmitting to the other UE, or receiving from the other UE, (a) data of the one traffic stream over the selected at least one of the direct wireless communication link or the indirect wireless communication link or (b) same data over both of the direct wireless communication link and the indirect wireless communication link, wherein the data or the same data is distributed over a different set of packets that each includes the respective header indicating an association with the one traffic stream.

2. The method of claim 1, wherein the indirect wireless communication link traverses at least one system of an access network, and the direct wireless communication link comprises a device-to-device (D2D) link that is opened based on a sidelink discovery procedure with the other UE.

3. The method of claim 1, wherein configuring the second header of each of at least the another set of packets with the redundancy tag further comprises:
selecting each packet on the direct wireless communication link, the indirect wireless communication link, or both the direct wireless communication link and indirect wireless communication link, and inserting a redundancy tag in each of the selected packets.

4. The method of claim 1, wherein the transmitting to the other UE, or receiving from the other UE, data of the one traffic stream over the at least one of the direct wireless communication link or the indirect wireless communication link comprises:
determining which packets on the at least one of the direct wireless communication link or the indirect wireless communication link are redundantly encoded with other packets on the at least one of the direct wireless communication link or the indirect wireless communication link based on the redundancy tag; and
discarding the packets of the another set of the set of packets determined to be redundant.

5. The method of claim 1, further comprising:
organizing, based on the headers set of packets, a first subset of packets received over the direct communications link and a second subset of packets received over the indirect wireless communication link into the set of packets.

6. The method of claim 1, wherein the set of criteria includes at least one criterion for at least one of data reliability, data integrity, latency, channel quality, link capacity, transmission error rate or packet loss rate.

7. The method of claim 1, wherein the protocol stack further includes the packet data convergence protocol (PDCP) layer that is logically lower than the management layer, and wherein the direct wireless communication link and the indirect wireless communication link are managed at the management layer.

8. The method of claim 1, wherein the protocol stack further includes an application layer that is logically higher than the management layer and a network layer that is logically higher than the management layer.

9. The method of claim 1, wherein one of the UE or the other UE comprises a programmable logic controller (PLC) and the other of the UE or the other UE comprises a sensor actuator (S/A).

10. The method of claim 1, wherein the management layer further resides above a Layer 2 and below a sub-layer of Layer 3 or as the first layer of a network layer.

11. An apparatus for wireless communication at a user equipment (UE), comprising:
a memory; and
at least one processor coupled to the memory and configured to:
establish a direct wireless communication link and an indirect wireless communication link with another UE to carry data associated with one traffic stream;
selecting, at a management layer residing above a packet data convergence protocol (PDCP) layer of a protocol stack, at least one of the direct wireless communication link or the indirect wireless communication link over which data is to be carried based on a set of criteria;
configuring, at the management layer residing above the PDCP layer of the protocol stack, a first header of a set of packets to indicate the at least one of the direct wireless communication link or the indirect wireless communication link on which the set of packets is to be carried;
configuring, at the management layer residing above the PDCP layer of the protocol stack, a second header of each of at least another set of packets with a redundancy tag to indicate the at least the another set of packets is redundantly encoded with the set of packets, wherein the second header is different from the first header; and
after the direct wireless communication link and the indirect wireless communication link are established with the other UE, communicate with another UE over at least one of the direct wireless communication link or the indirect wireless communication link by transmitting to the other UE, or receiving from the other UE, (a) data of the one traffic stream over the selected at least one of the direct wireless communication link or the indirect wireless communication link or (b) same data over both of the direct wireless communication link and the indirect wireless communication link, wherein the data or the same data is distributed over a different set of packets that each includes the respective header indicating an association with the one traffic stream.

12. The apparatus of claim 11, wherein the indirect wireless communication link traverses at least one system of an access network, and the direct wireless communication link comprises a device-to-device (D2D) link that is opened based on a sidelink discovery procedure with the other UE.

13. The apparatus of claim 11, wherein configuring the second header of each of at least the another set of packets with the redundancy tag further comprises:
selecting each packet on the direct wireless communication link, the indirect wireless communication link, or both the direct wireless communication link and indirect wireless communication link, and inserting a redundancy tag in each of the selected packets.

14. The apparatus of claim 11, wherein the transmission to the other UE, or reception from the other UE, of data of the one traffic stream over the at least one of the direct wireless communication link or the indirect wireless communication link comprises to:
determine which packets on the at least one of the direct wireless communication link or the indirect wireless communication link are redundantly encoded with other packets on the at least one of the direct wireless communication link or the indirect wireless communication link; and
discard the packets of the another set of the set of packets determined to be redundant.

15. The apparatus of claim 11, wherein the at least one processor is further configured to:
organize, based on the headers set of packets, a first subset of packets received over the direct communications link and a second subset of packets received over the indirect wireless communication link into the set of packets.

16. The apparatus of claim 11, wherein the set of criteria includes at least one criterion for at least one of data reliability, data integrity, latency, channel quality, link capacity, transmission error rate or packet loss rate.

17. The apparatus of claim 11, wherein the protocol stack further includes the packet data convergence protocol (PDCP) layer that is logically lower than the management layer, and wherein the direct wireless communication link and the indirect wireless communication link are managed at the management layer.

18. The apparatus of claim 11, wherein the protocol stack further includes an application layer that is logically higher than the management layer and a network layer that is logically higher than the management layer.

19. The apparatus of claim 11, wherein one of the UE or the other UE comprises a programmable logic controller (PLC) and the other of the UE or the other UE comprises a sensor actuator (S/A).

20. The apparatus of claim 11, wherein the management layer further resides above a Layer 2 and below a sub-layer of Layer 3 or as the first layer of a network layer.

21. An apparatus for wireless communication, comprising:
   a processor configured to:
   establish a direct wireless communication link and an indirect wireless communication link with another UE to carry data associated with one traffic stream;
   select, at a management layer residing above a packet data convergence protocol (PDCP) layer of a protocol stack, at least one of the direct wireless communication link or the indirect wireless communication link over which data is to be carried based on a set of criteria;
   configure, at the management layer residing above the PDCP layer of the protocol stack, a first header of a set of packets to indicate the at least one of the direct wireless communication link or the indirect wireless communication link on which the set of packets is to be carried: carried;
   configure, at the management layer residing above the PDCP layer of the protocol stack, a second header of each of at least another set of packets with a redundancy tag to indicate the at least the another set of packets is redundantly encoded with the set of packets, wherein the second header is different from the first header; and
   after the direct wireless communication link and the indirect wireless communication link are established with the other UE, communicate with the other UE over at least one of the direct wireless communication link or the indirect wireless communication link by transmitting to the other UE, or receiving from the other UE, (a) data of the one traffic stream over the selected at least one of the direct wireless communication link or the indirect wireless communication link or (b) same data over both of the direct wireless communication link and the indirect wireless communication link, wherein the data or the same data is distributed over a different set of packets that each includes the respective header indicating an association with the one traffic stream.

22. The apparatus of claim 21, wherein the indirect wireless communication link traverses at least one system of an access network, and the direct wireless communication link comprises a device-to-device (D2D) link that is opened based on a sidelink discovery procedure with the other UE.

23. The apparatus of claim 21, wherein configuring the second header of each of at least the another set of packets with the redundancy tag further comprises:
   selecting each packet on the direct wireless communication link, the indirect wireless communication link, or both the direct wireless communication link and indirect wireless communication link, and inserting a redundancy tag in each of the selected packets.

24. The apparatus of claim 21, wherein the management layer further resides above a Layer 2 and below a sub-layer of Layer 3 or as the first layer of a network layer.

25. A non-transitory computer-readable medium storing computer-executable code for wireless communication at a user equipment (UE), the code when executed by a processor cause the processor to:
   establish a direct wireless communication link and an indirect wireless communication link with another UE to carry data associated with one traffic stream;
   selecting, at a management layer residing above a packet data convergence protocol (PDCP) layer of a protocol stack, at least one of the direct wireless communication link or the indirect wireless communication link over which data is to be carried based on a set of criteria;
   configuring, at the management layer residing above the PDCP layer of the protocol stack, a first header of a set of packets to indicate the at least one of the direct wireless communication link or the indirect wireless communication link on which the set of packets is to be carried;
   configuring, at the management layer residing above the PDCP layer of the protocol stack, a second header of each of at least another set of packets with a redundancy tag to indicate at least other set of packets is redundantly encoded with the set of packets, wherein the second header is different from the first header; and
   after the direct wireless communication link and the indirect wireless communication link are established with the other UE, communicate with the other UE over at least one of the direct wireless communication link or the indirect wireless communication link by transmitting to the other UE, or receiving from the other UE, (a) data of the one traffic stream over the selected at least one of the direct wireless communication link or the indirect wireless communication link or (b) same data over both of the direct wireless communication link and the indirect wireless communication link, wherein the data or the same data is distributed over a different set of packets that each includes the respective header indicating an association with the one traffic stream.

26. The non-transitory computer-readable medium of claim 25, wherein the management layer further resides above a Layer 2 and below a sub-layer of Layer 3 or as the first layer of a network layer.

* * * * *